United States Patent
Madrone et al.

(10) Patent No.: US 10,601,366 B2
(45) Date of Patent: Mar. 24, 2020

(54) FLUIDIC ACTUATOR SYSTEM AND METHOD

(71) Applicant: SUNFOLDING, INC., San Francisco, CA (US)

(72) Inventors: Leila Marcia Madrone, San Francisco, CA (US); Kyle Douglas Betts, San Francisco, CA (US); Peter Sturt Lynn, Oakland, CA (US); Louis Hong Basel, Berkeley, CA (US); Brent Ridley, Huntington Beach, CA (US); Saul Thomas Griffith, San Francisco, CA (US); James Dylan McBride, San Francisco, CA (US); Jeffrey Lamb, San Francisco, CA (US); Eric Preston Lien Suan, Baltimore, MD (US); Erica Lin, Millbrae, CA (US); Joshua Erickson, Oakland, CA (US); Vincent Domenic Romanin, San Francisco, CA (US)

(73) Assignee: SUNFOLDING, INC., San Francisco ( * ) Notice: Subject to any disclaimer, the term of this patent is extended or adjusted under 35 U.S.C. 154(b) by 0 days.

(21) Appl. No.: 16/134,844

(22) Filed: Sep. 18, 2018

(65) Prior Publication Data

US 2019/0020303 A1     Jan. 17, 2019

Related U.S. Application Data

(63) Continuation of application No. 15/012,715, filed on Feb. 1, 2016, now Pat. No. 10,135,388.

(Continued)

(51) Int. Cl.
*H02S 20/32*     (2014.01)
*H02S 20/30*     (2014.01)
*F15B 15/10*     (2006.01)

(52) U.S. Cl.
CPC .............. *H02S 20/32* (2014.12); *F15B 15/10* (2013.01); *H02S 20/30* (2014.12)

(58) Field of Classification Search
CPC .... B25J 18/06; B25J 9/142; B25J 9/00; F24S 30/425; F24S 30/452; F24S 23/74;
(Continued)

(56) References Cited

U.S. PATENT DOCUMENTS

| 979,460 A | 12/1910 | Fulton |
| 2,920,656 A | 1/1960 | Bertolet |

(Continued)

FOREIGN PATENT DOCUMENTS

| CA | 2330612 A1 | 6/2002 |
| CN | 101783619 A | 7/2010 |

(Continued)

OTHER PUBLICATIONS

Author Unkown, http://www.utilityscalesolar.com/Utility_Scale_Solar,_Inc/USS_Homepage.html, Utility Scale Solar, Inc., 2011.
(Continued)

*Primary Examiner* — Golam Mowla
(74) *Attorney, Agent, or Firm* — Davis Wright Tremaine LLP

(57) ABSTRACT

A pneumatically actuated solar panel array system that includes a plurality of separate actuator assemblies that each have a top plate and bottom plate and a first and second bellows that each extend between and are coupled to the top and bottom plates at a respective top head and bottom head, the first and second bellows being configured to be separately pneumatically inflated, where the pneumatic inflation expands the bellows along a length. The pneumatically actuated solar panel array system can also include a plurality of solar panels coupled to the actuator assemblies with the solar panels being configured to be actuated based on (Continued)

inflation of one or more bellows associated with the plurality of actuator assembles.

19 Claims, 45 Drawing Sheets

Related U.S. Application Data

(60) Provisional application No. 62/110,275, filed on Jan. 30, 2015.

(58) Field of Classification Search
CPC .......... F24S 30/428; F24S 30/48; F24S 50/00; F24S 50/20; F24S 2030/115; F24S 2050/25; F03G 6/02; H02S 20/32; H02S 20/30; H02S 40/00; F15B 15/10; Y02E 10/46; Y02E 10/47; Y02E 10/45; Y10S 901/22

See application file for complete search history.

(56) References Cited

U.S. PATENT DOCUMENTS

| | | | |
|---|---|---|---|
| 3,284,964 A | 11/1966 | Norio | |
| 3,472,062 A | 10/1969 | Owen | |
| 3,602,047 A | 8/1971 | Kistler | |
| 3,800,398 A | 4/1974 | Harrington, Jr. | |
| 3,956,543 A | 5/1976 | Stangeland | |
| 3,982,526 A | 9/1976 | Barak | |
| 4,063,543 A | 12/1977 | Hedger | |
| 4,102,326 A * | 7/1978 | Sommer | G01S 3/7861 126/575 |
| 4,120,635 A | 10/1978 | Langecker | |
| 4,154,221 A * | 5/1979 | Nelson | G01S 3/7861 126/573 |
| 4,172,443 A * | 10/1979 | Sommer | G01S 3/7861 126/680 |
| 4,175,540 A * | 11/1979 | Roantree | F24S 30/455 126/580 |
| 4,185,615 A | 1/1980 | Bottum | |
| 4,198,954 A * | 4/1980 | Meijer | F24S 30/452 126/579 |
| 4,345,582 A * | 8/1982 | Aharon | F24S 23/70 126/574 |
| 4,424,802 A | 1/1984 | Winders | |
| 4,459,972 A * | 7/1984 | Moore | F24S 30/455 126/600 |
| 4,464,980 A | 8/1984 | Yoshida | |
| 4,494,417 A | 1/1985 | Larson et al. | |
| 4,566,432 A | 1/1986 | Sobczak et al. | |
| 4,620,771 A * | 11/1986 | Dominguez | F21S 11/00 359/591 |
| 4,751,868 A | 6/1988 | Paynter | |
| 4,768,871 A | 9/1988 | Mittelhauser et al. | |
| 4,784,042 A | 11/1988 | Paynter | |
| 4,832,001 A | 5/1989 | Baer | |
| 4,848,179 A | 7/1989 | Ubhayakar | |
| 4,900,218 A | 2/1990 | Sutherland | |
| 4,939,982 A | 7/1990 | Immega et al. | |
| 4,954,952 A | 9/1990 | Ubhayakar et al. | |
| 5,021,798 A | 6/1991 | Ubhayakar | |
| 5,040,452 A | 8/1991 | Van Kerkvoort | |
| 5,080,000 A | 1/1992 | Bubic et al. | |
| 5,156,081 A | 10/1992 | Suzumori | |
| 5,181,452 A | 1/1993 | Immega | |
| 5,317,952 A | 6/1994 | Immega | |
| 5,697,285 A | 12/1997 | Nappi et al. | |
| 5,816,769 A | 10/1998 | Bauer et al. | |
| 6,054,529 A | 4/2000 | O'Donnell et al. | |
| 6,080,927 A | 6/2000 | Johnson | |
| 6,178,872 B1 | 1/2001 | Schulz | |
| 6,557,804 B1 * | 5/2003 | Carroll | B64G 1/007 244/172.8 |
| 6,875,170 B2 | 4/2005 | Francois et al. | |
| 7,331,273 B2 | 2/2008 | Kerekes et al. | |
| 7,531,741 B1 | 5/2009 | Melton et al. | |
| 7,614,615 B2 | 11/2009 | Egolf | |
| 8,201,473 B2 | 6/2012 | Knoll | |
| 8,305,736 B2 | 11/2012 | Yee et al. | |
| 8,657,271 B2 | 2/2014 | Szekely et al. | |
| 8,700,215 B2 | 4/2014 | Komatsu et al. | |
| 8,863,608 B2 | 10/2014 | Fischer et al. | |
| 9,624,911 B1 | 4/2017 | Griffith et al. | |
| 9,919,434 B1 | 3/2018 | Rey et al. | |
| 2005/0034752 A1 * | 2/2005 | Gross | F24S 50/20 136/246 |
| 2006/0049195 A1 | 3/2006 | Koussios et al. | |
| 2009/0097994 A1 * | 4/2009 | Beck | E21B 43/126 417/411 |
| 2009/0115292 A1 | 5/2009 | Ueda et al. | |
| 2009/0151775 A1 * | 6/2009 | Pietrzak | H02S 20/30 136/251 |
| 2010/0043776 A1 | 2/2010 | Gee | |
| 2010/0125401 A1 | 5/2010 | Hamama et al. | |
| 2011/0073161 A1 | 3/2011 | Scanlon | |
| 2011/0114080 A1 | 5/2011 | Childers et al. | |
| 2012/0210818 A1 | 8/2012 | Fischer et al. | |
| 2012/0285509 A1 | 11/2012 | Surganov | |
| 2013/0247962 A1 | 9/2013 | Sakai et al. | |

FOREIGN PATENT DOCUMENTS

| | | |
|---|---|---|
| CN | 103222067 A | 7/2013 |
| CN | 103786165 A | 5/2014 |
| CO | 6180473 A2 | 7/2010 |
| CO | 6450667 A2 | 5/2012 |
| EP | 2648226 A1 | 10/2013 |
| FR | 2603228 A1 | 3/1988 |
| KR | 101034478 B1 | 5/2011 |
| KR | 20130019502 A | 2/2013 |
| RU | 2516595 C2 | 5/2014 |
| RU | 2611571 C1 | 2/2017 |
| SU | 1346918 A1 | 10/1987 |
| WO | 2001017731 A1 | 3/2001 |
| WO | 2011094084 A2 | 8/2011 |
| WO | 12015378 A1 | 2/2012 |
| WO | 2016123592 A1 | 8/2016 |

OTHER PUBLICATIONS

International Search Report and Written Opinion dated Aug. 14, 2017, International Patent Application No. PCT/US2017/024730, filed Mar. 29, 2017.

International Search Report and Written Opinion dated Aug. 2, 2018, International Patent Application No. PCT/US2018/028020, filed Apr. 17, 2018, 7 pages.

International Search Report and Written Opinion dated Aug. 2, 2018, International Patent Application No. PCT/US2018/028024, filed Apr. 17, 2018, 7 pages.

International Search Report and Written Opinion dated Aug. 9, 2018, International Patent Application No. PCT/US2018/028025, filed Apr. 17, 2018, 7 pages.

International Search Report and Written Opinion dated May 5, 2016, International Patent Application No. PCT/US2016/015857, filed Jan. 30, 2016.

Seba, "Solar Trillions," pp. 246-250, Jan. 28, 2010.

The Wiley Encyclopedia of Packaging Technology 3rd Ed., Wiley Publications, p. 145, Sep. 2009.

International Search Report and Written Opinion dated Aug. 29, 2019, Patent Application No. PCT/US2019/034202, filed May 28, 2019, 7 pages.

\* cited by examiner

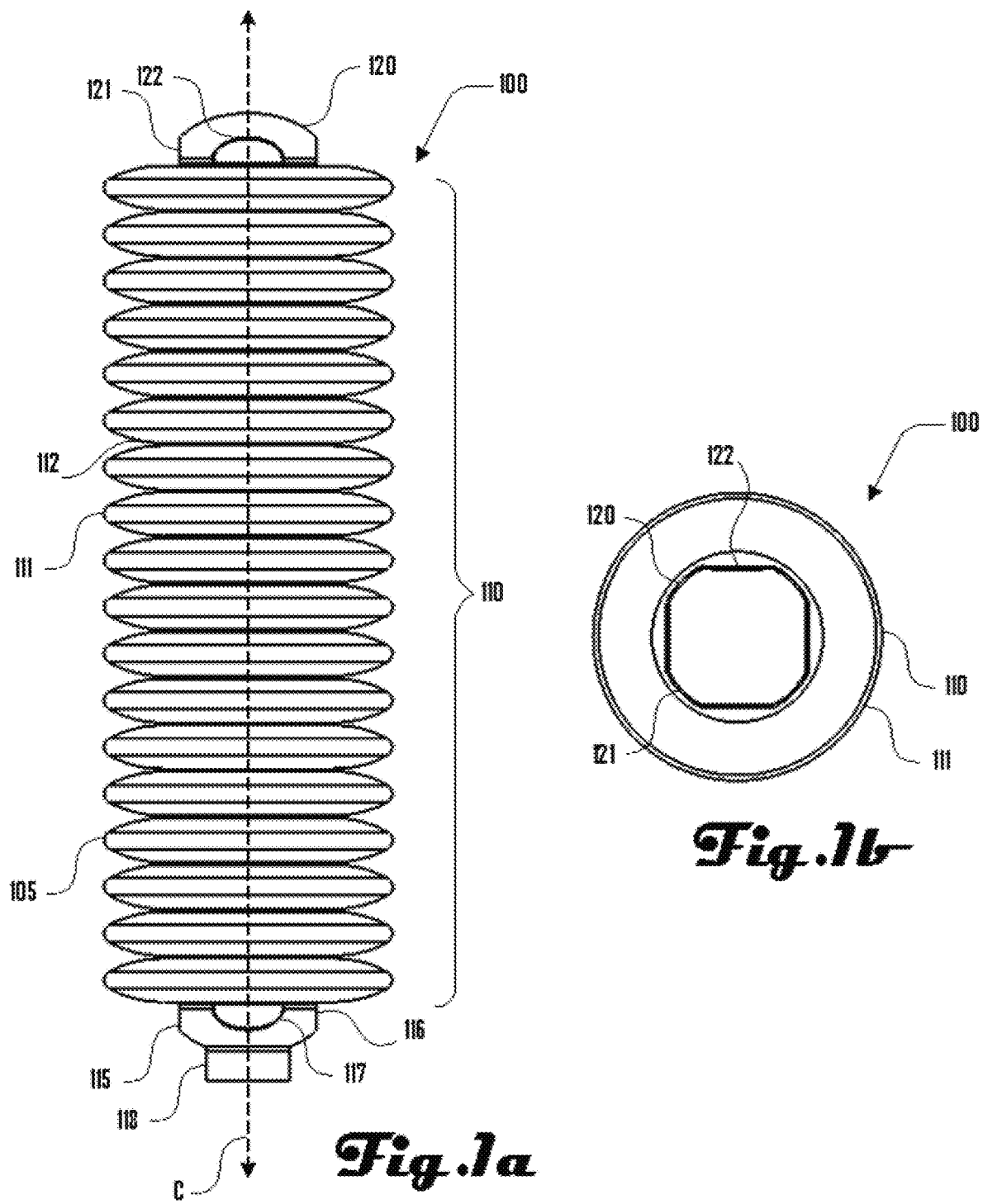

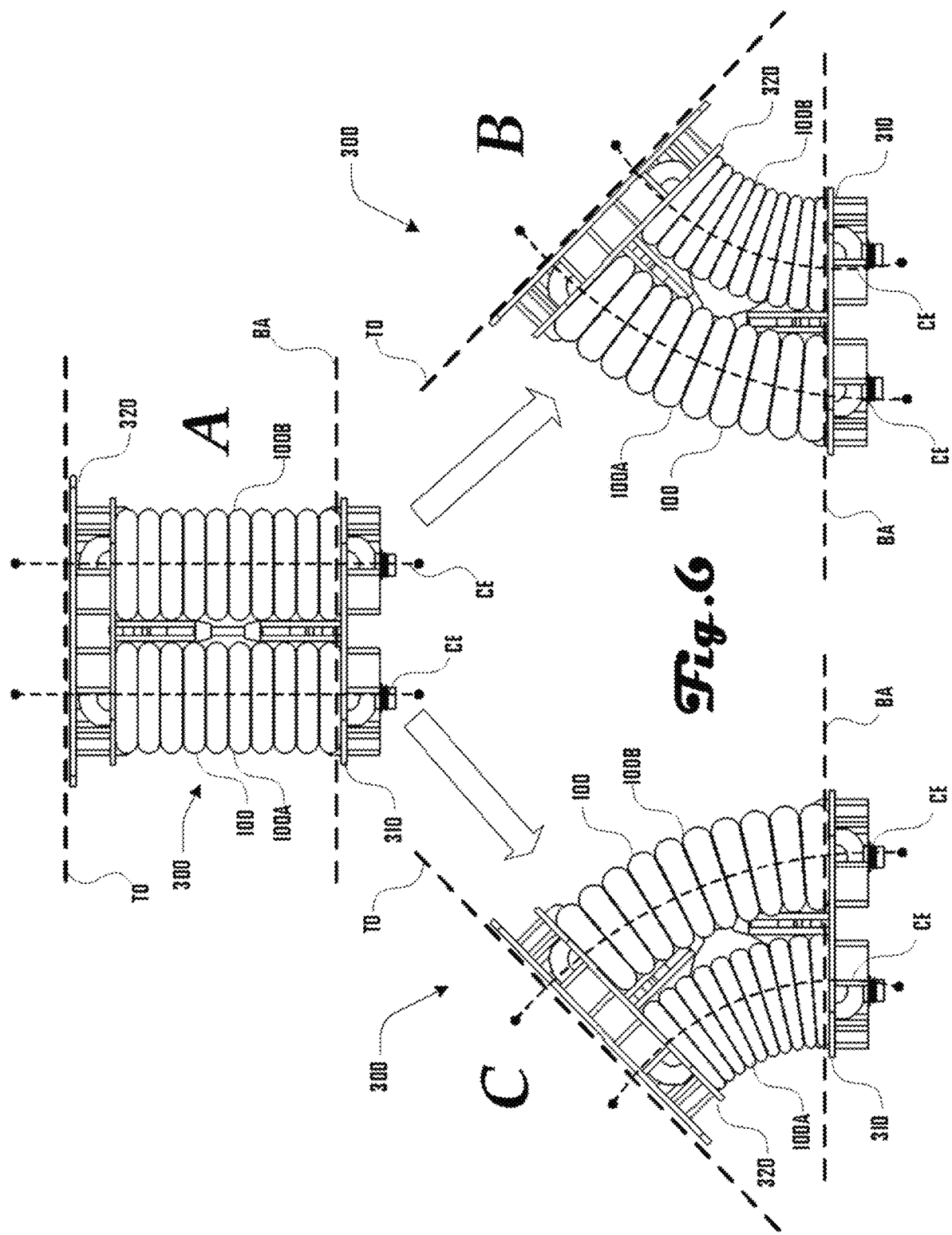

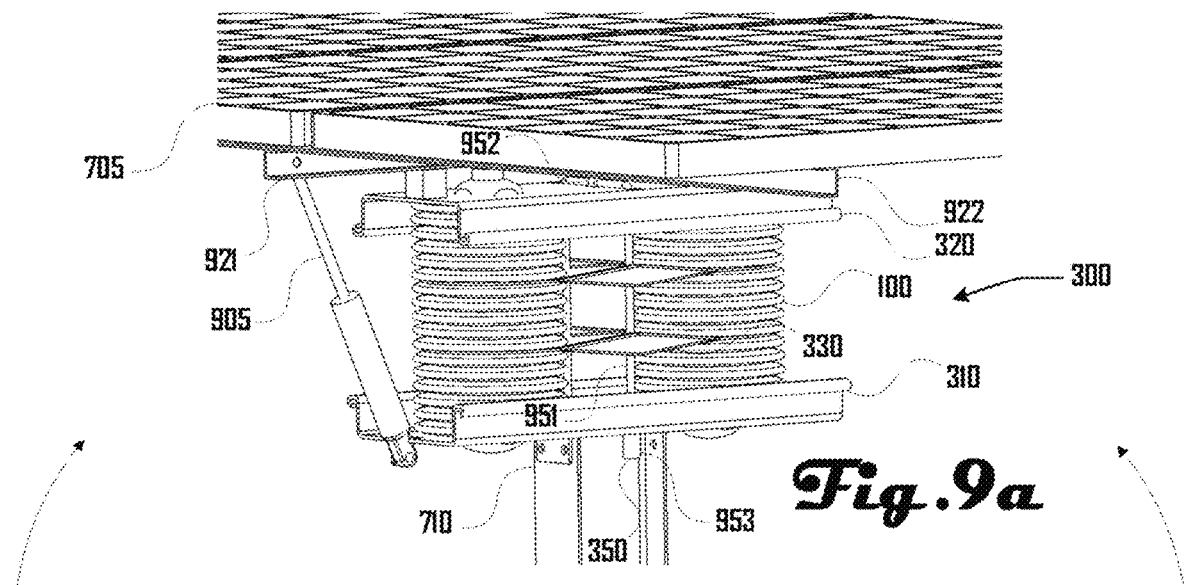
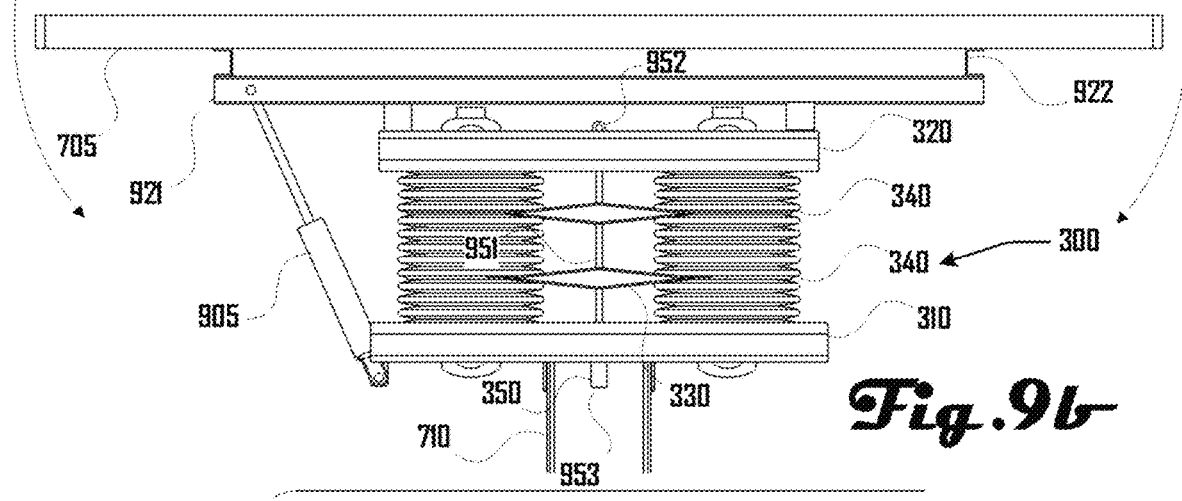
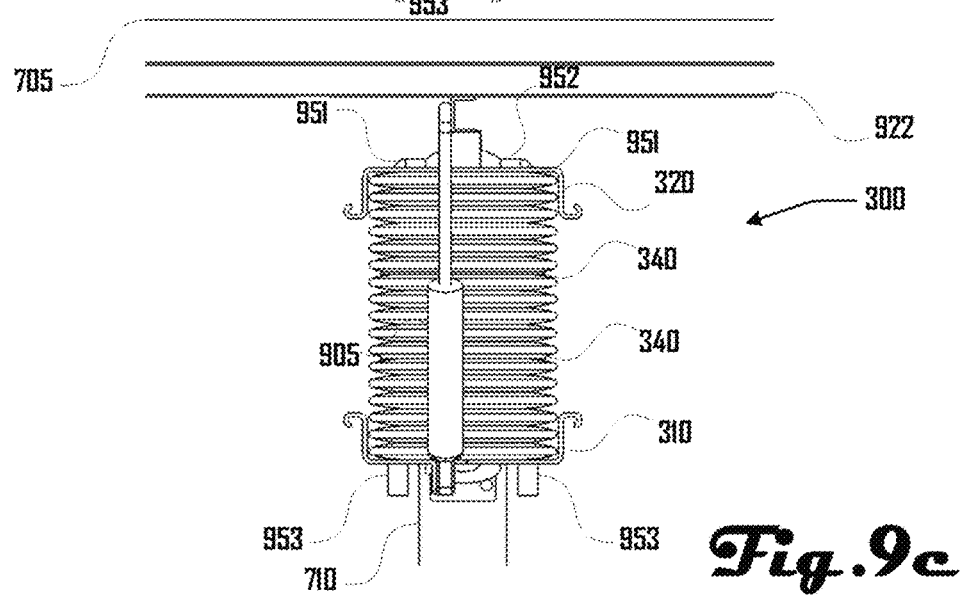

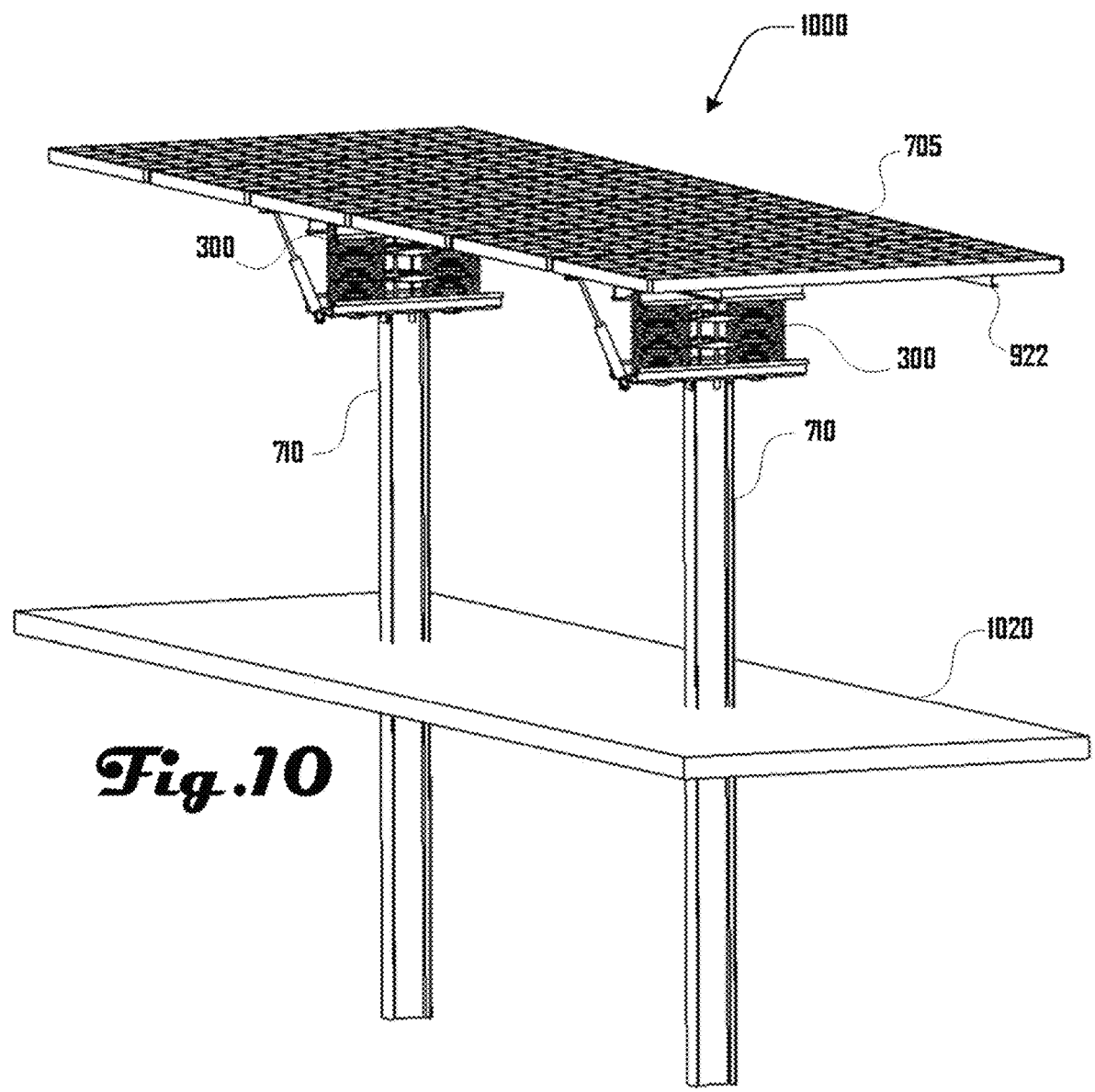

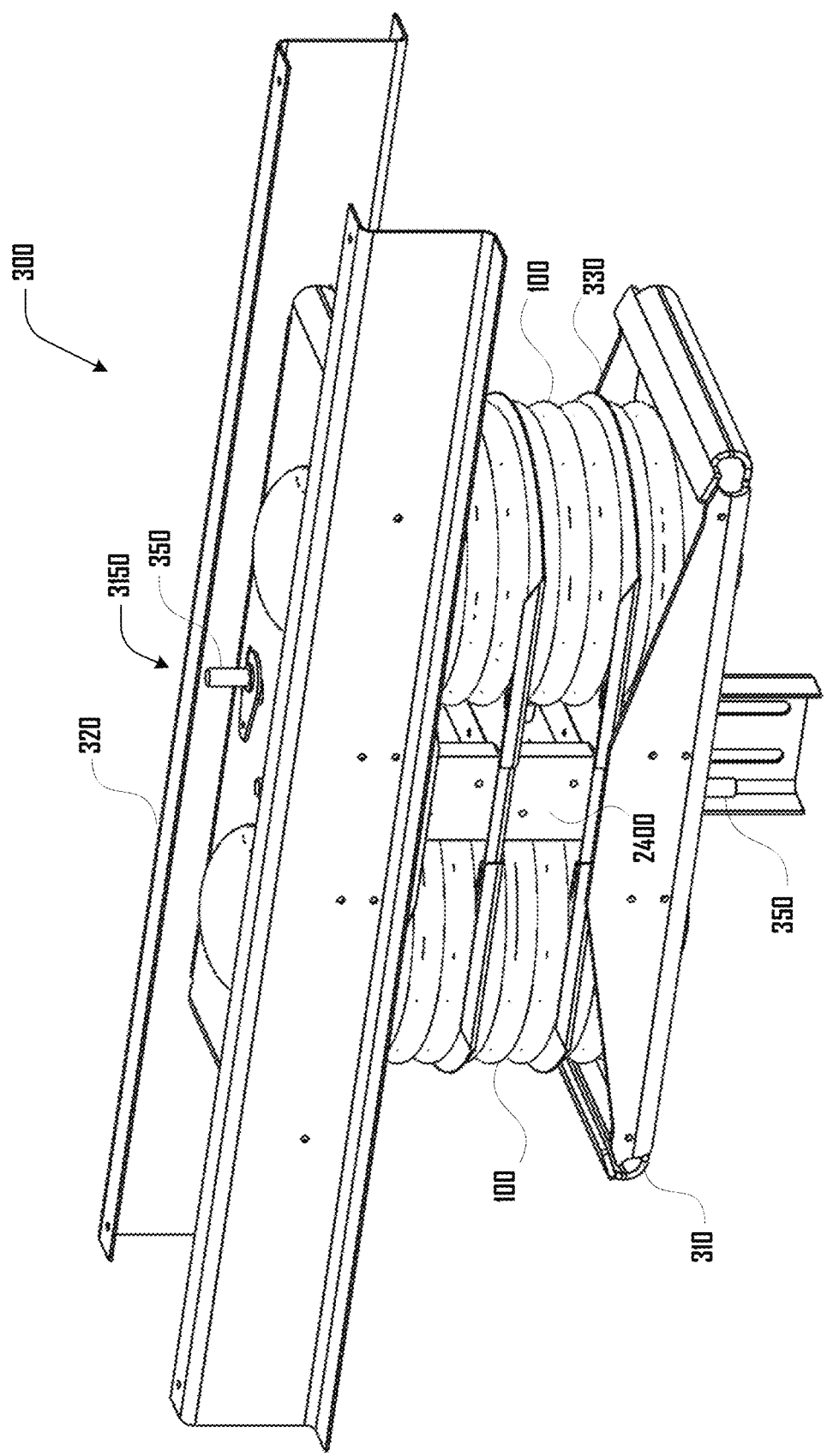

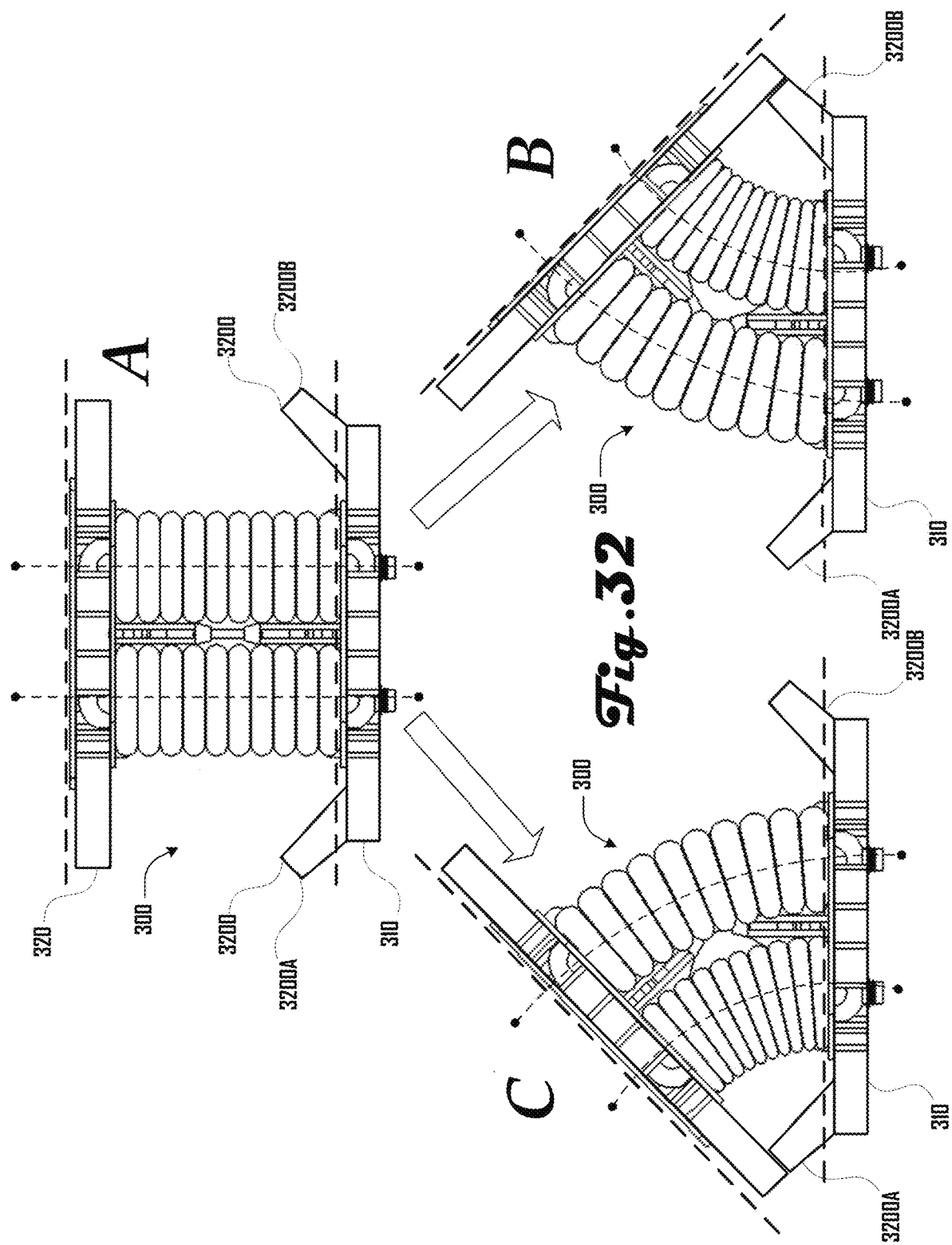

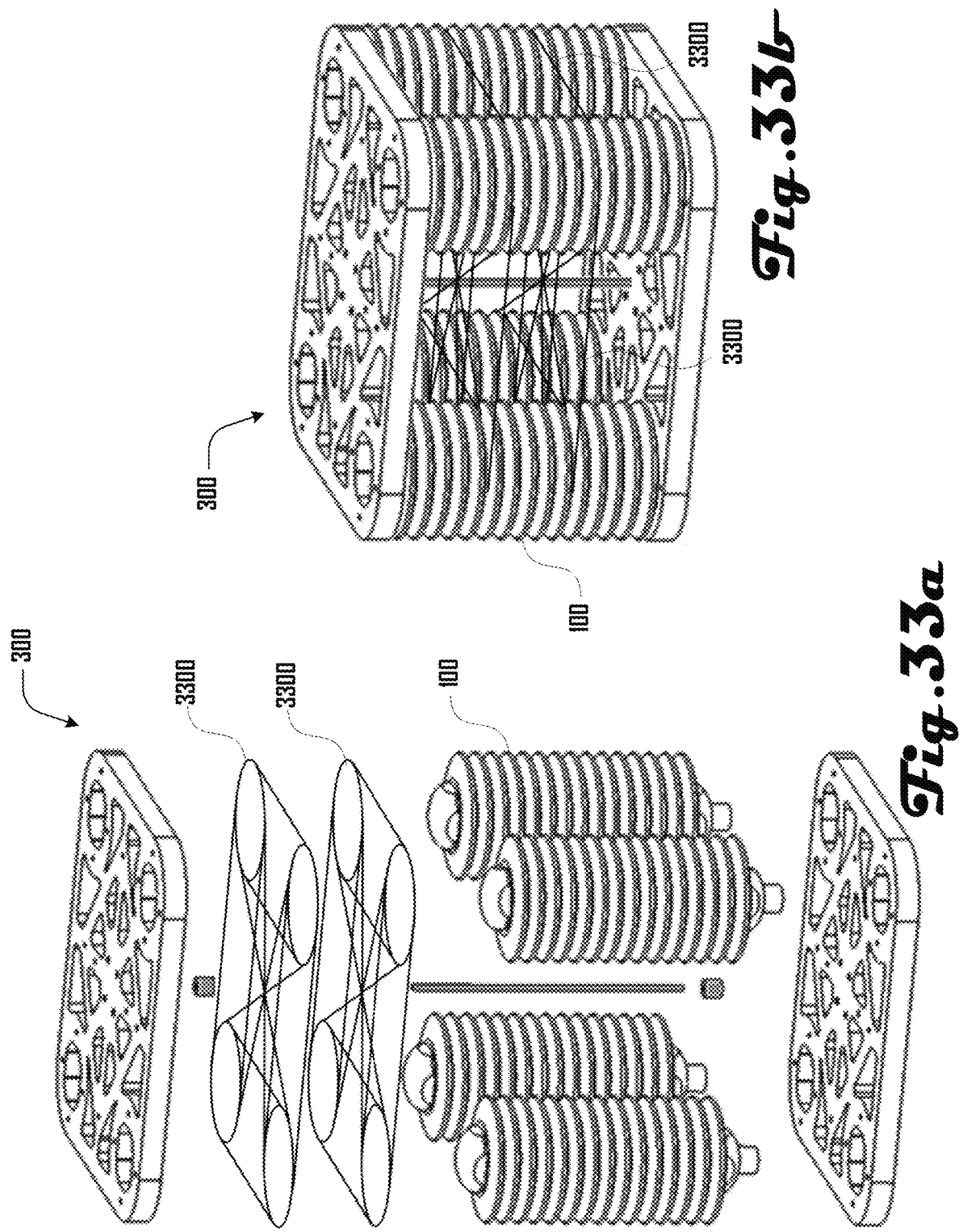

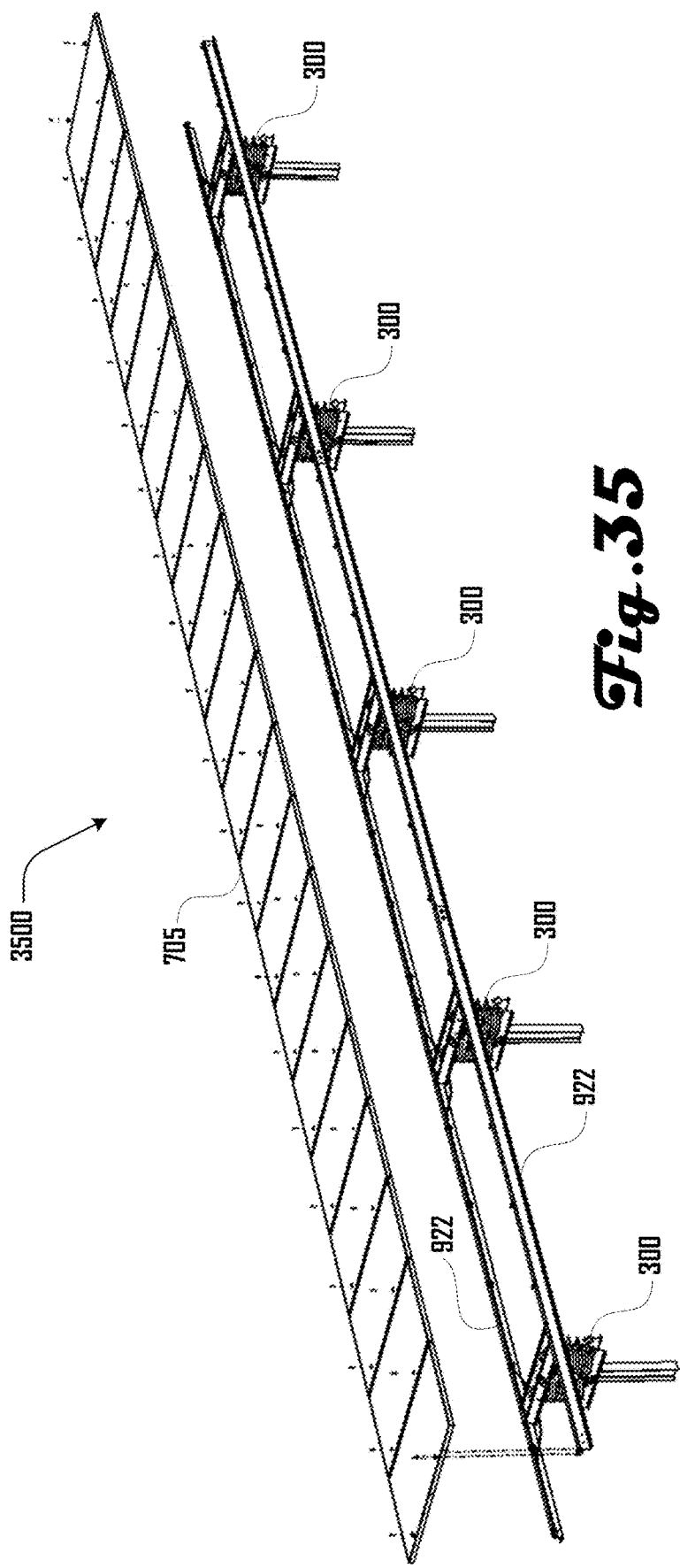

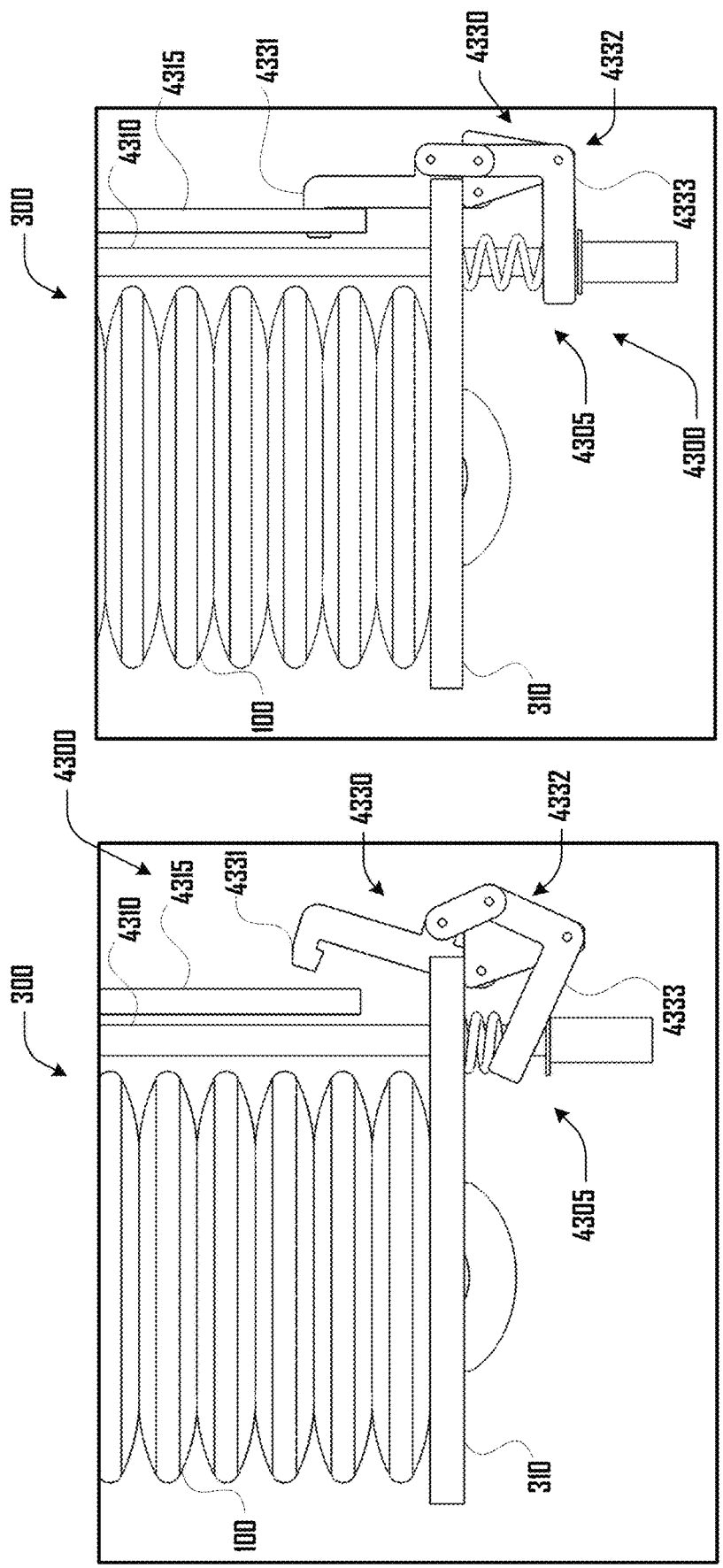

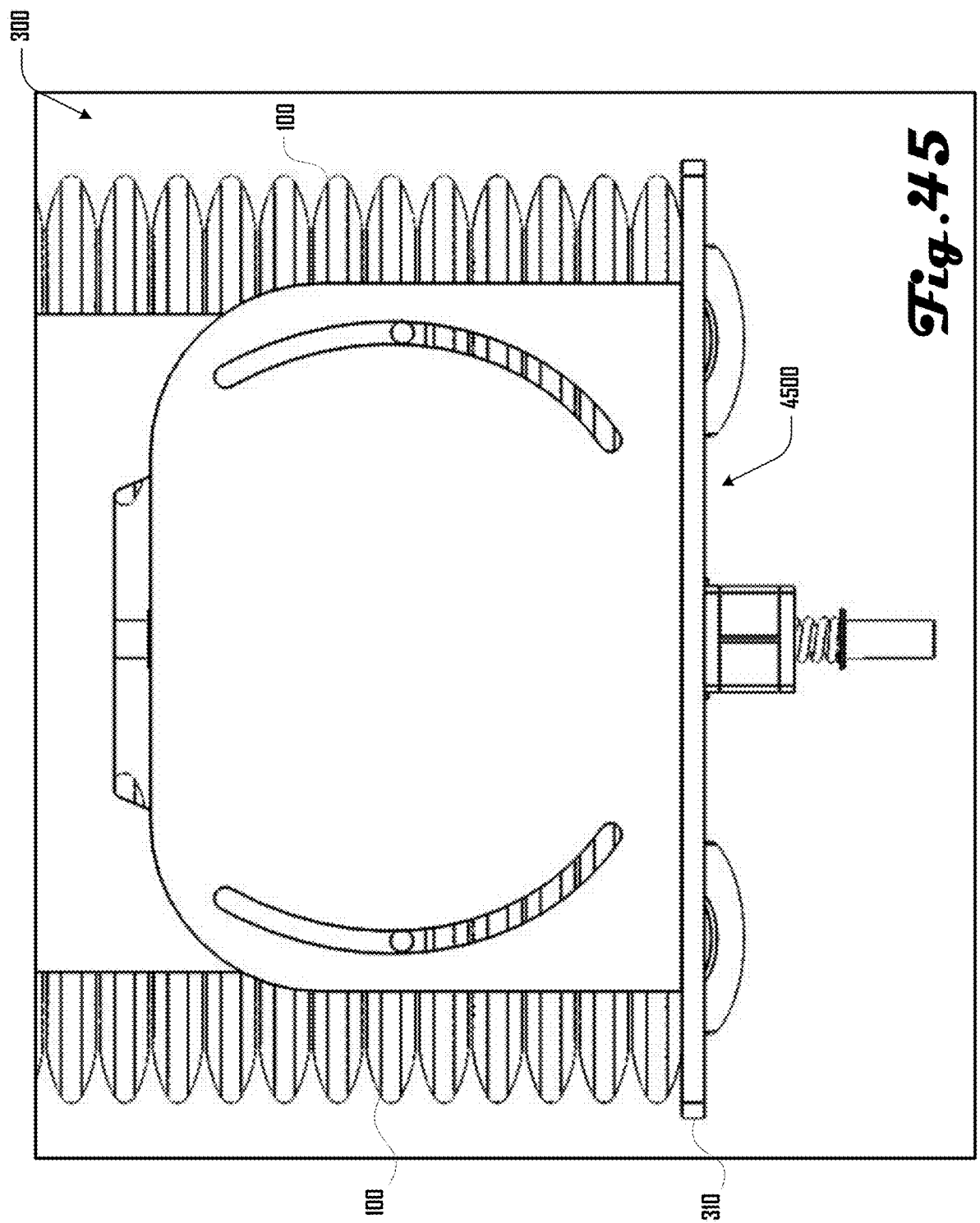

FLUIDIC ACTUATOR SYSTEM AND METHOD

CROSS-REFERENCE TO RELATED APPLICATIONS

This application is a continuation of U.S. patent application Ser. No. 15/012,715 filed Feb. 1, 2016, which is a non-provisional of and claims the benefit of U.S. provisional patent application 62/110,275 filed Jan. 30, 2015 entitled "FLUIDIC ACTUATOR SYSTEM AND METHOD." This application is hereby incorporated by reference in its entirety and for all purposes.

This application is also related to U.S. application Ser. Nos. 14/064,070 and 14/064,072, both filed Oct. 25, 2013, which claim the benefit of U.S. Provisional Application Nos. 61/719,313 and 61/719,314, both filed Oct. 26, 2012. All of these applications are hereby incorporated herein by reference in their entirety and for all purposes.

STATEMENT REGARDING FEDERALLY-SPONSORED RESEARCH

This invention was made with Government support under contract number DE-AR0000330 awarded by DOE, Office of ARPA-E. The Government has certain rights in this invention.

BACKGROUND

Conventional solar panel arrays are static and unmoving or configured to track the sun throughout the day to provide optimal capture of solar energy. Static solar panel arrays are often undesirable because they are unable to move and accommodate the changing angle of the sun during the day and throughout the year.

On the other hand, conventional moving solar panel arrays are also often undesirable because of their high cost of installation, the complexity of the mechanisms that move the solar panels, and the relatively high energy cost associated with actuating the solar panels. For example, some systems include motors that move individual solar panels or groups of solar panels. Such motors and other complex moving parts are expensive to install and maintain.

In view of the foregoing, a need exists for an improved solar panel actuation system and method in an effort to overcome the aforementioned obstacles and deficiencies of conventional solar panel actuation systems.

BRIEF DESCRIPTION OF THE DRAWINGS

FIG. 1a is an exemplary side-view drawing illustrating an embodiment of a bellows.

FIG. 1b is an exemplary top-view drawing of the bellows of FIG. 1a.

FIG. 6 is a side view drawing of an actuator assembly in a first, second and third configuration.

FIGS. 9a, 9b and 9c respectively illustrate a perspective, front and side view of a single-axis actuator assembly in accordance with another embodiment.

FIG. 10 illustrates a pair of the actuator assemblies illustrated in FIGS. 9a-c mounted on poles and coupled with a solar panel.

FIG. 24 illustrates another example embodiment of an actuator assembly having two bellows.

FIG. 32 illustrates an actuator assembly comprising hard stops in a first, second and third configuration.

FIGS. 33a and 33b illustrate the actuator assembly of FIGS. 3 and 4 further comprising a tension washer in accordance with one embodiment.

FIG. 35 illustrates an example of a solar array comprising a plurality of coupled actuator assemblies and solar panels coupled via a rail system.

FIGS. 44a and 44b illustrate the locking mechanism of FIG. 43 in a locked and unlocked configuration.

FIG. 45 illustrates an actuator assembly comprising a flexure extension lockout and tracked slot and pin path in accordance with one embodiment.

Figure 2B:
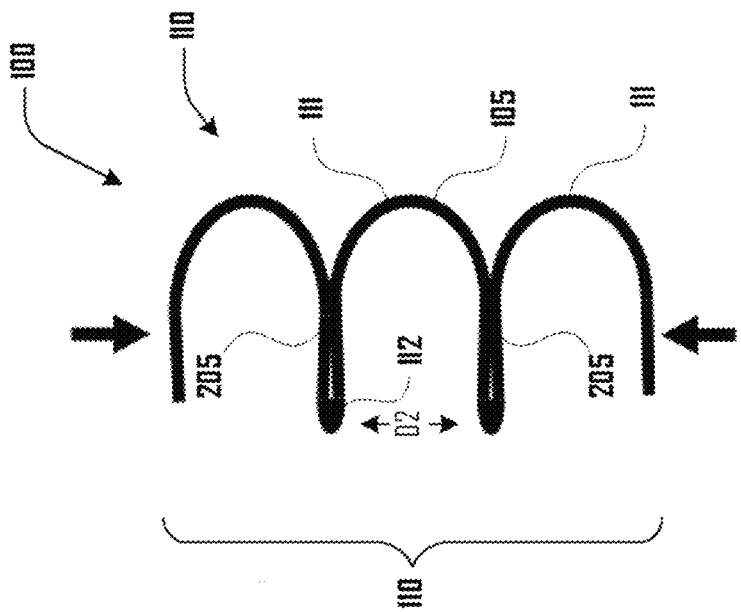
FIG. 2b is a close-up side view of the bellows of FIG. 2b, where the bellows is in a second configuration.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Figure 3:
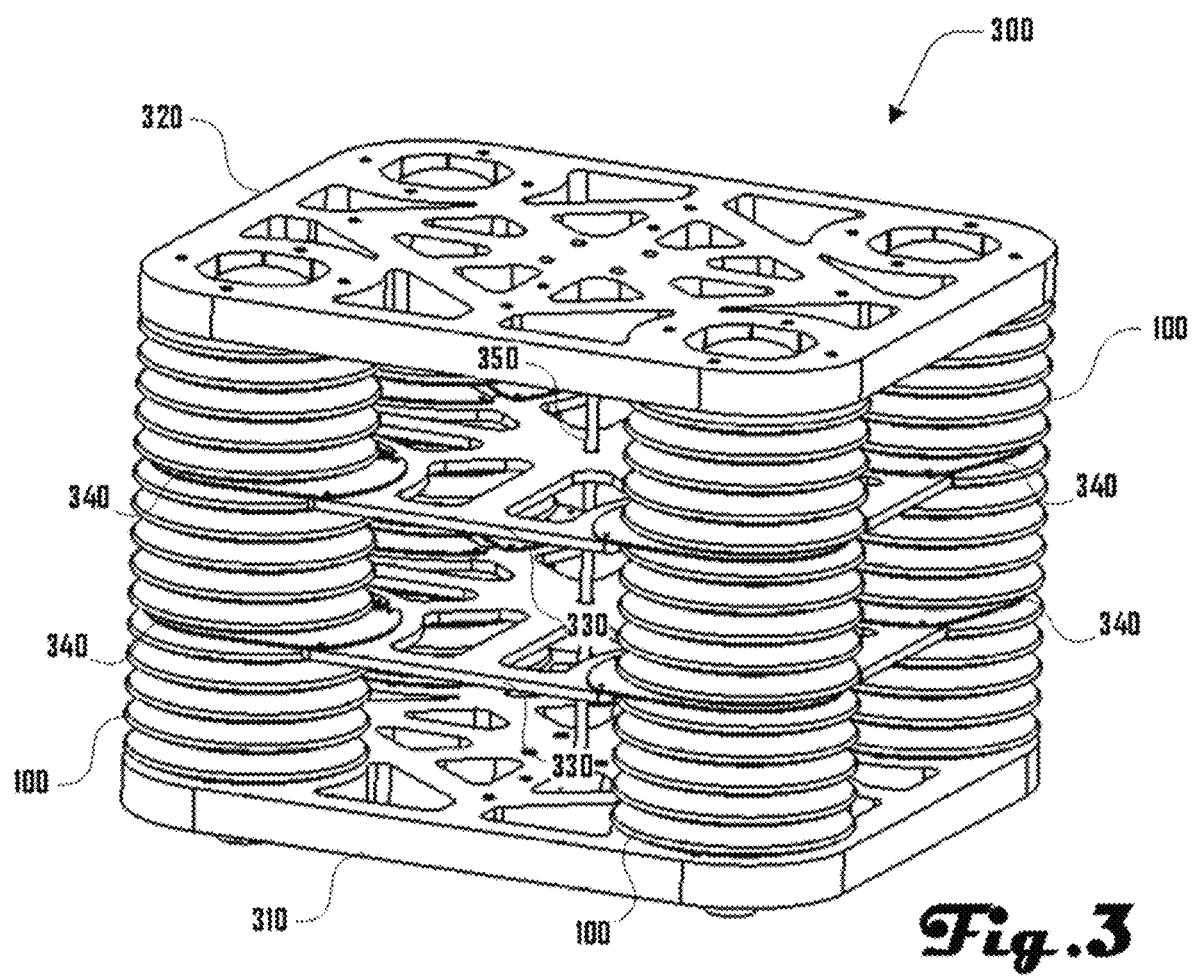
FIG. 3 is an exemplary perspective drawing illustrating an embodiment of an actuator assembly.
Figure 40A:
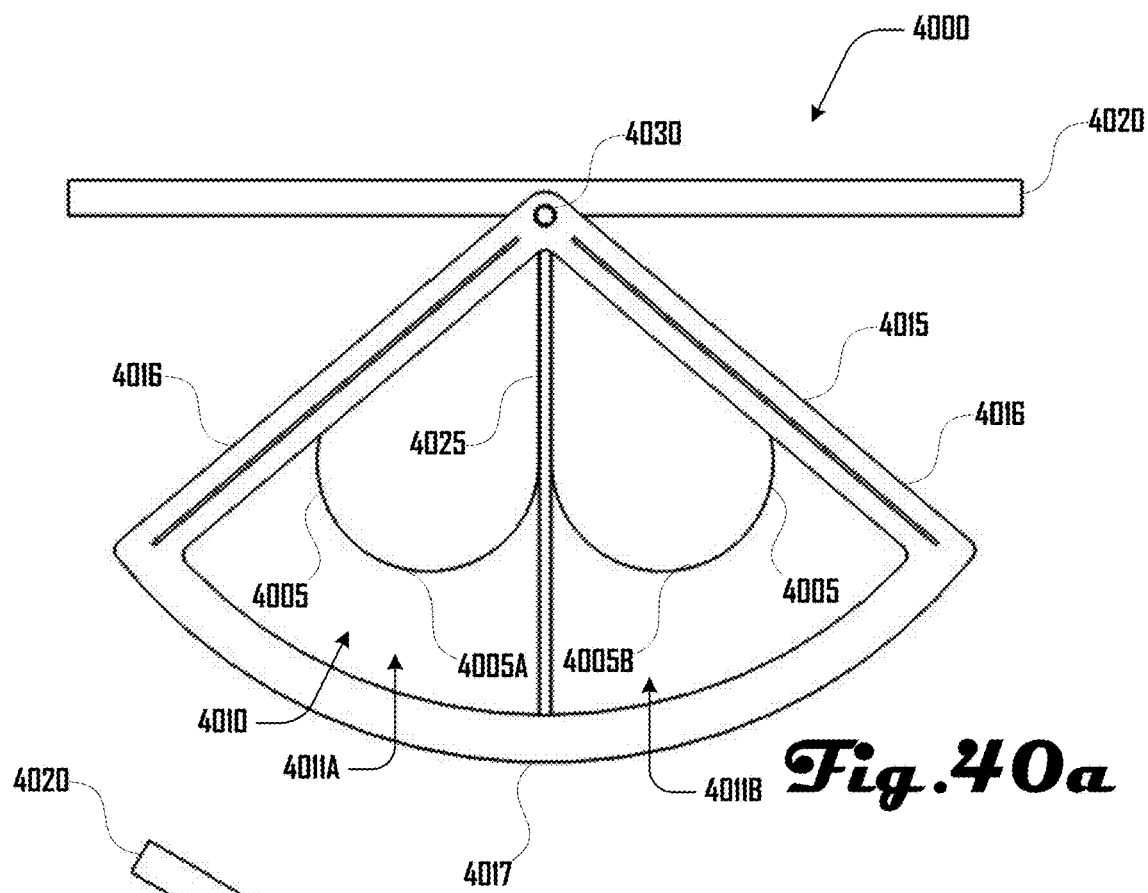
FIGS. 40a and 40b illustrate a V-plate actuator in accordance with one embodiment being in a first and second configuration.
Figure 40B:
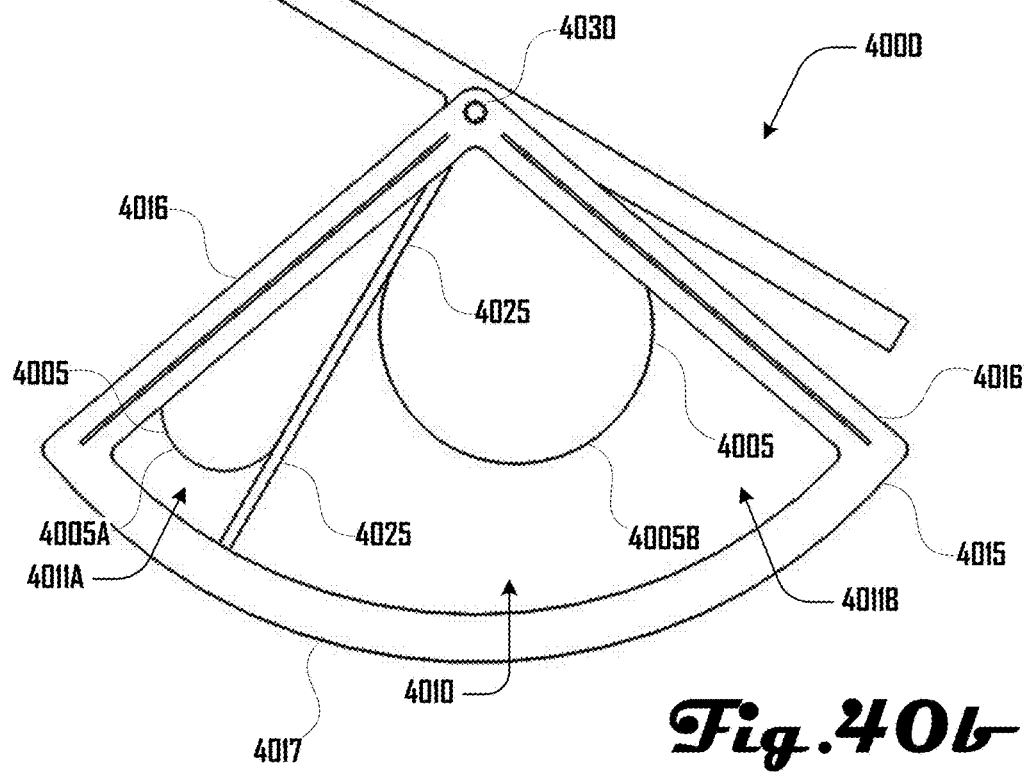

Since currently-available solar panel actuation systems are deficient, a fluidic actuation system as described herein can prove desirable and provide a basis for a wide range of applications, such as efficiently and cost-effectively moving solar panels about one or more axes. This result can be achieved, according to one embodiment disclosed herein, by a bellows 100 as illustrated in FIGS. 1a and 1b that can be part of an actuator assembly 300 as illustrated in FIG. 3. Although various example embodiments discussed herein relate to bellows 100, further embodiments can be directed to any suitable compliant pressurized fluid-filled actuators. For example, in some embodiments, such a compliant pressurized fluid-filled actuator can have a bulbous design, can comprise one or more inflatable balls, or the like (e.g., as illustrated in FIGS. 40a and 40b).

Turning to FIGS. 1a and 1b, the bellows 100 is shown as comprising a hollow elongated body 110 having a series of convolutions 105 that extend along a central axis C between a bottom-end 115 and a top end 120. The convolutions 105 are defined by a plurality of alternating crests 111 and roots 112. The bottom-end 115 is defined by a port 118 and a bottom-head 116 that has a plurality of truncations 117. The top-end 120 comprises a top-head 121 that includes a plurality of truncations 121. FIG. 1b illustrates the top-head 121 having four truncations 122 in respective square planes about the top head 121. As discussed in more detail herein, the truncations 117, 122 of the top and bottom head 116, 121 can be used for coupling the bellows 100 within an actuator assembly 300 as shown in FIG. 3. Some embodiments may have different head configurations with any number of square planes or be completely round. Head configurations may also include a variety of retention features to secure mating or mounting to actuator pressure plates. The number of convolutions may be chosen based on desired range of motion of the actuator or stiffness. The shape and diameter of the bellows convolutions may be chosen based on desired range of motion, stiffness, dead load, design load or the like.

The bellows 100 can be made of any suitable material including polymers, copolymers, terpolymers, and polymer blends (both miscible and immiscible), thermoplastic elastomers, thermoset polymers, thermoplastics, block copolymers, graft copolymers, polymer composites, and the like. Specific examples include high-density polyethylene (HDPE), cross-linked polyethylene (PEX), polypropylene (PP), low-density polyethylene (LDPE), polyethylene terephthalate (PET), polyethylene naphthalate (PEN), polystyrene (PS), polyetherimide (PEI), polyphenylene ether (PPE), thermoplastic polyurethane (TPU), thermoplastic elastomers (TPE), polycarbonate, acrylic, nylon, and the like. In various embodiments the bellows 100 can be made of different materials defined by layers or additives. For example, one embodiment can comprise a bellows 100 having an external carbon-black doped HDPE layer for UV resistance, over a more rigid structural PET layer, and with a third inner-layer of HDPE, LDPE, or the like, which can act as a flexible internal bladder. In other embodiments, the bellows 100 can be made of two or more materials in sequence. For example, one embodiment may comprise a bellows with sequentially alternating HDPE and PP convolutions, or the like.

In some embodiments it may be desirable for the bellows 100 to comprise one or more ultra-violet (UV) stabilizer, UV-absorber, anti-oxidant, thermal stabilizer, carbon black, glass fill, fiber reinforcement, electrostatic dissipater, lubricant concentrate or the like. Materials of the bellows 100 can be selected based on a desired manufacturing technique, bellows strength, bellows durability, range of motion, compliance, sun-resistance, temperature resistance, wear resistance and the like. In some embodiments, where the bellows 100 is employed in a location that experiences sun exposure, it can be desirable to include a protective UV coating or UV stabilizer in the bellows 100. Alternatively, the bellows 100 can be covered in a shroud or other protective surrounding.

Bellows 100 can be made via any suitable manufacturing process, including extrusion blow-molding (EBM), injection stretch blow-molding (ISBM), multi-layer blow-molding, co-extrusion blow molding, co-injection blow molding, suction blow-molding, 3-D blow-molding, sequential co-extrusion blow-molding, vacuum forming, injection molding, thermoforming, rotational molding, process cooling, three-dimensional printing, dip modeling or the like.

Bellows 100 can be any suitable thickness in various portions including about between 0.002 inches and 0.125 inches, and about between 0.0005 inches and 0.25 inches. In various embodiments, the thickness of various portions of the bellows 100 can be selected based on a desired manufacturing technique, bellows strength, bellows durability, range of motion, compliance, sun-resistance, temperature resistance, and the like.

Figure 2A:
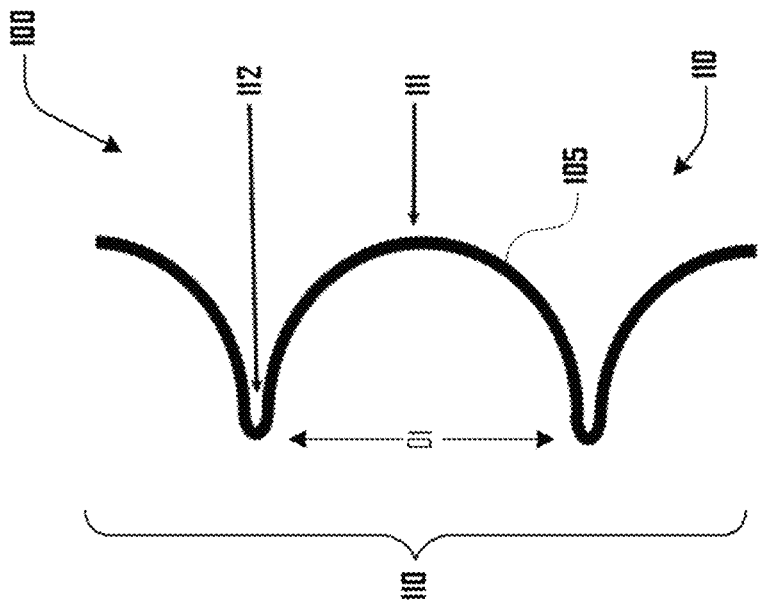
FIG. 2a is a close-up side view of the convolutions of the bellows of FIGS. 1a and 1b in a first configuration.

In various embodiments, the hollow bellows 100 can be configured to be inflated and/or deflated with a fluid (e.g., air, a liquid, or the like), which can cause the bellows 100 to change size, shape and/or configuration. Additionally, the bellows 100 can be deformable such that the bellows 100 can change size, shape and/or configuration. For example FIGS. 2a and 2b are side views of the bellows 100 in a first and second configuration respectively. In the first configuration of FIG. 2a, the distance D1 between adjoining root portions 112 is greater than the distance D2 between adjoining root portions in the second configuration of FIG. 2b.

The bellows 100 can change between the first and second configuration in various suitable ways. For example, the bellows 100 can naturally assume the first configuration (FIG. 2a) when unpressurized or at neutral pressure and then can assume the second configuration (FIG. 2b) via physical compression and/or a negative pressurization of the bellows 100. Additionally, the bellows 100 can naturally assume the second configuration (FIG. 2b) when unpressurized or at neutral pressure and then can assume the first configuration (FIG. 2a) via physical expansion and/or a positive pressurization of the bellows 100.

Additionally, the bellows 100 can be in the second configuration (FIG. 2b) at a first pressurization and expand to the first configuration (FIG. 2a) by pressurization to a second pressure that is greater than the first pressure. Additionally, the bellows 100 can be in the first configuration (FIG. 2a) at a first pressurization and contract to the second configuration (FIG. 2b) by pressurization to a second pressure that is less than the first pressure. In other words, the bellows 100 can be expanded and/or contracted via selective pressurization and/or via physical compression or expansion.

In some embodiments, it may be desirable for the convolutions 110 to engage in a contacting and/or rolling manner in various configurations. For example, FIG. 2a shows the first configuration where the convolutions are not contacting, whereas FIG. 2b shows the second configuration where the convolutions engage at a contact-region 205. In some embodiments, the contact-region 205 can provide for a rolling contact between the convolutions 110, which can be beneficial during movement of the bellows 100 as discussed in more detail herein. Additionally, such a contact-region 205 can be beneficial because it can reduce strain on the bellows 100 during compression and can increase the stiffness of the bellows 100 in certain configurations.

Figure 20A:
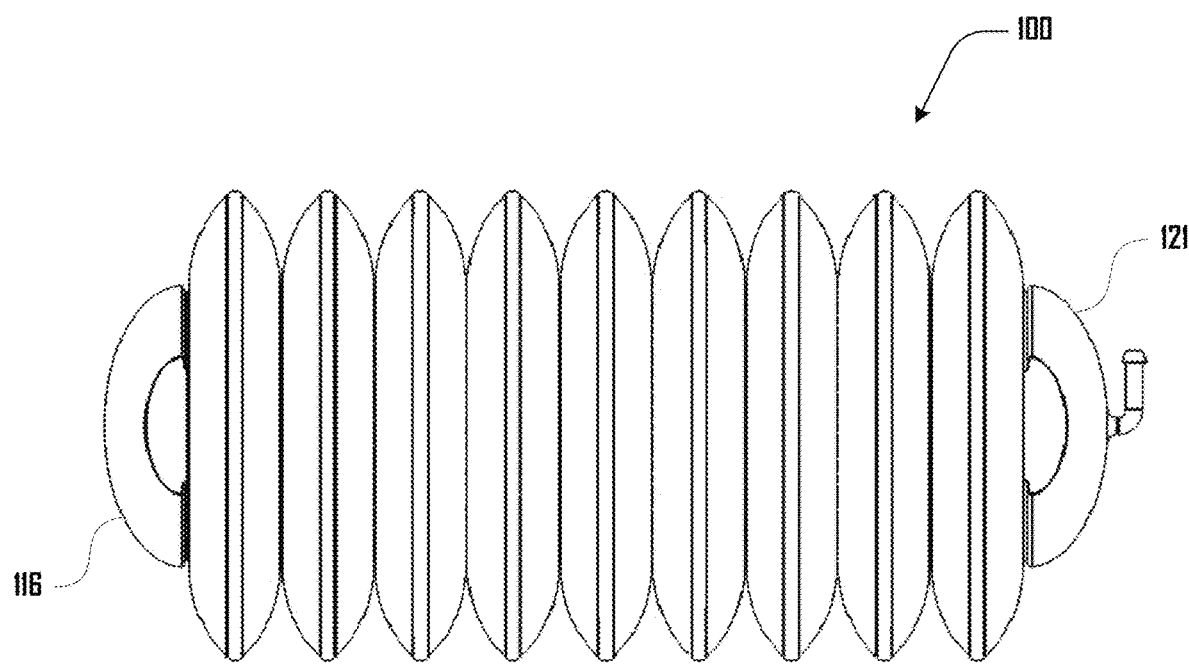
FIGS. 20a and 20b illustrate another example of a bellows in accordance with a further embodiment.
Figure 20B:
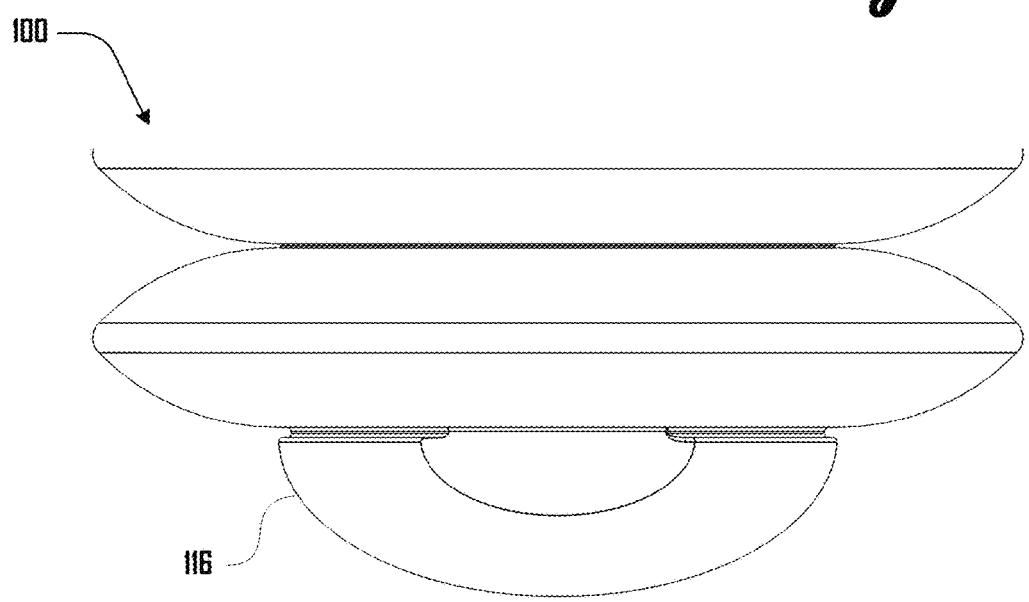
Figure 21:
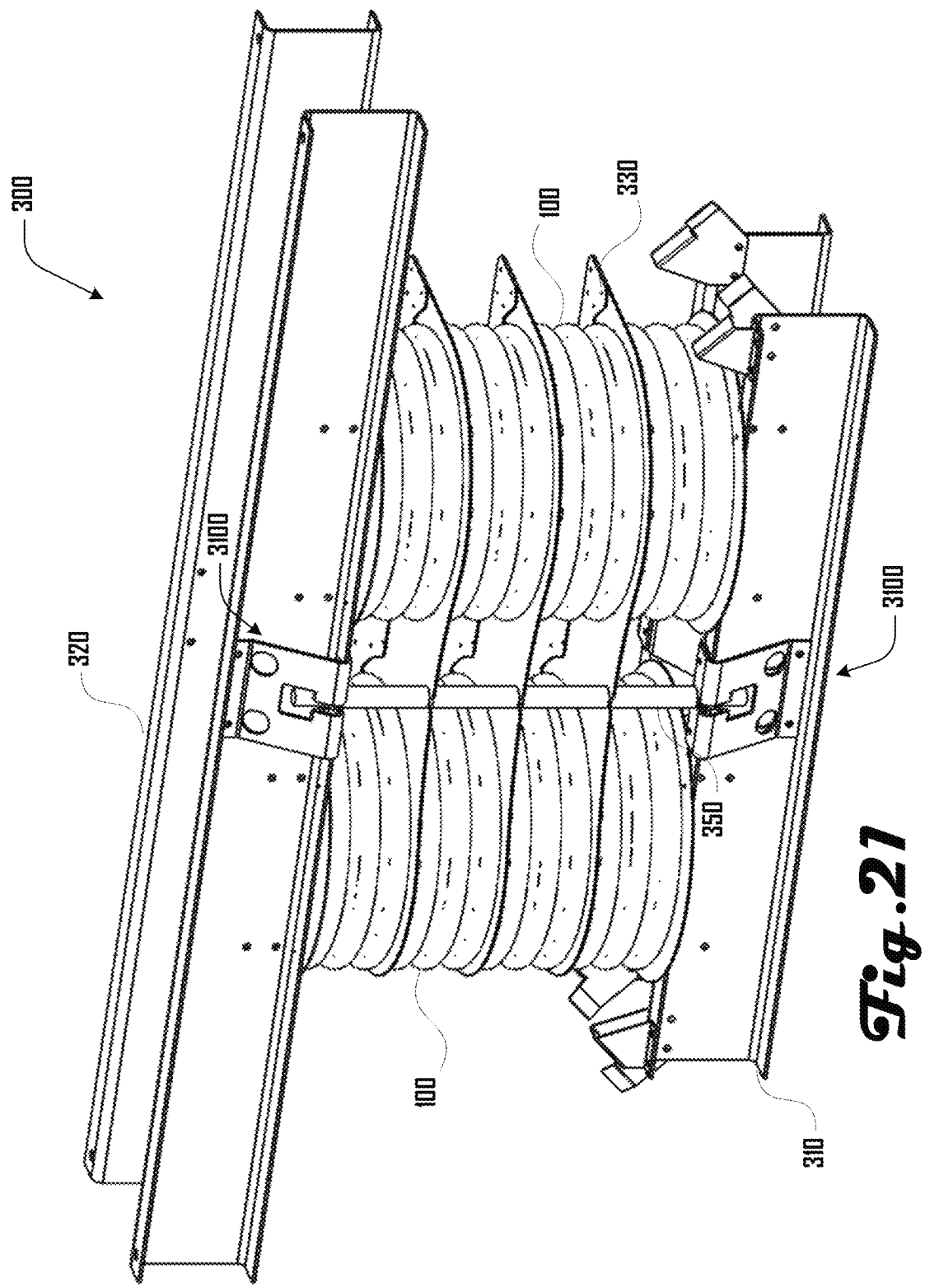
FIG. 21 illustrates a further example embodiment of an actuator assembly having two bellows.
Figure 22A:
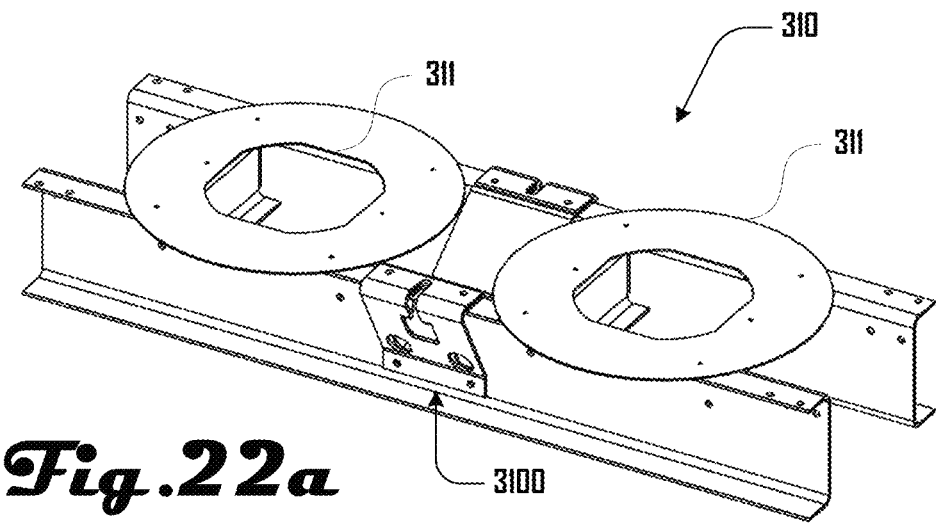
FIGS. 22a, 22b and 22c illustrate a base plate of the example actuator assembly of FIG. 21.
Figure 22B:
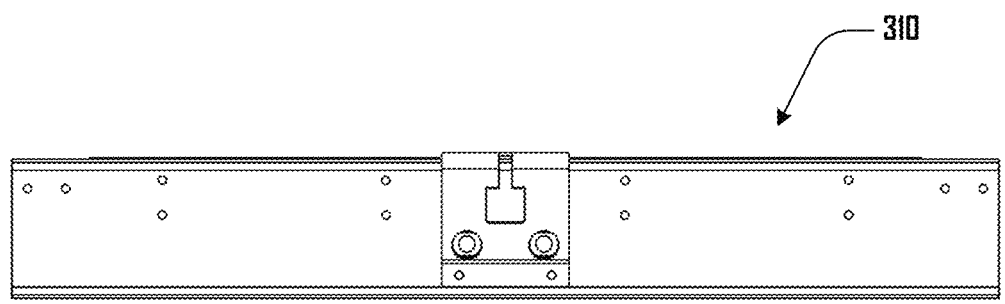
Figure 22C:
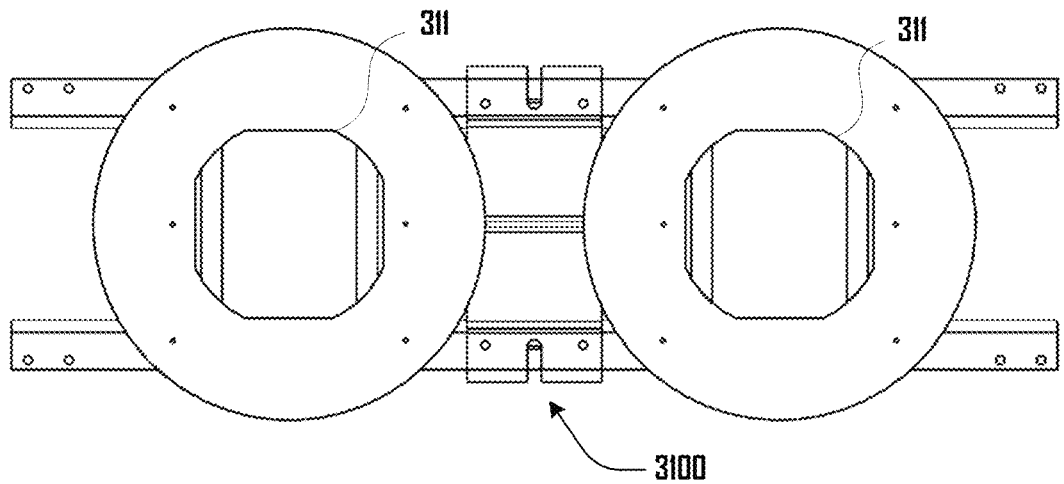
Figure 23A:
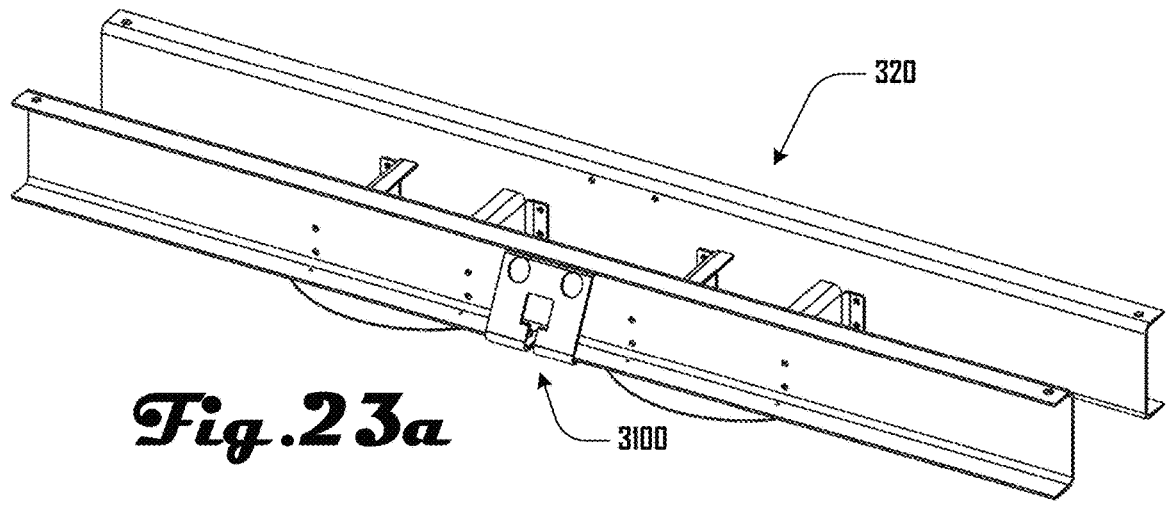
FIGS. 23a, 23b and 23c illustrate a top plate of the example actuator assembly of FIG. 21.
Figure 23B:
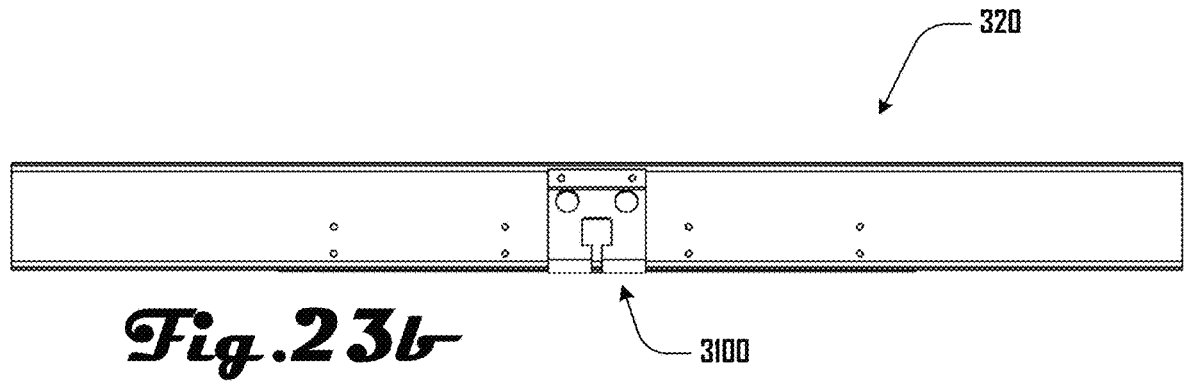
Figure 23C:
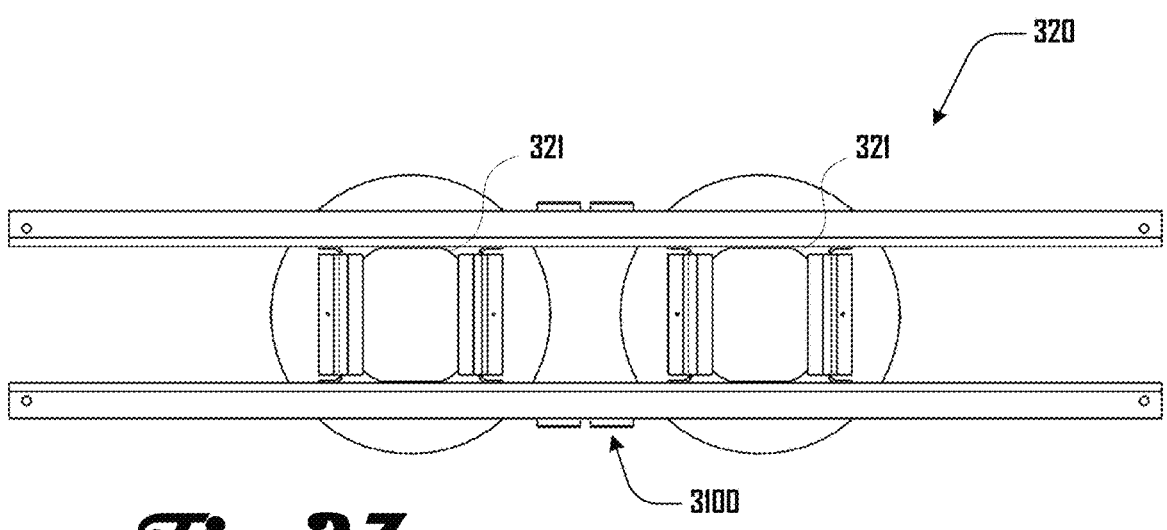
Figure 25A:
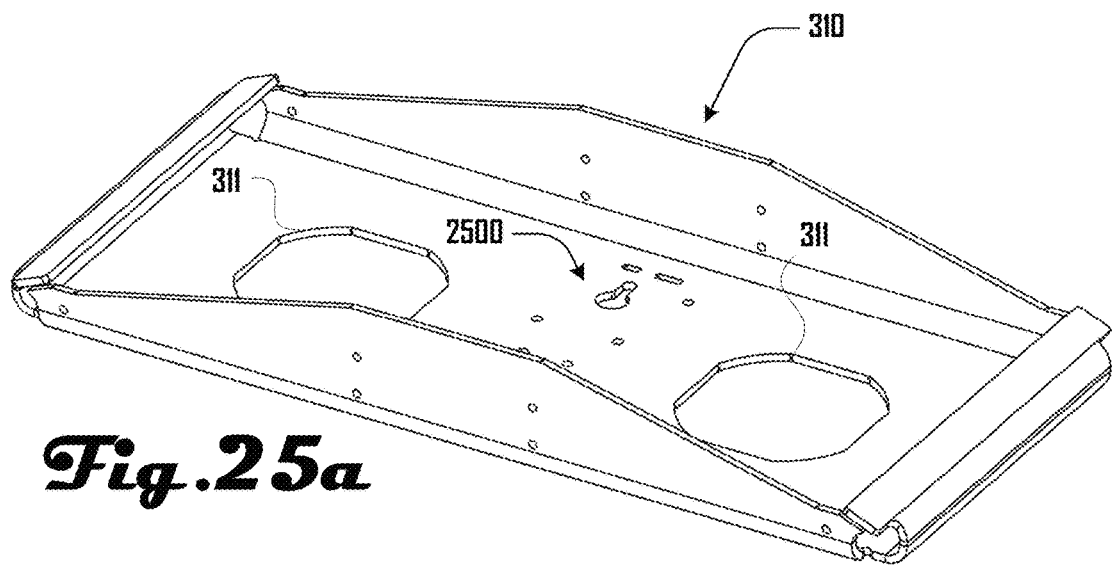
FIGS. 25a, 25b and 25c illustrate a base plate of the example actuator assembly of FIG. 24.
Figure 25B:
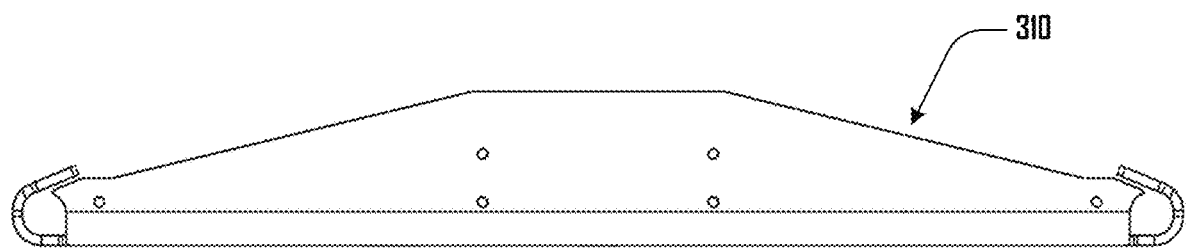
Figure 25C:
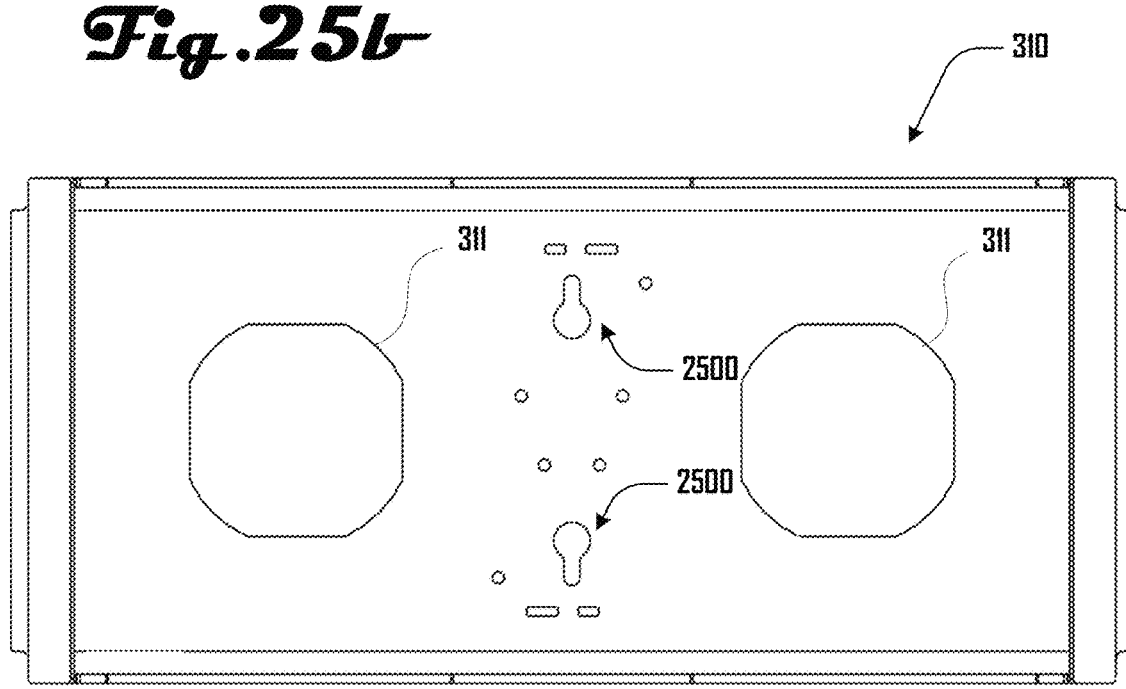
Figure 26A:
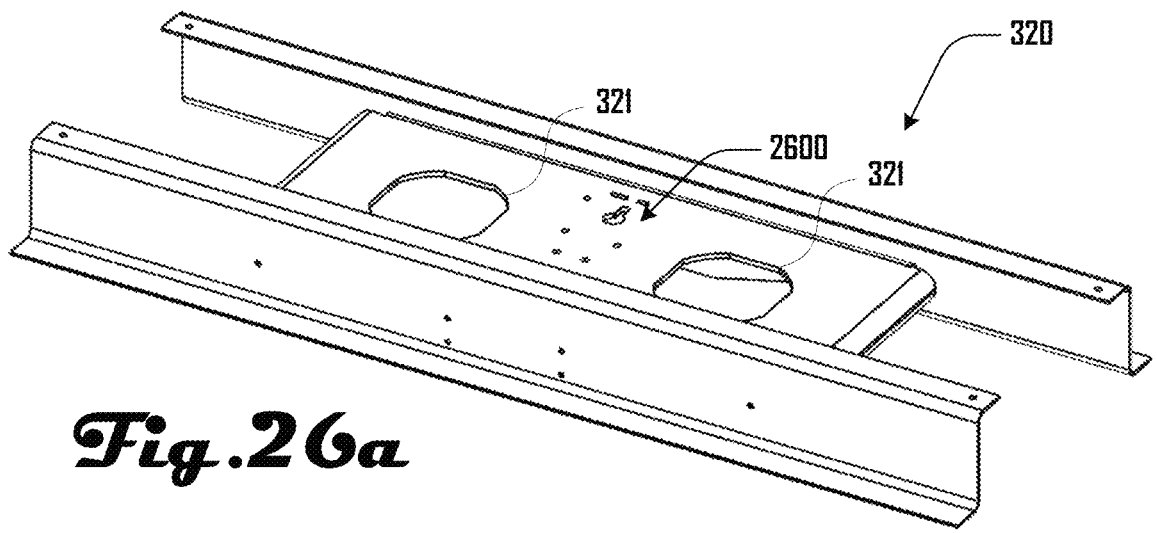
FIGS. 26a, 26b and 26c illustrate a top plate of the example actuator assembly of FIG. 24.
Figure 26B:
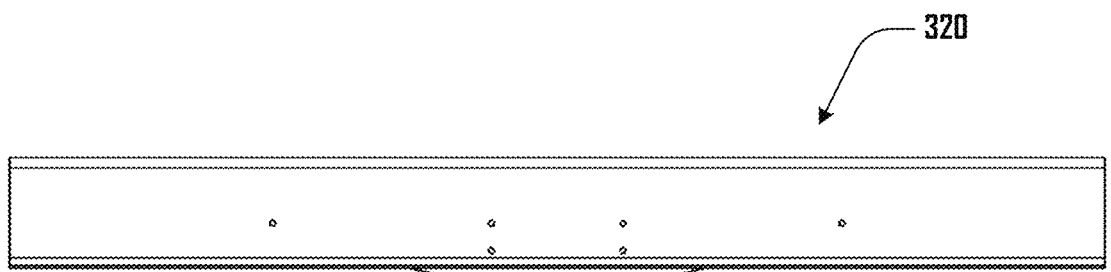
Figure 26C:
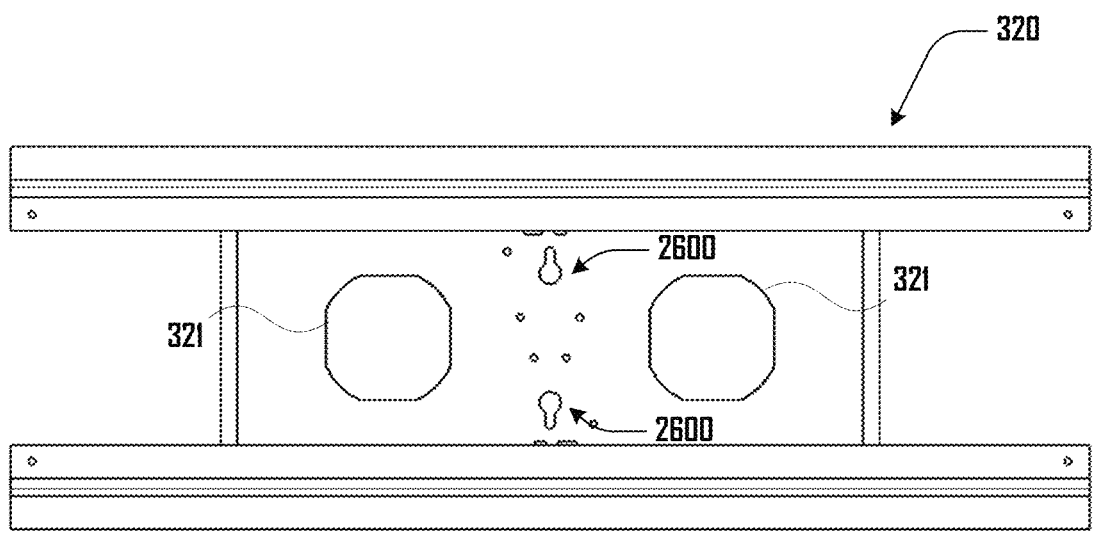
Figure 27A:
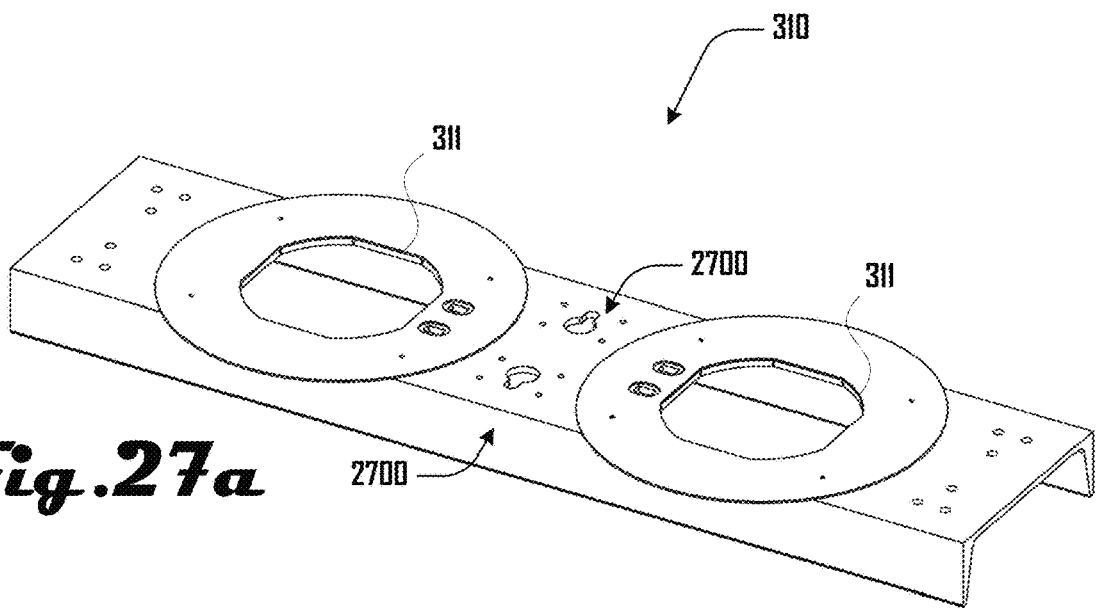
FIGS. 27a, 27b and 27c illustrate a base plate in accordance with another embodiment.
Figure 27B:
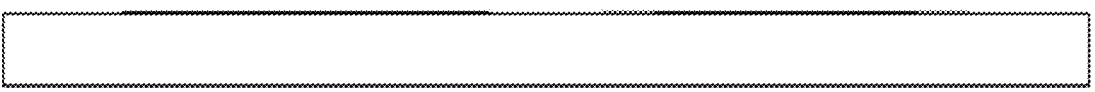
Figure 27C:
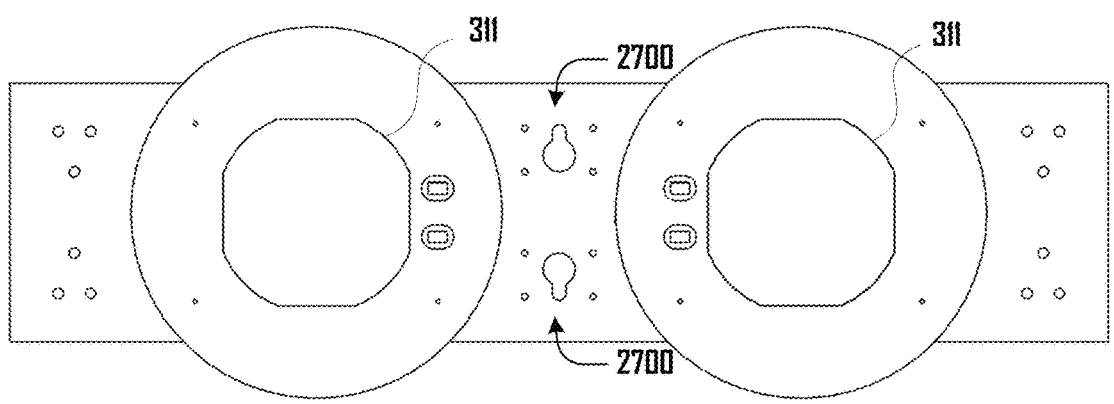
Figure 28A:
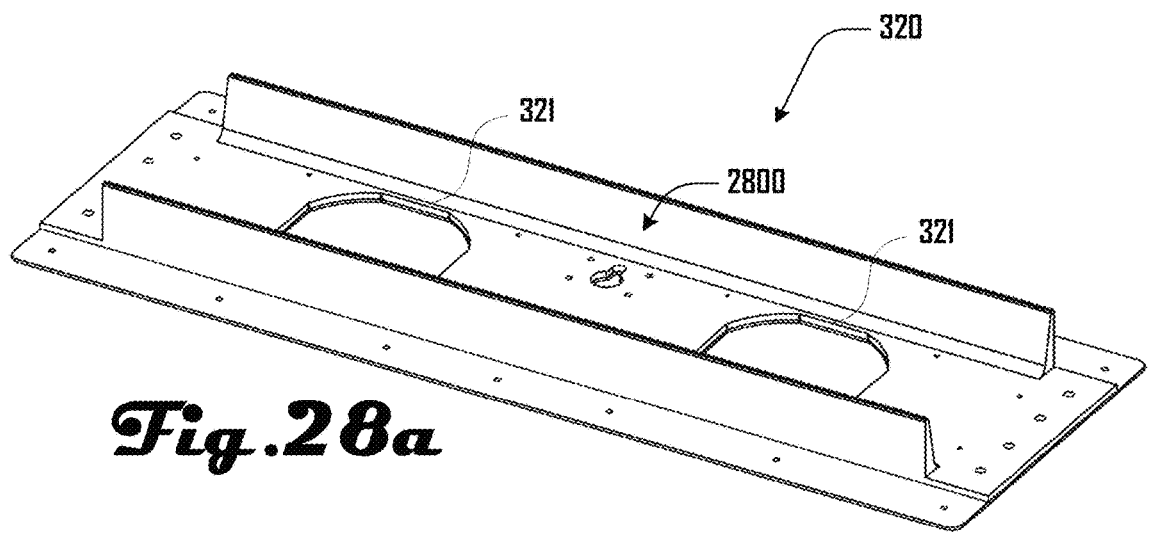
FIGS. 28a, 28b and 28c illustrate a top plate in accordance with yet another embodiment.
Figure 28B:
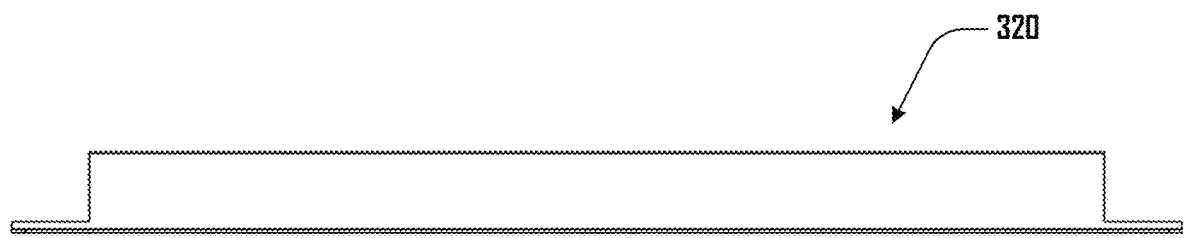
Figure 28C:
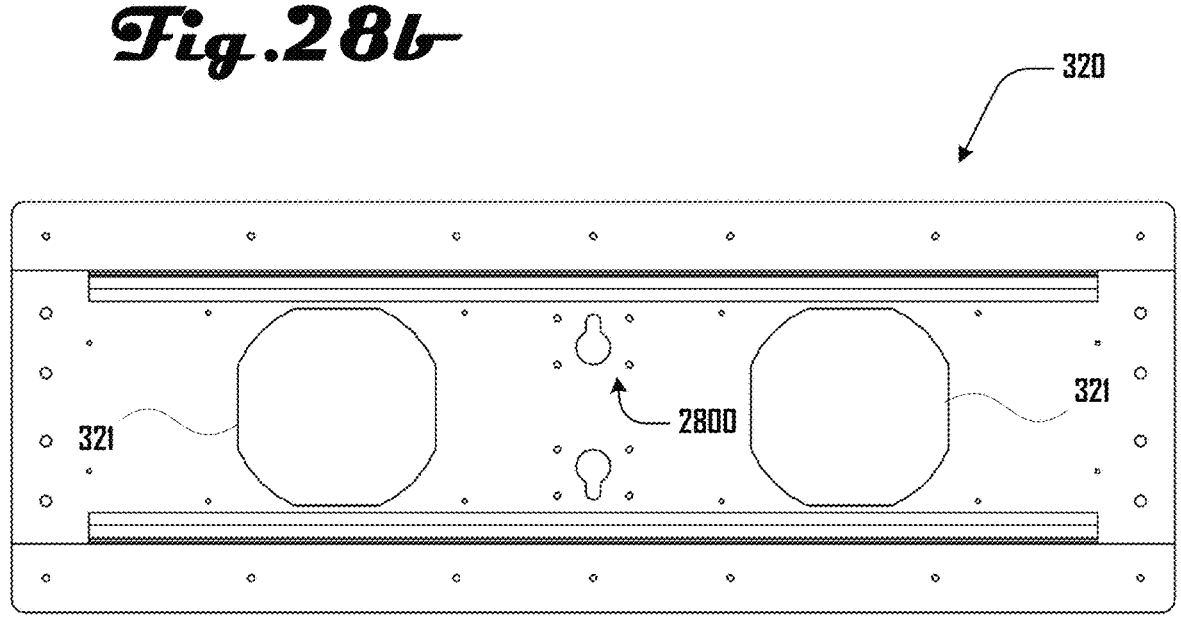

Although certain example embodiments of bellows 100 are illustrated herein, these example embodiments should not be construed to be limiting on the wide variety of bellows shapes, sizes and geometries that are within the scope and spirit of the present invention, including bellows 100 illustrated in FIGS. 20a and 20b. For example, in some embodiments, convolutions can have varying size and shape, including varying in a pattern, or the like. Additionally, the bellows 100 can have a curved or rounded contour as shown in FIGS. 1a, 1b, 2a and 2b, or can include edges, square portions, or the like.

Figure 4:
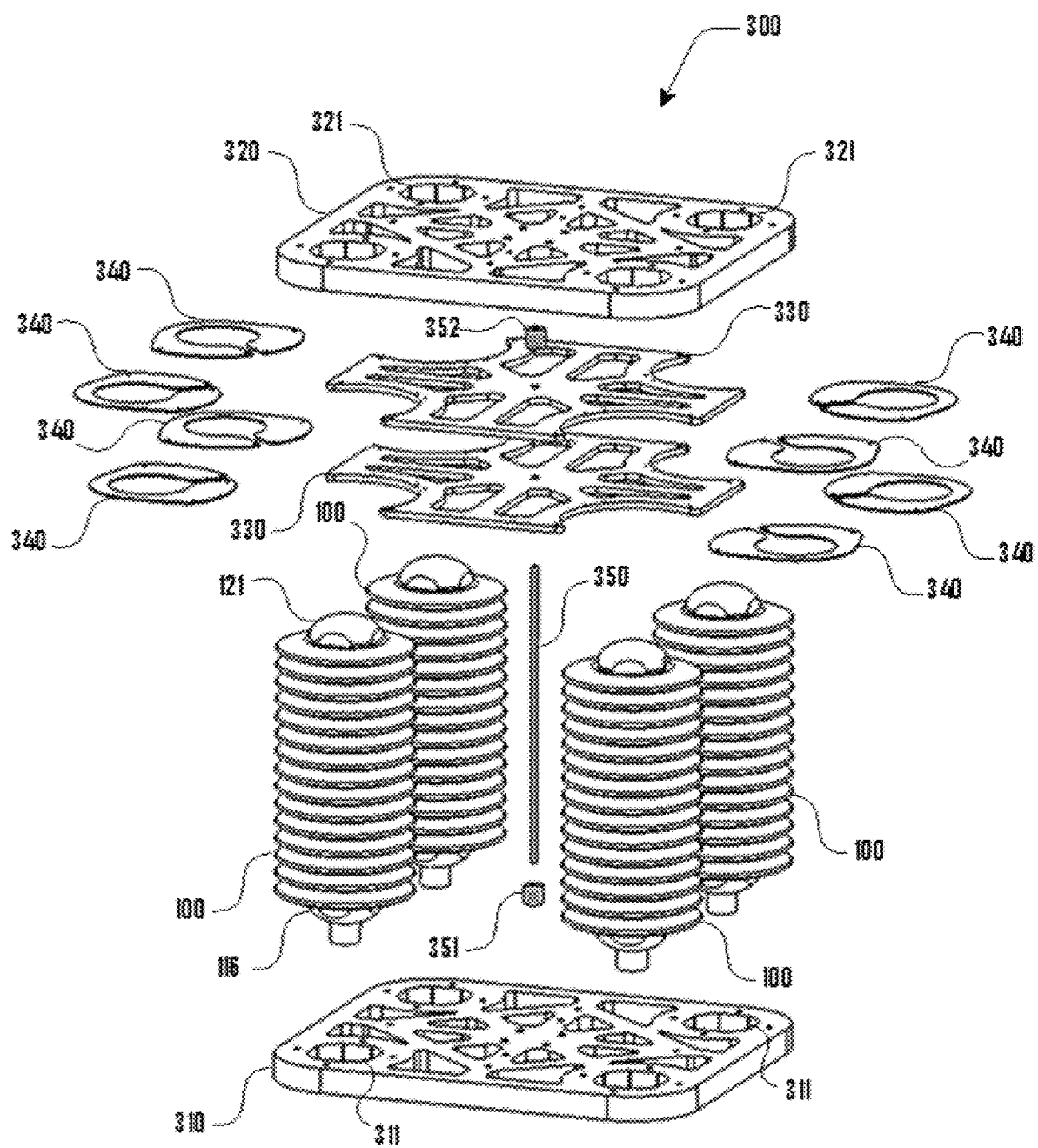
FIG. 4 is an exemplary exploded perspective drawing illustrating the actuator assembly of FIG. 3.

Turning to FIGS. 3 and 4, bellows 100 can be a portion of an actuator assembly 300. As shown in FIGS. 3 and 4, the actuator assembly 300 can include four spaced-apart bellows 100 that each extend between a bottom plate 310 and a top plate 320. A plurality of constraint-panels 330 can extend between and support the bellows 100. A plurality of washers 340 can surround and be coupled with a portion of the bellows 100. Additionally, a flexure 350 can extend between the bottom and top plates 310, 320 and be coupled thereto via respective bolts 351, 352 (shown in FIG. 4).

Figure 19A:
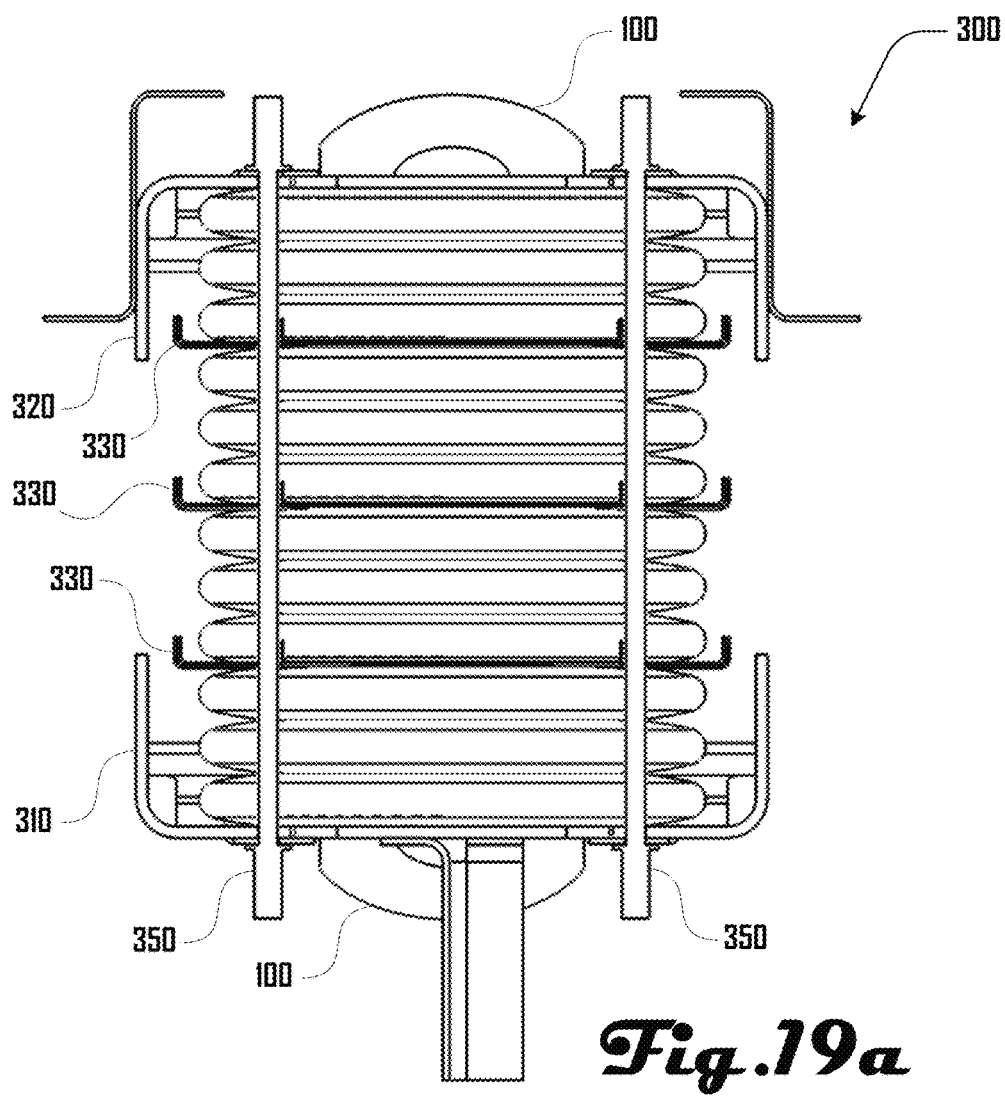
FIGS. 19a and 19b illustrate an example embodiment of an actuator assembly having two bellows.
Figure 19B:
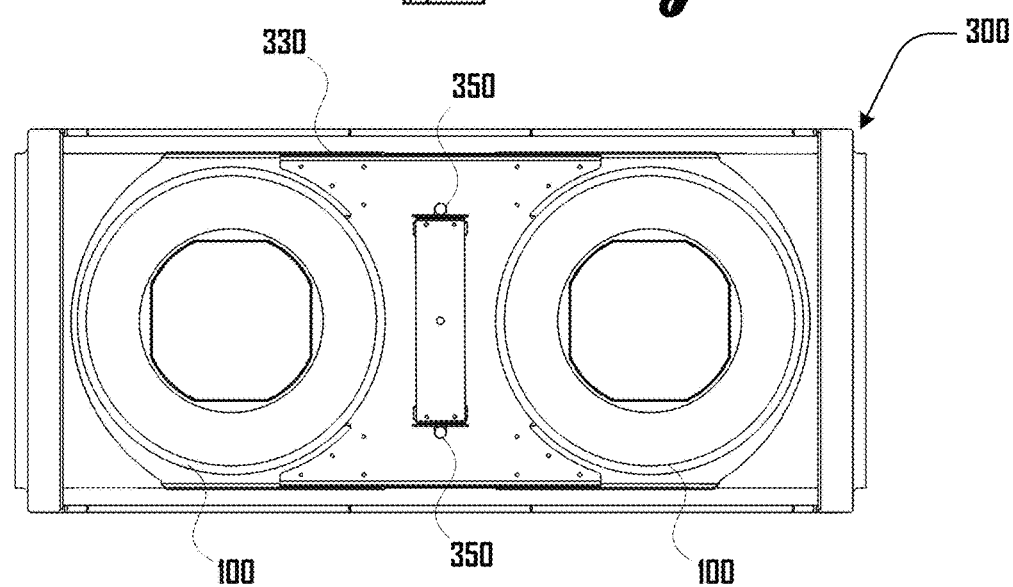

The flexure 350 may be captured by the washers 340 or support panels 330, thereby constraining them to constituent bellows 100 of the actuator assembly. For example, FIGS. 19a and 19b illustrate example embodiments of an actuator assembly 300 that includes two bellows 100, a plurality of support panels 330 that engage a portion of the bellows 100, where flexures 350 are captured by the support panels 330.

In various embodiments, the top and bottom heads 116, 121 of the bellows 100 can reside within respective coupling-holes 311, 321 of the top and bottom plates 310, 320. In other words, the bottom-heads 116 of the bellows 100 can extend into and couple with bottom coupling-holes 311 of the bottom-plate 310 and the top-heads 121 of the bellows 100 can extend into and couple with top coupling-holes 321 of the top plate 320. In various embodiments, the truncations 117, 121 of the top and bottom heads 116, 121 can correspond to and couple with the shape of the coupling-holes 311, 321 so as to reduce or prevent rotation of the bellows within the coupling-holes 311, 321. Additionally, inflation of the bellows 100 can expand the top and bottom heads 116, 121 so that the top and bottom heads 116, 121 further engage and couple with the coupling-holes 311, 321. Retaining features may be formed into the bellows 100, including at the top and bottom heads 116, 121 to index or to engage with the top plate, manufacturing jig, test fixture or the like. (e.g., FIG. 1a, 1b, 20a, or 20b)

In various embodiments, the top and bottom plates 310, 320 can comprise any suitable material, including a polymer, metal, wood, composite material, a combination of materials, or the like. Additionally, although a specific configuration of the top and bottom plates 310, 320 is shown herein, further embodiments can include plates having any suitable configuration. For example, various suitable embodiments of the top and bottom plates 310, 320 can be configured to interface with the bellows 100 and also distribute a point load from the flexure 350. Plates 310, 320 can also comprise and leverage existing structures, such as mounting piles, spanning beams or the like.

Top and bottom plates 310, 320 can be made in any suitable way. For example, in one embodiment, a cold rolling process can be used in conjunction with metal stamping to create a C-channel plate with the appropriate interfacing features for the top and bottom plates 310, 320 as described herein. Plates 310, 320 may also be formed of standard hot and cold rolled sections. Plate features may be die cut, CNC punched, laser cut, waterjet cut, milled or any other suitable subtractive manufacturing method. A plate 310, 320 may also comprise multiple standard sections or custom formed parts. Plates of this nature may be bonded together with a variety of fasteners including rivets, nuts and bolts, welds or the like. For example, top and bottom plates 310, 320 in accordance with a further embodiment are illustrated in FIGS. 21, 22a-c, 23a-c, 24, 25a-c, 26a-c, 27a-c, and 28a-c.

In another embodiment, manufacture of the top and bottom plates 310, 320 can include the creation and processing of composite panels. For example, a composite top or bottom plate 310, 320 can comprise a multi-material sandwich plate that takes advantage of a light weight and inexpensive core material and the stiffness and strength of thinner sheets of skin material that can adhere to either side of the core substrate. Such composite paneling is often used as high stiffness, high strength, low weight, low cost flooring or construction material.

In some embodiments, a composite top or bottom plate 310, 320 can comprise a honeycombed polymer core that can take compressive and shear loads, sandwiched between two metal skins that can bear the high tensile stresses caused by bending. It is possible to bind the top or bottom plate 310, 320 with bolts, heated staked columns, ultrasonic welding, or the top or bottom plates 310, 320 can be assembled with an adhesive.

Utilizing metal stamping, top and bottom plates 310, 320 can be produced having multi-planar curvature stamped metal skins and an injection molded polymer core. The structure that such geometry creates can give greater stiffness to a top and bottom plate 310, 320 per the volume of material used and provides an opportunity to cut down on the expensive metal skin material. Stiffening features such as ribs, bosses, deep drawn pockets and webbing can also be incorporated into the design of top and bottom plates 310, 320 in some embodiments.

In some embodiments, the plates 310, 320 need not be single planar elements. For instance, the bottom plate 320 can be two individual surfaces each parallel to the two opposing flanges of the post 710 such that the bellow interfaces point 180 degrees away from one another rather than 0 degrees as in previous configurations. The body of each of the bellows 100 then would bend through 90 degrees to meet the top plate 310 when the actuator is level. In this case, the plate may not be a bending element, but instead be compressive. The plates 310, 320 may also take a V-shape with major angle dictated by the desired range of motion of the actuator.

Figure 29A:
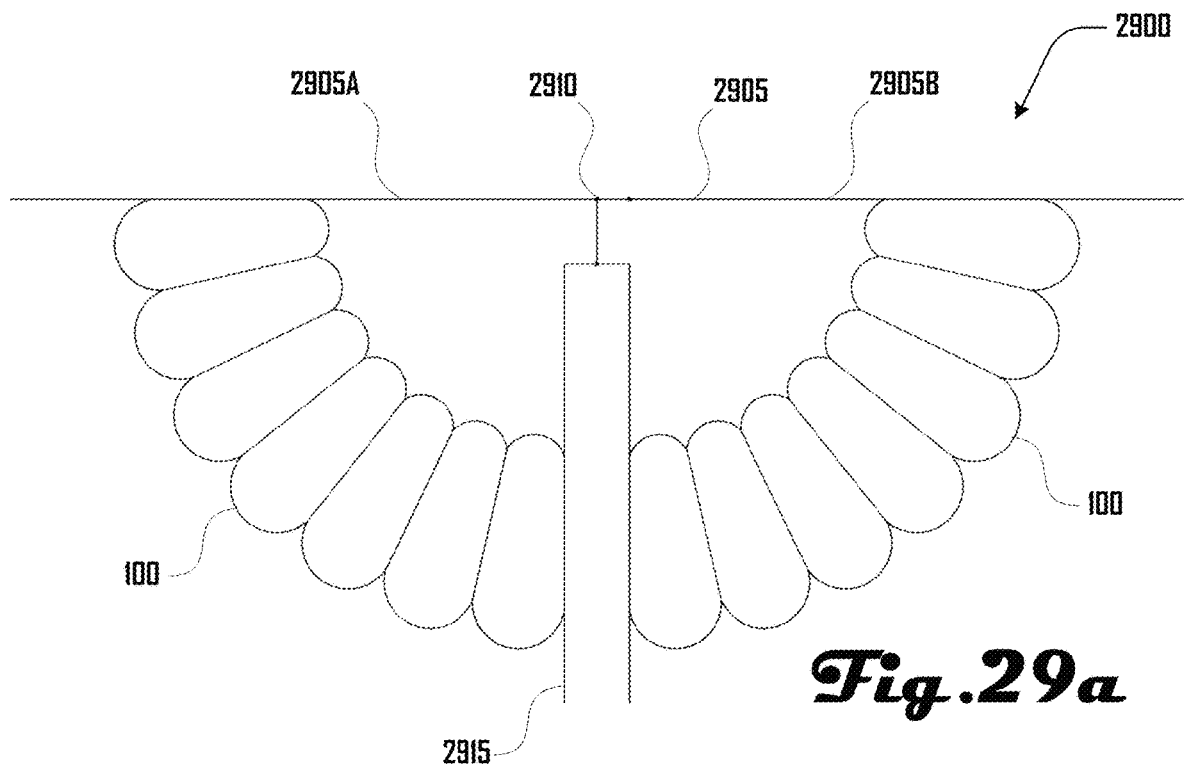
FIGS. 29a and 29b illustrate an example embodiment of a V-plate actuator in a first and second configuration.
Figure 29B:
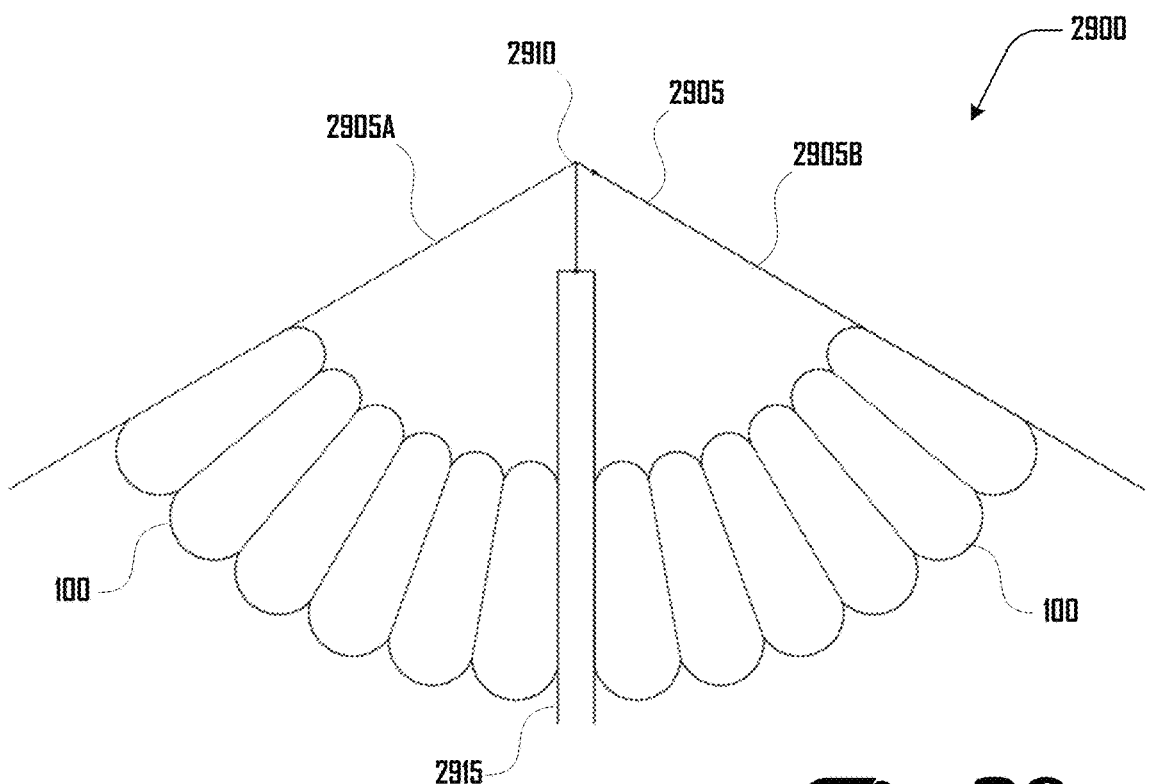

For example, FIGS. 29a and 29b illustrate an actuator assembly 2900 in accordance with a further embodiment that includes a top plate 2905 having a first and second portion 2905A, 2905B that are rotatably coupled at a joint 2910. A first and second bellows 100 are coupled to respective bottom sides of the first and second portions 2905A, 2905B and to a side of a post 2915. As illustrated in FIG. 29a, the pile, 2915 can be a compressive element against which the bellows 100 react. Top plate 2905A and B can be designed to be either flat as shown in FIG. 29a, or at an angle up to 90 degrees to one another as shown in 29b. In various embodiments, the angle between these two plates does not change with the motion of the tracker, rather their angle with respect to each other can be adjusted at design time to alter the range of motion and length of each bellows 100.

In various embodiments, it can be desirable to constrain the bellows 100 from buckling and/or squirming as the bellows 100 are inflated and/or deflated within the actuator assembly 300 or as external loads are applied, and it may be desirable to constrain the bellows 100 in relation to adjacent bellows 100 and radially about the flexure 350. Accordingly, in some embodiments, the bellows 100 can be constrained with one or both of the constraint-panels 330 and washers 340. For example, as shown in FIG. 3, the washers 340 can reside within a root portion 112 of the bellows 100 and be configured to constrain movement of the bellows 100. Additionally, the washers 340 can also be configured to slidably reside on the constraint-panels 330, which further provides for constraint of the bellows 100 as the bellows 100 are inflated and/or deflated within the actuator assembly 300.

Figure 30A:
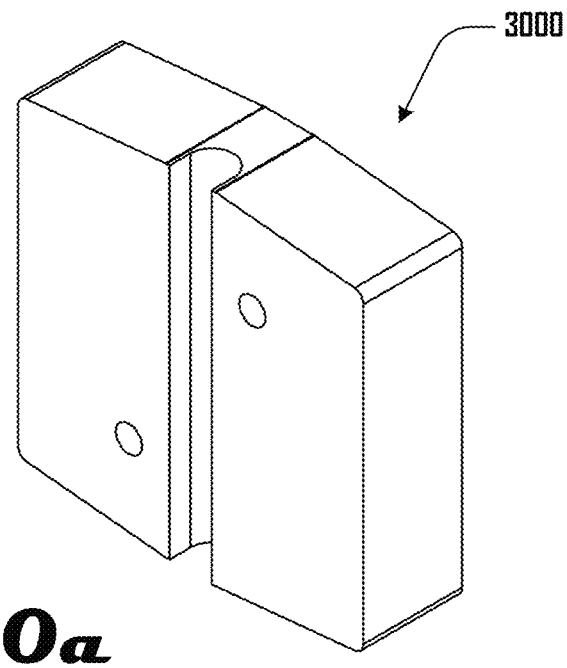
FIGS. 30a and 30b illustrate a flexure spacer in accordance with one embodiment.
Figure 30B:
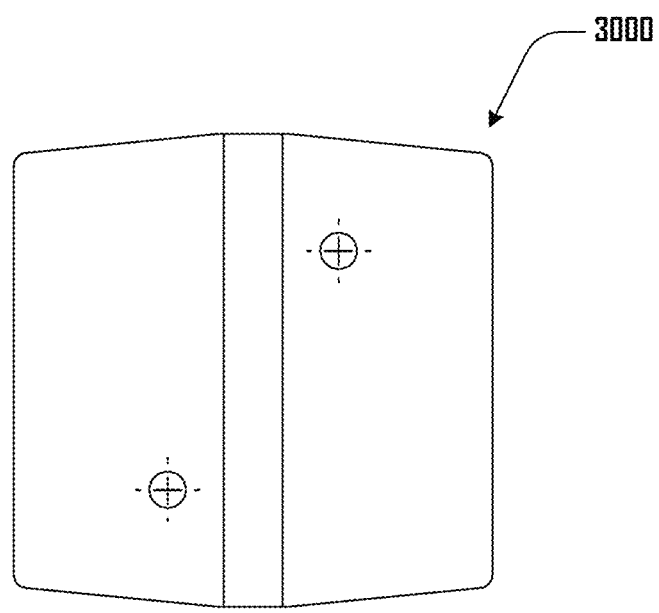

The washers 340 may be fixed in position about the neutral axis of the flexure as an alignment control measure. This may be accomplished with insert blocks, adhesives, features molded into the washers, flexure or plate. These items may be part of pre-produced sub assembly, or attached after shipping to the installation location. In some embodiments, these items may be designed to serve multiple purposes including: act as hard stops, limit lateral and transverse bending, bear dead and design loads for instances where bellows are unpressurized or under-pressurized. In one such embodiment, for a single axis configuration, blocks with flanges tapered to fit the range of motion of the actuator may be inserted between the constraining panels and capturing the central flexure. These blocks may be placed between two flexures in the single axis set up, or to the outside of them. These blocks may be made of polymer, solid or bent sheet metal, or any other suitable material and formed in any suitable manner. For example, one embodiment of a flexure spacer 3000 is illustrated in FIGS. 30a and 30b. Another embodiment of a flexure spacer 2400 is illustrated in FIG. 24. Additionally, example embodiments of flexure coupling slots 2500, 2600, 2700, 2800 are illustrated respectively in FIGS. 25a, 25c, 26a, 26c, 27a, 27c, 28a and 28c.

Although the actuator assembly 300 of FIGS. 3 and 4 is shown as having eight washers 340 and two constraint-panels 330, further embodiments can be absent of constraints or can have any suitable number of such constraints. For example, in one embodiment, washers 340 can be associated with each root portion 112 of a bellows 110. The number of constraints can be selected based on a maximum operating pressure of the bellows 100, a desired stiffness of the bellows 100, anticipated external loading via wind, or the like. Additionally, the design of the constraint-panels 330 and washers 340 shown in FIGS. 3 and 4 should not be construed to be limiting on the many types of possible constraints that can be applied to an actuator assembly 300 in further embodiments. For example, further embodiments can include constraints that include a wire, a rope, a polymer microfilament, or the like (e.g., as illustrated in FIGS. 33a and 33b). Further embodiments can include constraints that are integrated into the body of the bellows 100 (e.g., molded into the bellows 100).

In various embodiments, the flexure 350 can be a tensile flexure that bears antagonistic forces of the actuator assembly 300 as the bellows 100 are inflated and/or deflated, while also providing for bending or flexing in response to movement of the actuator assembly 300 as discussed in further detail herein. In some embodiments, the flexure 350 can comprise a flexible galvanized steel wire rope that is coupled to the top and bottom plates 310, 320 via crimped Nicopress fittings or any other suitable wire rope fitting. In further embodiments, the flexure 350 can comprise a universal ball joint, a fiberglass rod, a Spectra cord, a Dyneema cord, a spring steel flexure, a pivot flexure, a tetrahedral linkage, or the like. Additionally, there may be multiple flexures. For example, two tensile flexures are used in a single axis configuration.

Figure 8:
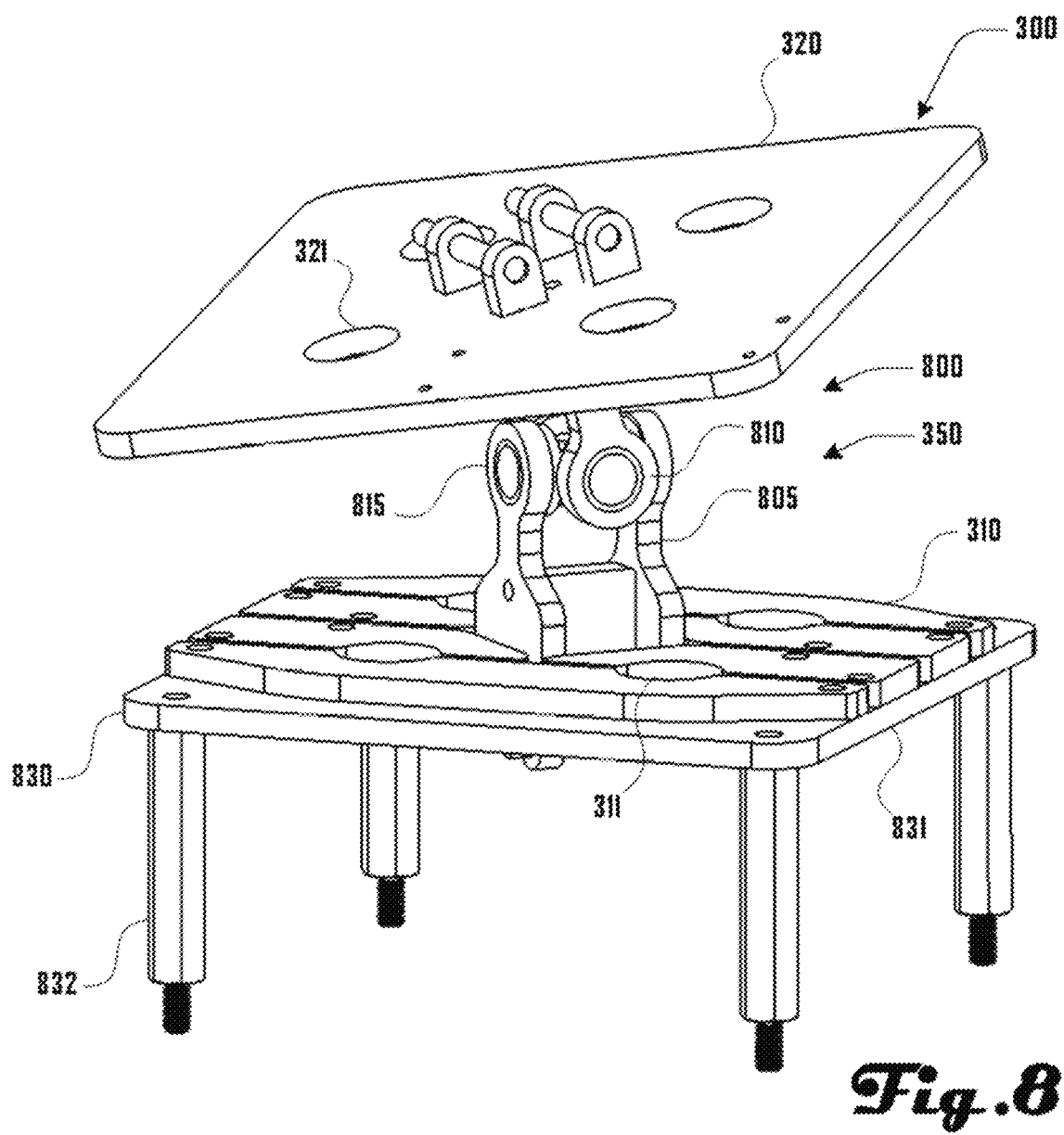
FIG. 8 is a perspective drawing of a portion of an actuator assembly and a base in accordance with an embodiment.

In another embodiment, as shown in FIG. 8, the flexure 350 can comprise a universal joint 800 defined by a first and second arm 805, 510 that are respectively coupled to the top and bottom plates 310, 320 and coupled to each other via a pair of axles 815. As shown in this embodiment, the actuator assembly 300 can be disposed on a table stand 830 defined by top 831 and a plurality of legs 832 that extend downward from the top 831.

Figure 5A:
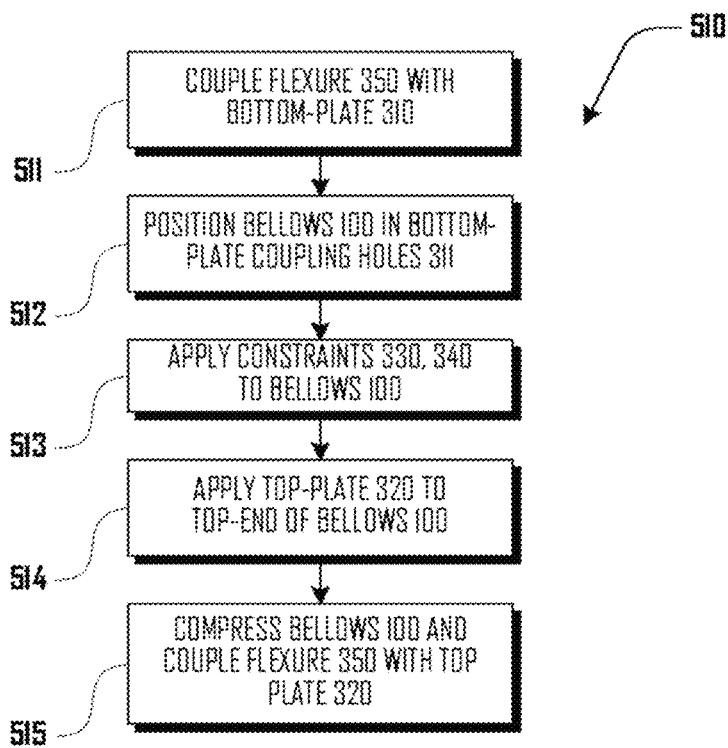
FIG. 5a is a flow diagram of a method of building an actuator assembly.

An actuator assembly 300 can be assembled in various suitable ways. For example, FIG. 5a, illustrates a method 510 for assembling an actuator assembly 300 in accordance with one embodiment. The method 510 begins in block 511, where the flexure 350 is coupled with the bottom-plate 310, and in block 512, the bellows 100 are positioned in the coupling holes 311 of the bottom plate 310. For example, as discussed herein, the bottom head 116 of each bellows 100 can be inserted into a respective coupling hole 311 of the bottom plate 310.

In block 513, constraints such as the constraint-panels 330 and/or washers 340 can be applied to the bellows 100, and in block 514 the top plate 320 is applied to the top end 120 of the bellows 100. For example, as discussed herein, the top-heads 121 of the bellows 100 can be inserted into respective coupling holes 321 of the top plate 320. In block 515, the bellows 100 are compressed and the flexure 350 is coupled with the top plate 320. For example, in some embodiments, the flexure 350 can be coupled via a Nicopress fitting, via swaging, via a Spelter socket, or the like.

Figure 31A:
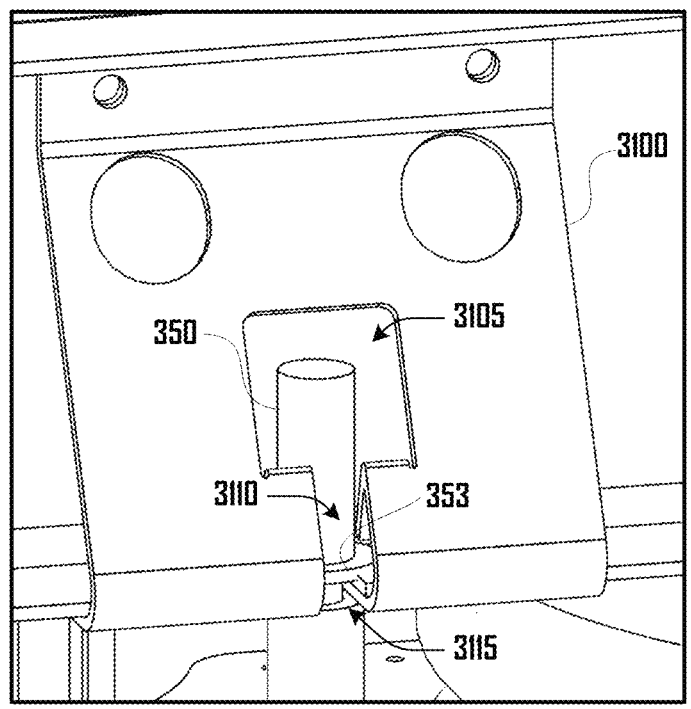
FIGS. 31a and 31b illustrate two example embodiments of flexure captures.

An actuator assembly 300 can also comprise snap-in connections, twist-in connections, one way push-in barb connections, toggle locks or any other suitable mechanism or connection to facilitate quick and inexpensive assembly of an actuator assembly 300. For example, flexure coupling slots 2500, 2600, 2700, 2800 are illustrated respectively in FIGS. 25a, 25c, 26a, 26c, 27a, 27c, 28a and 28c. Additionally, an example of a flexure capture 3100 is illustrated in FIG. 31a, which includes a large slot 3105, and a smaller slot 3110, which allows corresponding portions of a flexure 350 to pass through the large and smaller slots 3105, 3110, with a flange 353 of the flexure 350 being captured at a catch portion 3115.

Figure 31B:
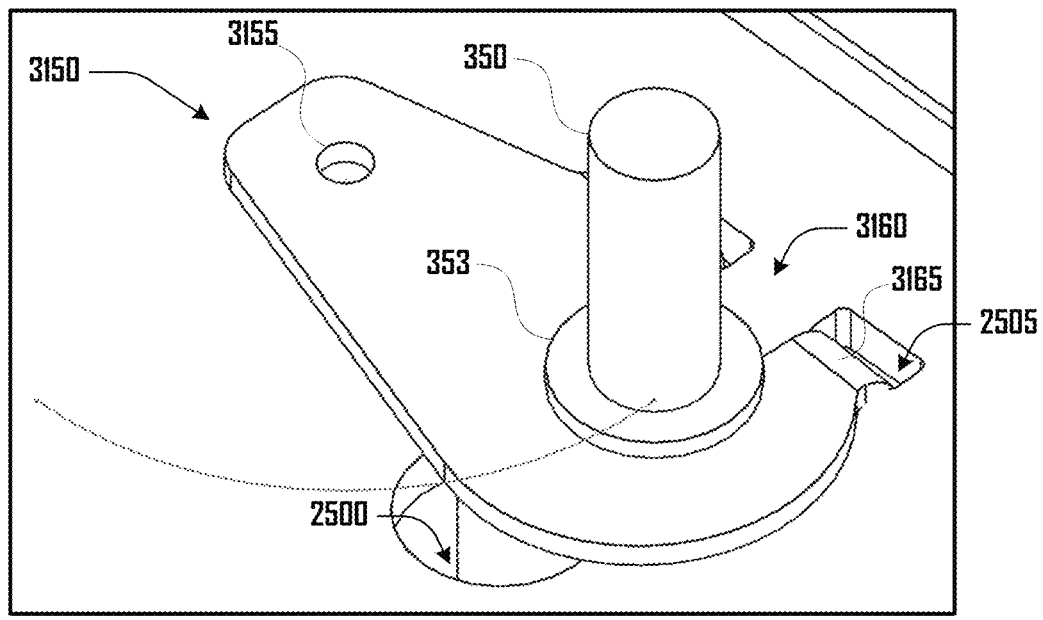

In another example, a swivel capture 3150 is illustrated in FIG. 31b, which can comprise a capture slot 3160, and a pair of capture legs 3165. The swivel capture 3150 can be rotatably coupled to one of a top and/or bottom plate 310, 320 and be configured to capture and hold a portion of the flexure 350 within the capture slot 3160, within a flexure coupling slot 2500, and being retained via a flange 353 of the flexure 350. The legs 3165 can lock within respective leg coupling slots 2505.

Figure 5B:
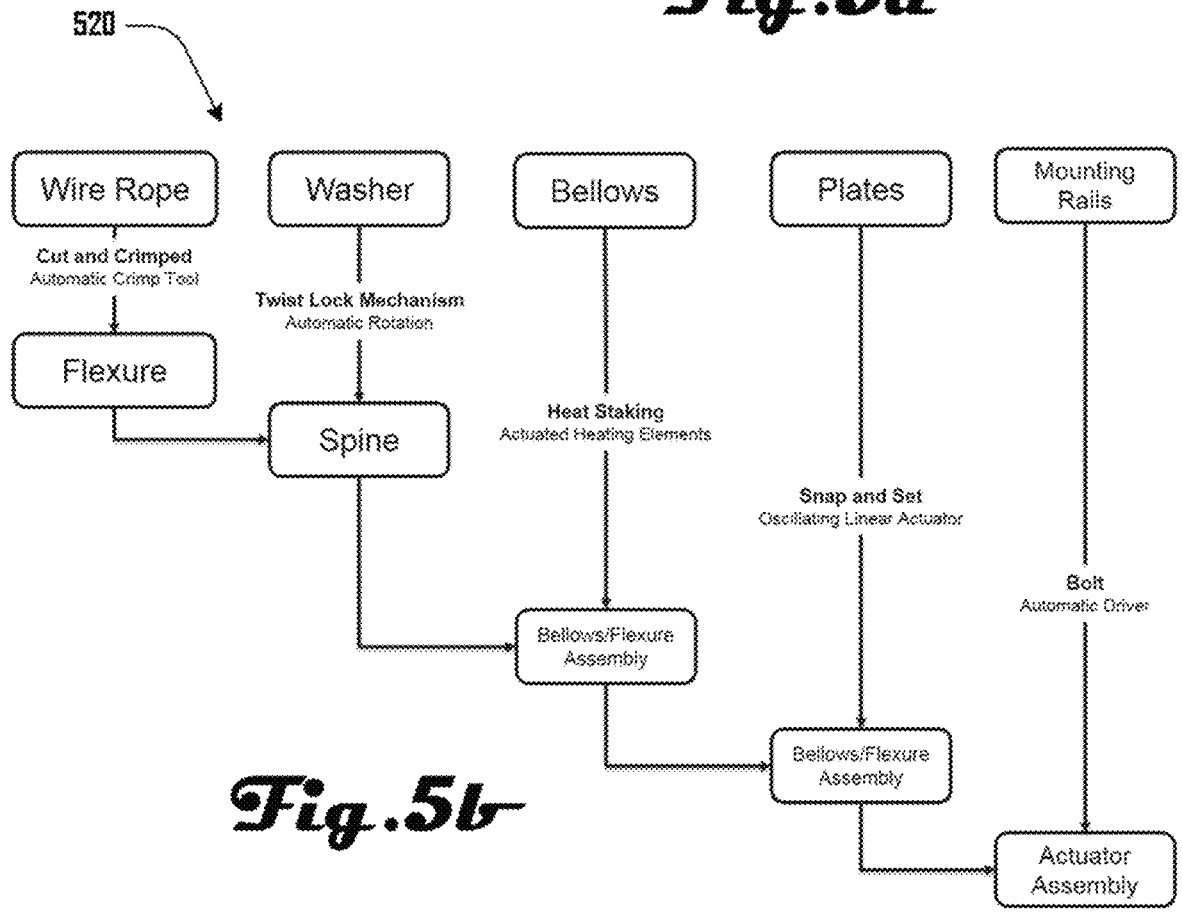
FIG. 5b is another flow diagram of a method of building an actuator assembly.

In some embodiments, the actuator assembly 300 can be constructed with an automated assembly process. For example, FIG. 5b illustrates flow diagram of a method 520 of automated assembly of the actuator assembly 300. As illustrated in FIG. 5b, the method 520 includes a flexure assembly that includes a stripping and crimping a wire rope with an automated cut and crimp machine.

The method 520 includes an inner washer attachment step that includes interior washers being threaded over the crimp and onto the wire flexure 350. The flexure 350 is also twisted to lock the washers into place.

The method 520 includes a bellows integration step where outer washers are placed around the bellows 100 and heat staked to the interior bellows 100. The bellows 100 are now attached to each other and the tensile member via the constraining washers.

Turning to FIG. 6, the actuator assembly 300 can move to assume a plurality of configurations based on the inflation and/or deflation of the bellows 100. For example, the actuator assembly 300 can assume a first configuration A, where a plane TO of the top-plate 320 is parallel to a plane BA of the base-plate 310. In this first example configuration A, the bellows 100 are of equal length and have a straight central axis CE that is perpendicular to top and bottom planes TO, BA. In such a configuration, the bellows 100 can be at a neutral pressure, partially inflated, or partially deflated.

The actuator assembly 300 can also assume example configurations B and C. In such configurations B, C, the top-plate 320 is in a configuration where the plane TO of the top-plate 320 is no longer parallel to the plane BA of the base plate 310. For example, in configuration B, a first bellows 100A is expanded compared to the configuration A, whereas a second bellows 100B is compressed compared to configuration A. The central axes CE of the first and second bellows 100A, 100B become curved. Accordingly, the relative expansion and compression of the first and second bellows 100A, 100B in configuration B rotates the plane TO of the top plate 320 to the right. In such a configuration, the first bellows 100A can be more inflated compared to the first configuration A, and the second bellows 100B can be less inflated compared to the first configuration A.

In contrast, in configuration C, the second bellows 100B is expanded compared to the configuration A, whereas the first bellows 100A is compressed compared to configuration A. The central axes CE of the first and second bellows 100A, 100B are curved. Accordingly, the relative expansion and compression of the first and second bellows 100A, 100B in configuration C rotates the plane TO of the top plate 320 to the left. In such a configuration, the second bellows 100B can be more inflated compared to the first configuration A, and the first bellows 100A can be less inflated compared to the first configuration A.

Accordingly, by selectively inflating and/or deflating the bellows 100 of the actuator assembly 300, the plane TO of the top-plate 320 can be moved to various desired positions. In embodiments having four bellows 100 as shown in FIGS. 3, 4 and 6, such selective inflation and/or deflation of the bellows 100 provides for movement of the top-plate 320 in two axes. FIG. 32 illustrates and alternative embodiment of the actuator assembly 300, which comprises hard stops 3200 as discussed above.

Figure 7A:
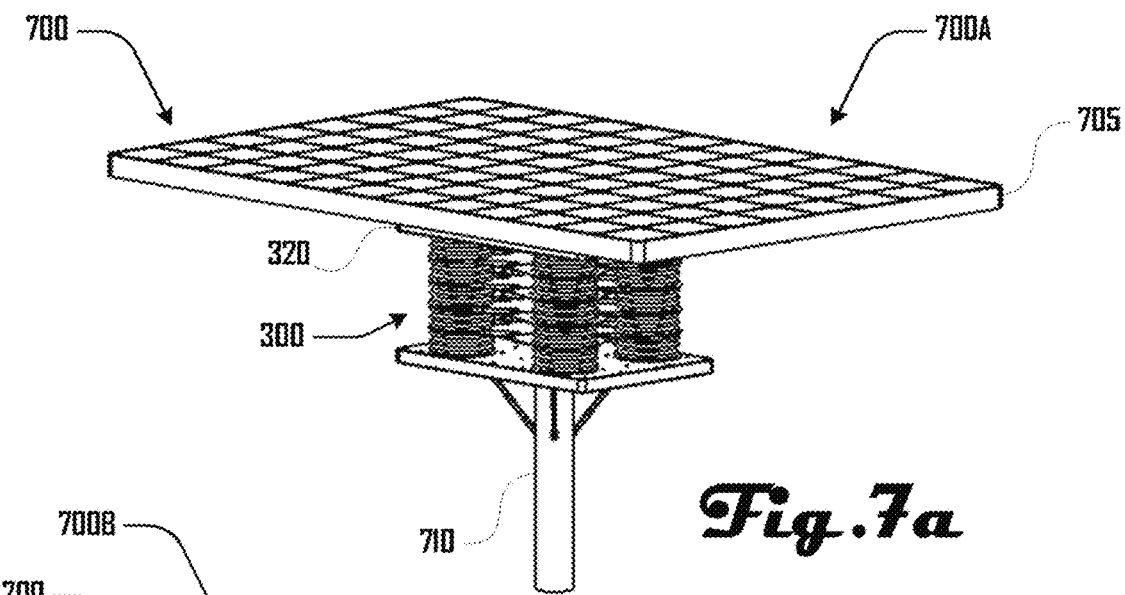
FIGS. 7a, 7b and 7c are perspective drawings of an actuator assembly coupled with a solar panel and various bases in accordance with some embodiments.
Figure 7B:
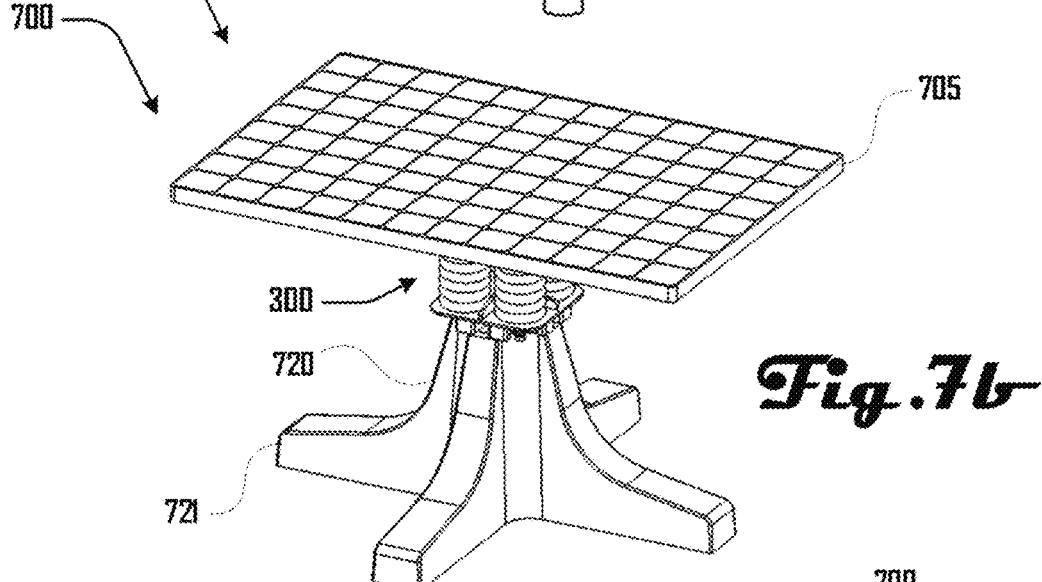
Figure 7C:
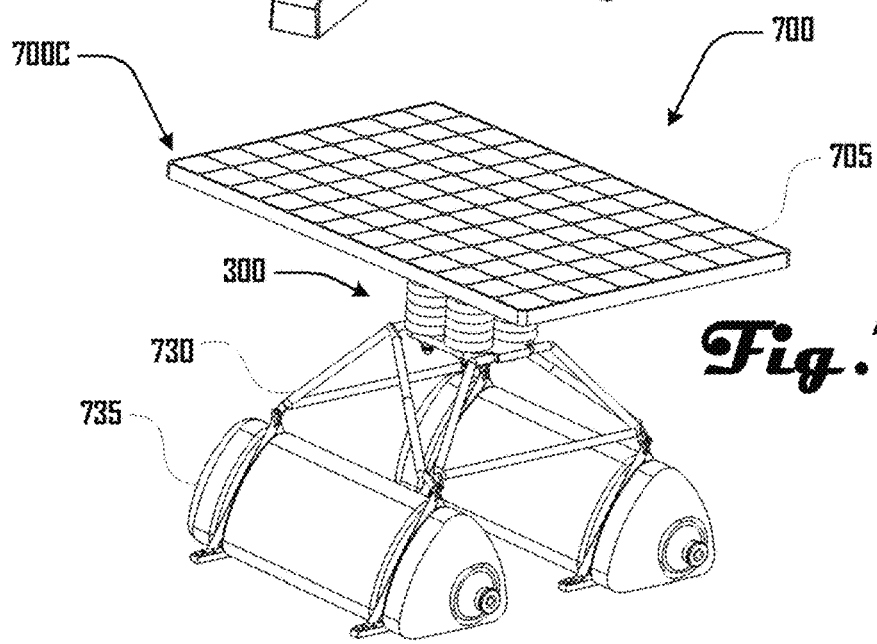

In one application, as illustrated in FIGS. 7a-c, the actuator assembly 300 can be used to move and position a solar panel 705 that is coupled to the top-plate 320. Accordingly, FIGS. 7a-c illustrate three example embodiments 700A, 700B, 700C of a solar-actuator assembly 700. For example, in a first embodiment 700A, as shown in FIG. 7a, the solar-actuator assembly 700 can include a post 710 that the actuator assembly 300 rests on. The post 710 can be held by a base or disposed in the ground (e.g., via a ground post, ground screw, or the like) in accordance with some embodiments. This post can be driven into the ground at a variable length depending on loading conditions at the site. The post can be a steel component with an I, C, hat, or other cross section. The post can be treated with zinc plating, hot dip galvanizing, or some other method for corrosion resistance.

In a second embodiment 700B, as shown in FIG. 7b, the solar-actuator assembly 700 can include a base 720 that comprises a plurality of legs 721. In a third embodiment 700C, the solar-actuator assembly 700 can include a base architecture 730 that holds one or more weights 730. In one embodiment, the weights 735 can comprise tanks that can be filled with fluid such as water. Such an embodiment can be desirable because the solar-actuator assembly 700C can be lightweight for transport and then secured in place by filling the weights 735 with water or other ballast at a desired location.

Although various example embodiments herein describe use of an actuator assembly 300 with solar panels 705, in further embodiments, an actuator assembly 300 can be used to actuate or otherwise move any other suitable object, including concentrators, reflectors, refractors, and the like.

In further embodiments, the actuator assembly 300 can comprise one or more hard stop (not shown) that can be configured to prevent the actuator assembly 300 from overextending. For example, in some embodiments, the actuator assembly 300 can comprise one or more tensile rope or webbing coupled to and extending between the top and bottom plates 310, 320. In another example, positive bosses can be provided as part of the actuator assembly 300 or proximate to the actuator assembly 300 such that contact with the bosses constrains the range of motion of the actuator assembly 300. In various embodiments, such hard stops can be beneficial for preventing damage to the actuator assembly 300 in high winds or exposure to other forces that might over-extend the actuator assembly 300. Pressurizing against a hard stop may also prevent excitation of destructive resonant frequencies induced by oscillatory loads (such as wind). In some embodiments, it can be beneficial to stow the actuator assembly 300 against a hard stop when exposure to undesirable forces is anticipated (e.g., during a storm, or the like). These hard stops can also have a locking feature in order to stop all movement of the tracker when hit. This can serve as a stow mechanism that will further prevent damage to the tracker in a high wind event.

In some embodiments, a two-axis actuator assembly 300 can include a number of hard stops, for example eight natural stops (e.g., at N, NE, E, SE, S, SW, W, NW). As discussed in more detail herein, a single axis actuator assembly 300 can include two hard stops at two maximums of its range of motion. In further embodiments, the actuator assembly 300 can be stowed by raising the pressure of all bellows 100 in the actuator assembly 300 to increase the overall stiffness of the actuator assembly 300. Hard stops can also be locking, so that the stopping mechanism restricts movement in any direction, in order to stow the tracker securely. The locking mechanism can be actively or passively activated when the tracker reaches the hard stops. The locking mechanism can be activated when the tracker is at the extreme of any direction of its motion, or when it is at an intermediate point, for example, when the actuator is flat.

In one example embodiment, as illustrated in FIG. 32, the base plate 3100 can comprise hard stops 3200 that extend upward from the face of the base plate 320 and are configured to engage with a portion of the top plate 320. As shown in FIG. 32, a first hard stop 3200A provides a stop when the actuator assembly 300 assumes configuration C and a second hard stop 3200B provides a stop when the actuator assembly 300 assumes configuration B. As discussed herein, hard stops 3200 can be present in embodiments having two, four or any suitable number of bellows 100. Additionally, hard stops can be present on any suitable portion of the actuator assembly 300 including the top plate 320, or the like.

Stow, lockouts or hard stops can be provided in various suitable ways in accordance with further embodiments. For example, in one embodiment, there can be a separate actuator lockout for purposes of stow. For example, a separate small bellows can be used to actuate a locking mechanism that rigidly, or near rigidly, fixes and actuator assembly 300. In one embodiment, such a mechanism can comprise a pin that engages a corresponding hole or slot, or such a mechanism can comprise multiple pins or toothed arrangements that engage corresponding features enabling multiple locking positions. In another embodiment, such a mechanism can comprise corresponding brake pads that enable continuous locking independent of tracker position. Off-normal loading can also be used to engage a locking mechanism in accordance with some embodiments.

In some embodiments, a transverse plate tilt can be used for lock out, stow or the like. For example, using asymmetric application of springs on flexures, a transverse angle can be piloted by actuator force to engage a lockout for high load and/or low load situations. Collective bellows pressure above or below the corresponding flexure with spring force can thereby be used to engage a locking mechanism that fixes the tracker position for the purposes of stow. Off normal loading can also be used to engage the locking mechanism in accordance with some embodiments.

Figure 42A:
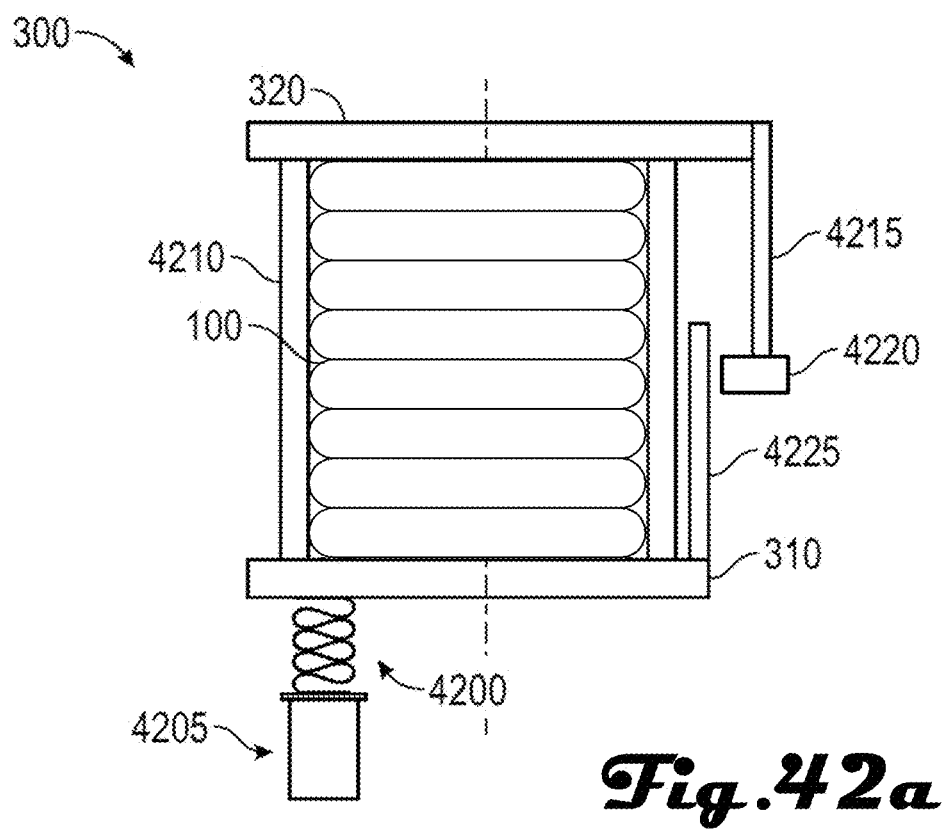
FIGS. 42a and 42b illustrate an example actuator assembly having a locking mechanism in accordance with one embodiment.
Figure 42B:
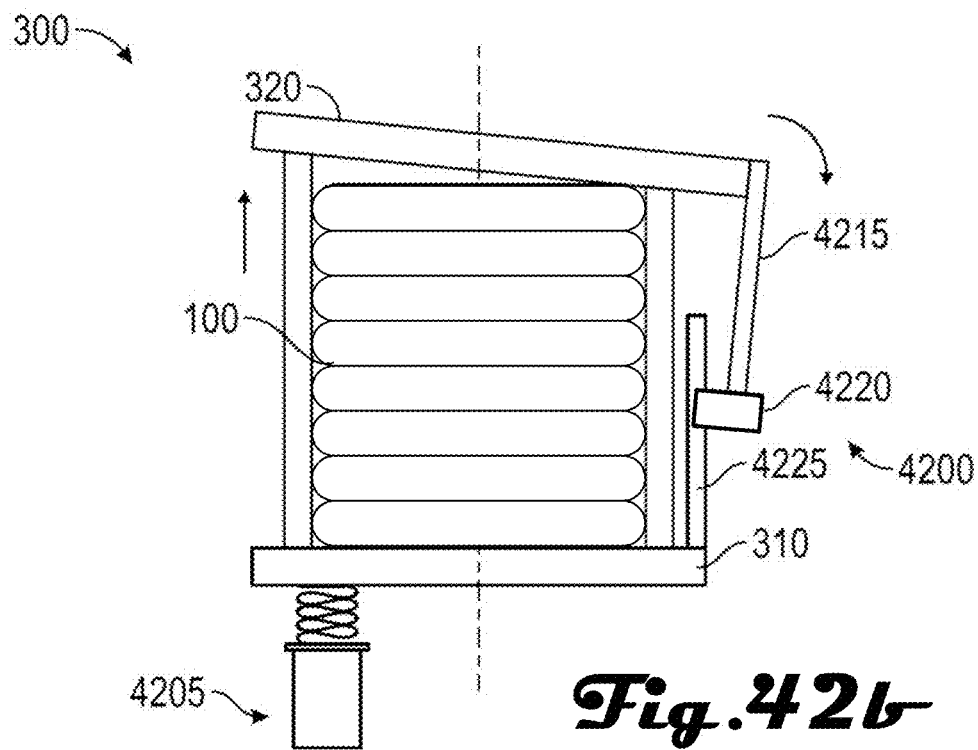

For example, FIGS. 42a and 42b illustrate an example of an actuator assembly 300 that comprises a bottom plate 310, a top plate 320, at least one bellows 100, and a locking assembly 4200. The locking assembly 4200 comprises a spring assembly 4205 that biases a shaft 4210 that is connected to a bottom portion of the top plate 320. A locking arm 4215 is coupled to the top plate 320 at a first end and includes a locking head 4220 at a second end, which is configured to engage a locking member 4225 that is coupled to and extends from the bottom plate 310.

FIG. 42a illustrates the locking assembly 4200 in an unlocked configuration, where the top and bottom plate 310, 320 are substantially parallel and the spring assembly 4205 is in and extended configuration. As illustrated in FIG. 42b, the top plate 320 can tilt relative to the bottom plate 310, which can cause the spring assembly 4200 to be compressed. Additionally, the locking head 4220 can engage the locking member 4225 when the top plate 320 is tilted, which can lock the top plate 320 in the tilted position, including being biased via the spring assembly 4205.

In further embodiments, a bar-linkage lockout can be used to stow or lock an actuator assembly 300. For example, in one embodiment, an actuator piloted four bar linkage can be used to lockout tracker motion. In such an embodiment, An over center four bar linkage between top and bottom plates 310, 320 can be used to fix the actuator assembly 300 position for the purpose of stow, and the like. Such a mechanism can be actuated by an external actuator, collective bellows pressure, off normal loading, or the like.

Figure 43:
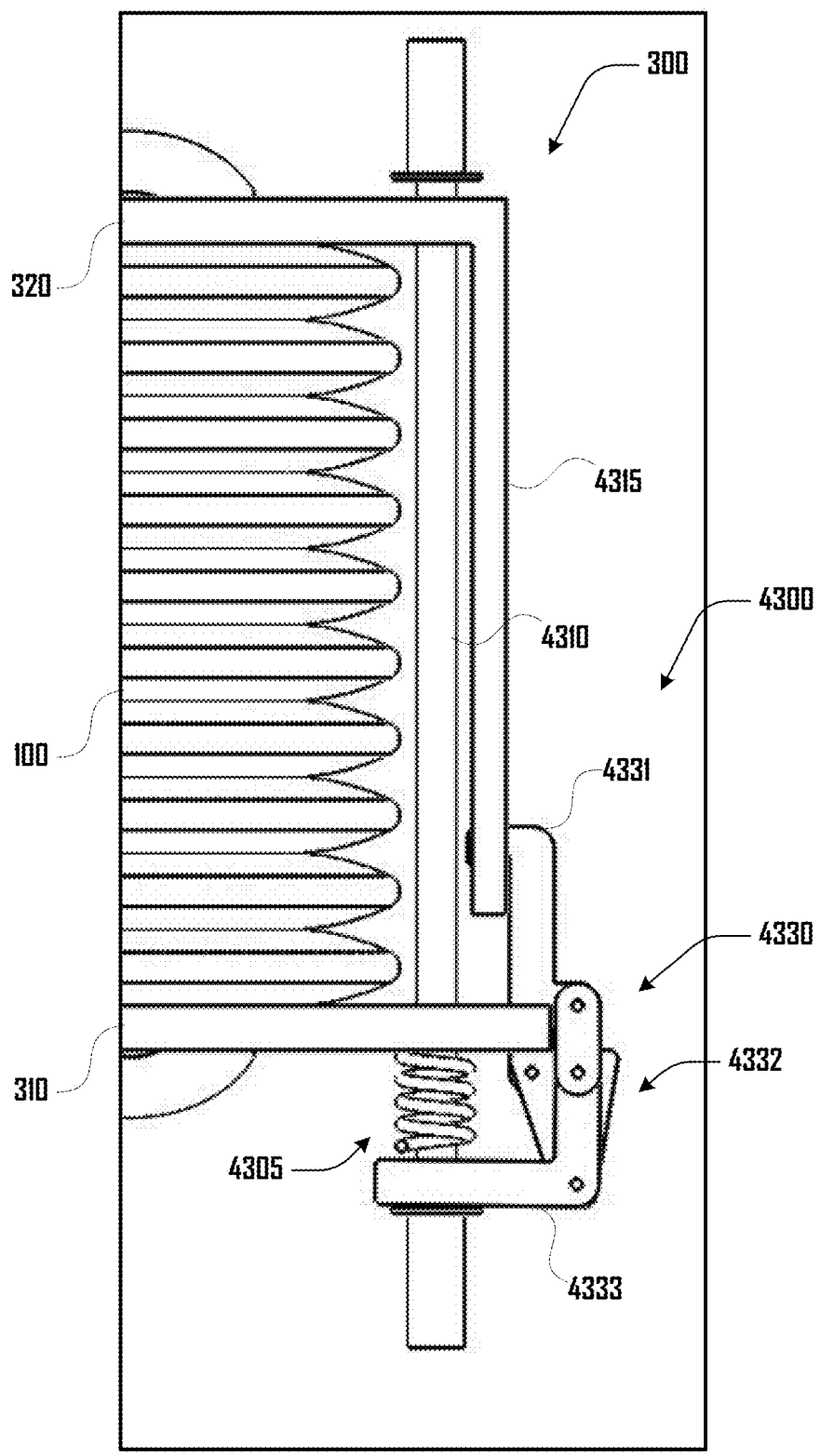
FIG. 43 illustrates an example actuator assembly having a locking mechanism in accordance with another embodiment.

One example embodiment of a bar-linkage lockout mechanism 4300 is illustrated in FIGS. 43, 44a and 44b being associated with actuator assembly 300 that comprises a bottom plate 310, a top plate 320 and at least one bellows 100. The locking assembly 4300 comprises a spring assembly 4305 that biases a shaft 4310 that is connected to a bottom portion of the top plate 320. A locking arm 4315 is coupled to the top plate 320 at a first end and extends toward a locking assembly 4300 that includes a locking head 4331, a bar-linkage assembly 4332, and a linkage foot 4333 that engaged with and is actuated by the spring assembly 4305 and shaft 4310.

The shaft 4310 is illustrated in a first configuration in FIG. 44a, where the linkage foot 4333 is pushed upward, which in turn causes the linkage assembly 4332 to rotate the locking head 4331 into a disengaged or open position. However, FIG. 44b illustrates the shaft 4310 in a second configuration where the linkage foot 4333 assumes a lowered configuration, which in turn causes the linkage assembly 4332 to rotate the locking head 4331 into a locked or closed position, which engages the locking arm 4315. Moving of the bar-linkage lockout mechanism 4300 from the open or disengaged position in FIG. 44a to the closed or locked configuration of FIG. 44b can be caused by the distance between the top and bottom plate 310, 320 becoming shorter, which causes the shaft 4315 to extend further through the bottom plate 310.

In further embodiments, a flexure extension lock out 4500 as illustrated in FIG. 45 can be used for stow or locking in an actuator assembly. For example, in such an embodiment, direct flexure extension or stow lock out can be piloted by actuator or bellow force. Collective bellows pressure above or below the corresponding flexure with spring force can be used to engage a locking mechanism that fixes the tracker position for the purposes of stow. Off normal loading can also be used to engage the locking mechanism 4500 in accordance with various embodiments.

In addition to a two-axis actuator assembly 300 as illustrated in FIGS. 3 and 4, further embodiments of an actuator assembly 300 can be configured to operate in a one-axis configuration as illustrated in FIGS. 9a-c, 19a, 19b, 21 and 24. For example, referring to FIGS. 9a-c the actuator assembly 300 can comprise a pair of bellows 100 that extend between a top and bottom plate 310, 320. As discussed above, the actuator assembly 300 can include a plurality of constraint-panels 330 that can extend between and support the bellows 100. A plurality of washers 340 can surround and be coupled with a portion of the bellows 100.

Other methods of constraining the inner convolutions of the bellows 100 can be present in further embodiments. For example, the bellows 100 can be constrained with a flexible tensile rope, cord, or string that wraps around the inner convolutions of the bellows 100 and connects adjacent bellows 100, in lieu of or in addition to washers and constraint panels. For example, FIGS. 33a and 33b illustrate an example embodiment of an actuator assembly 300 that comprises a wrap 3300 that wraps around the inner convolutions of the bellows 100 and connects adjacent bellows 100. In another embodiment, bellows constraints can take the form of a hollow encasement or tube in which the bellows 100 slidably resides. In such an embodiment, the bellows may not bend but instead may extend linearly.

Additionally, a flexure 350 can extend between the bottom and top plates 310, 320 and be coupled to the base plate 310 via heads 953. In some embodiments, the flexure 350 can extend between the bottom and top plates 310, 320 via two runs 952 on opposing sides of a crown portion 952 that extends along the top plate 320 as illustrated in FIGS. 9a-c. In further embodiments, there can be one or more separate flexure, for example as illustrated in FIGS. 3 and 4.

Still referring to FIGS. 9a-c, the actuator assembly 300 having two bellows 100 can be configured to move a solar panel 705 that is coupled to the top plate 320 via respective supports 921, 922 that are mounted perpendicularly to one another and extend along respective lengths of the solar panel 705 (e.g. as illustrated in FIGS. 10 and 35). As discussed above in relation to FIG. 6, the bellows 100 of the one-axis actuator assembly 300 can be configured to inflate and/or deflate to move the solar panel 705 as shown by the arrows in FIG. 9b. Support 922 can be some lightweight steel channel. This channel can have a C, Z, or some other desirable cross section. This channel can be roll formed, bent, or fabricated in some other manner. This channel can also use a corrosion resistant coating such as zinc plating or hot dip galvanizing, or the like, to stop corrosion. This channel can be a variety of lengths depending on the size of the tracker and the spacing of the posts. The support 922 holding the solar panels can be mounted to the actuator top plates using bolts, nuts, and through holes through all components, or can be mounted using a clamping system that would use friction to hold all components in place. Support 921 can be wrapped into the actuator design itself as part of the top plate. It can also be of the same section and material as support 922. The solar panel 705 can be mounted to the support 922 using clamps, bolts, clips, or some other fastening method. This fastening method can also electrically bond the panels to the support.

Additionally, the actuator assembly 300 can comprise a damper 905 as illustrated in FIGS. 9a-c. FIGS. 9a-c show an embodiment where the damper 905 extends between the bottom plate 310 and a support 921 that moves with the top plate 320. The damper 905 can be configured to smooth movement of the solar panel 705 by providing resistance that reduces sudden or jerky movement of the solar panel 705. In other words, a damper 905 can be configured to counter dynamic loading modes (for example, wind induced oscillatory modes) and help with smoothing oscillation of an actuator assembly 300. Additionally, inclusion of dampers 905 can be beneficial because it can allow an actuator assembly 300 to operate at a lower operating pressure, which can result in reduced stress on the actuator assembly 300, including stress on bellows 100, and the like.

In further embodiments, the damper 905 can be configured in any suitable way. For example, the damper 905 can be coupled to the top and bottom plate 310, 320; the damper 905 can be coupled to the bottom plate 310 and the second support 922; or the like. In some embodiments, the damper 905 can comprise an air/gas spring, oil dashpot, or the like. In further embodiments, the bellows 100 can be filled with a fluid such as water, or the like, to generate a suitable damping effect. In some embodiments, specifically in some embodiments of friction-based pivot dampers, the dampening coefficient may be modulated by varying the collective force applied by the bellows. By increasing collective bellows pressure, the stiffness provided by the dampener may be increased, which may be desirable for high dynamic load cases. The damper can take both linear and rotary forms in accordance with various embodiments.

In further embodiments, a damper can be internally located or integrated directly into a compliant fluidic actuator or bellows 100. For example, the material of the actuator can have a high damping coefficient, the actuator can be partially filled with a compliant material with a high damping coefficient, a block of porous material can be inserted into the actuator that restricts the passage of fluids in an out of said material thereby achieving damping, a block of elastomeric material that changes volume in response to external pressure with a significant damping coefficient, the actuator can be wrapped in a damping elastomeric material, and so forth.

In further embodiments a damper can be integrated with the flexure or pivot system or between washers. For example, the flexure can be encased in an elastomeric damping material which might further serve to maintain separation of washers and endplates, or elastomeric damping blocks can be stacked between washer plates.

As discussed herein, the actuator assembly 300 can be coupled to the ground or other structure via a post 710. For example, the actuator assembly 300 can be associated with or comprise structures illustrated in FIGS. 7a-c, or the like. The actuator can be mounted to this post using bolts, nuts and washers through the flange of the member, or through the web. The actuator bottom plate can have built in mounting features, or separate mounting brackets can be used.

Figure 34A:
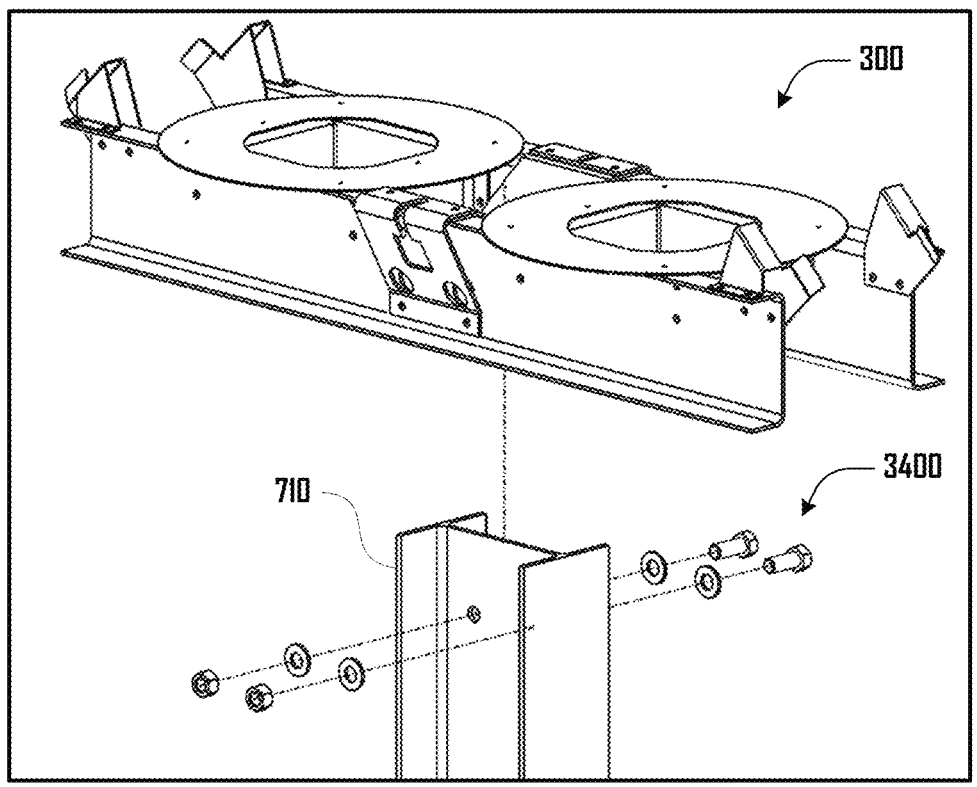
FIGS. 34a and 34b illustrate two example embodiments of an actuator assembly being coupled to a post.
Figure 34B:
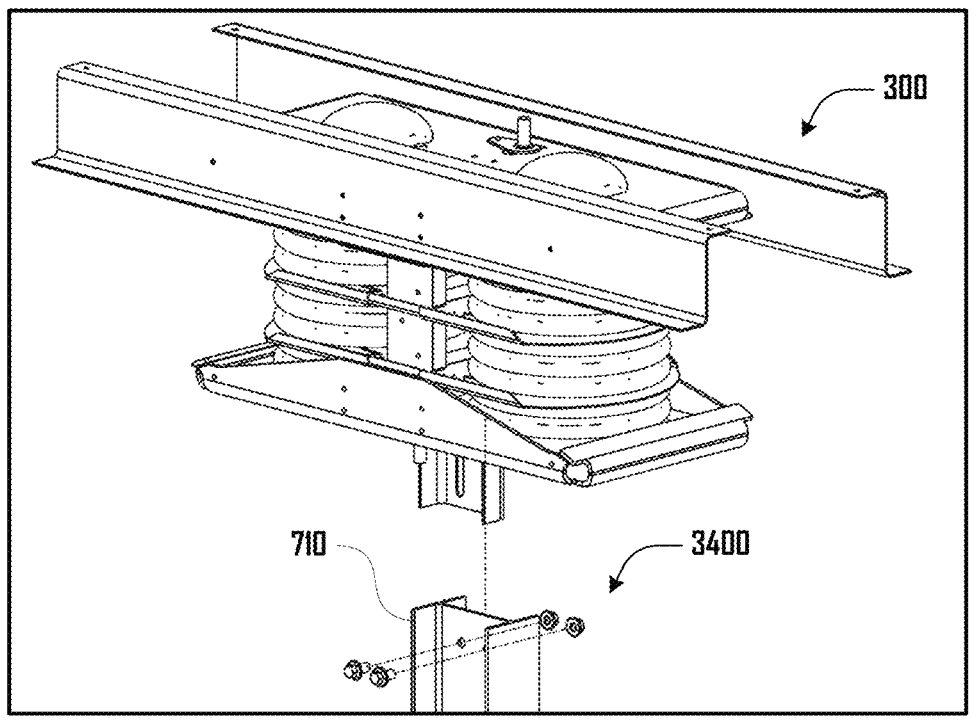

In some embodiments, one or more actuator assemblies 300 can be coupled together. For example as shown in FIG. 10, a pair of single axis actuator assemblies 300 can be coupled together via one or more solar panels 710 and/or supports 922 that extend between the actuator assemblies 300. Similarly, FIG. 35 illustrates another embodiment 3500 that comprises a plurality of actuator assemblies 300 coupled together via one or more solar panels 710 and/or supports 922 that extend between the actuator assemblies 300. In such embodiments, two or more actuator assemblies 300 can move in concert to move a single solar panel array 705. As shown in various embodiments, such an actuator assembly system 1000 can be anchored in the ground 1020 via posts 710, or the like. Supports 922 can be linked together using bolts and nuts with a connecting bracket, or with a nesting feature between the two lengths of support 922 that eliminates the need for an additional part. For example, FIGS. 34a and 34b illustrate an actuator assembly 300 being coupled to a post 710 via a bolt assembly 3400.

Although a specific embodiment of a flexure 350 is illustrated in FIGS. 9a-c and FIG. 10, in further embodiments, a flexure 350 for a single-axis actuator assembly 300 can comprise a parallel rope flexure, a planar flexure, a load bearing pivot, a four-bar linkage, a tetrahedral linkage, or the like. Such flexures can comprise any suitable material, including a metal, plastic, fiber reinforced composite, or the like.

Figure 11A:
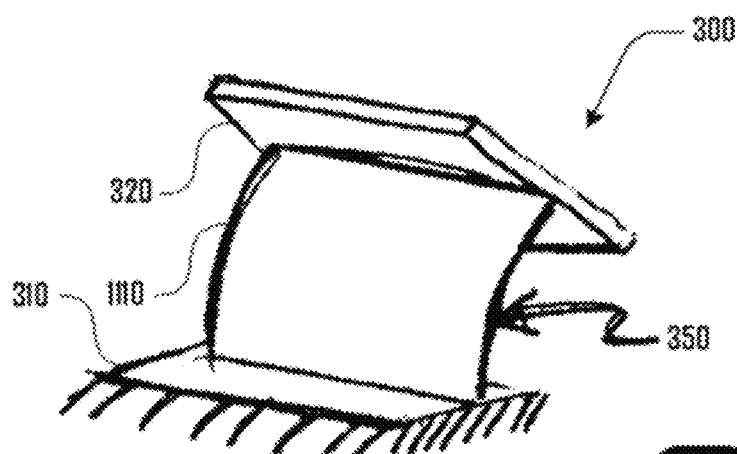
FIGS. 11a and 11b illustrate actuator assemblies in accordance with further embodiments.
Figure 11B:
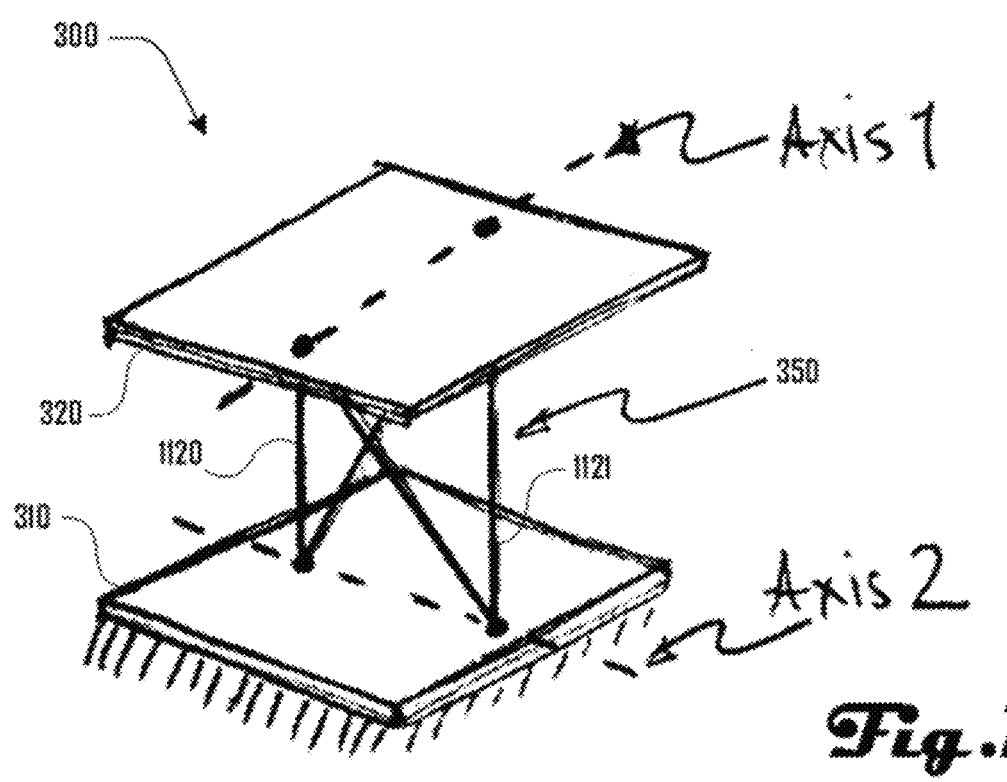
Figure 12:
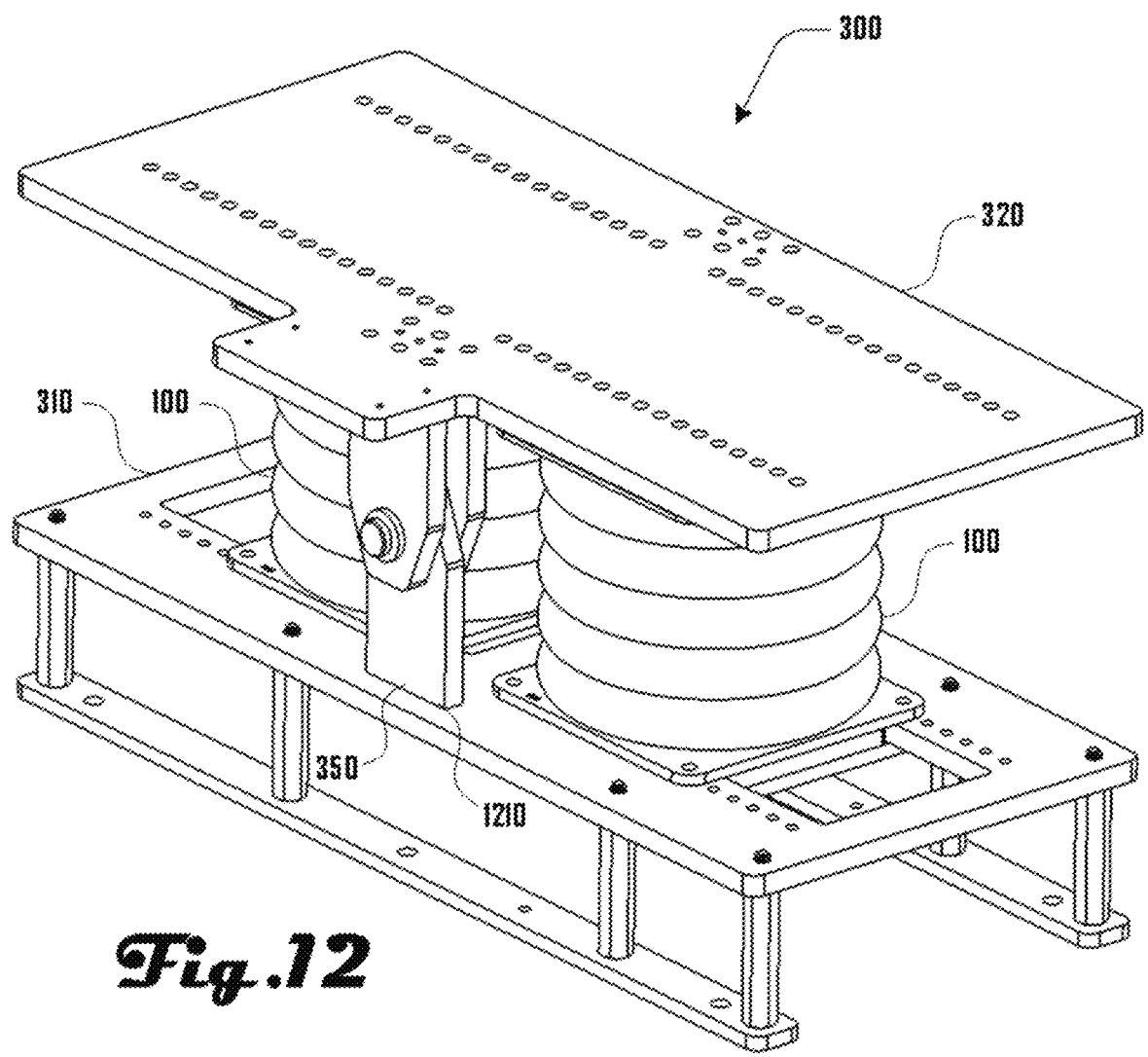
FIG. 12 illustrates an actuator assembly having a pivot in accordance with an embodiment.

For example, FIG. 11a illustrates an embodiment of an actuator assembly 300 having a flexible planar flexure 1110 that extends between a bottom and top plate 310, 320. FIG. 11b illustrates another embodiment of an actuator assembly 300 comprising a flexible tetrahedral linkage 1120 defined by a rope 1121 that extends between a bottom and top plate 310, 320. FIG. 12 illustrates a further embodiment of an actuator assembly 300 comprising a pivot 1210 that extends between a bottom and top plate 310, 320.

Figure 13A:
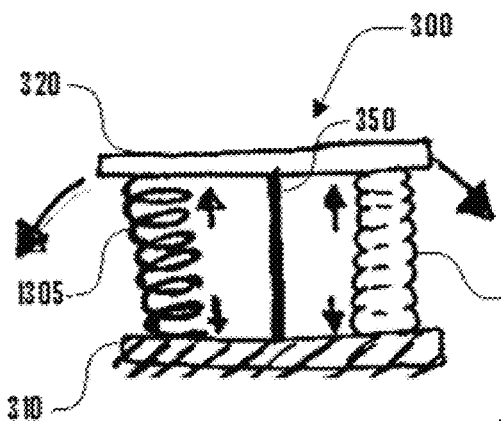
FIGS. 13a 13b, 13c, 13d and 13e illustrate actuator assemblies comprising bellows and springs in accordance with some example embodiments.

In accordance with further embodiments, actuator assemblies 300 can include various other suitable structures and assume various other suitable forms. For example, FIGS. 13a-e and 14a-b illustrate further embodiments of actuator assemblies 300. In one embodiment, as illustrated in FIG. 13a, a bellows 100 and compression spring 1305 can be positioned on opposing sides of a flexure 1305 and extend between a bottom and top plate 310, 320. Accordingly, inflation and/or deflation of the bellows 100 can actuate the top plate 320, with the top plate 320 being biased by the spring 1305. Further embodiments can have any suitable plurality of the bellows 100 and/or springs 1305.

Figure 13B:
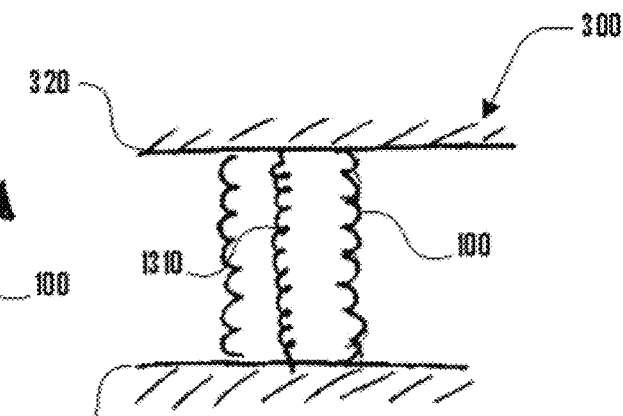

In another embodiment, as illustrated in FIG. 13b, an extension spring 1310 can be disposed within a bellows 100 extending between a bottom and top plate 310, 320. Accordingly, inflation and/or deflation of the bellows 100 can actuate the top plate 320, with the top plate 320 being biased by the spring 1310. Further embodiments can have any suitable plurality of the bellows 100 and/or springs 1310.

Figure 13C:
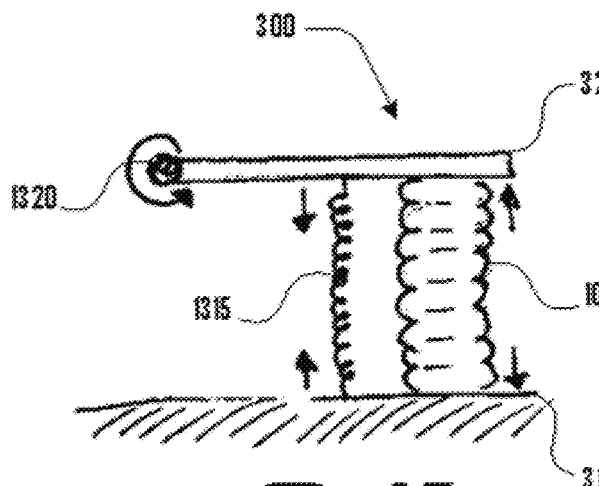

In a further embodiment, as illustrated in FIG. 13c, a bellows 100 and extension spring 1315 can extend between a bottom and top plate 310, 320, with a portion of the top plate 320 being rotatably fixed at a pivot 1320. The spring 1315 can be proximate to the pivot 1320 and the bellows 100 can be distal from the pivot 1320 compared to the spring 1315, or vice versa. Accordingly, inflation and/or deflation of the bellows 100 can actuate the top plate 320, with the top plate 320 being biased by the spring 1315. Further embodiments can have any suitable plurality of the bellows 100 and/or springs 1315. The pivot 1320 can be present in any suitable position on the top plate 320.

Figure 13D:
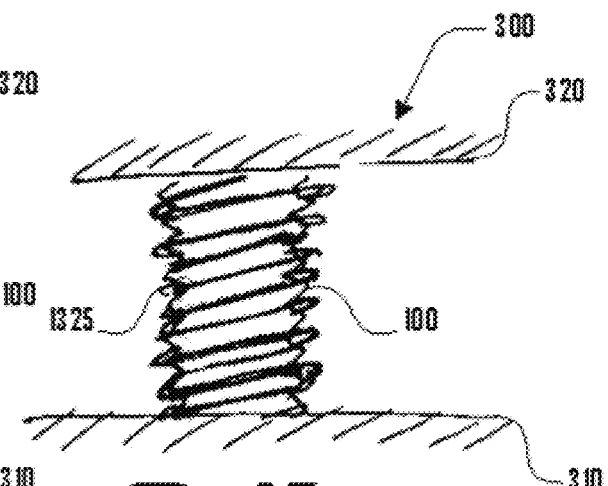

In a further embodiment, as illustrated in FIG. 13d, an extension spring 1325 can be wrapped around a bellows 100 extending between a bottom and top plate 310, 320. Accordingly, inflation and/or deflation of the bellows 100 can actuate the top plate 320, with the top plate 320 being biased by the spring 1325. Further embodiments can have any suitable plurality of the bellows 100 and/or springs 1325.

Figure 13E:
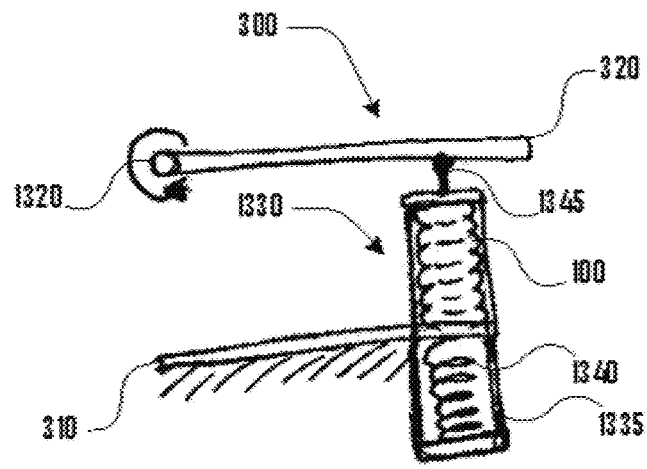

In yet another embodiment, as illustrated in FIG. 13e, a biasing assembly 1330 can be coupled to a top plate 320 that is rotatably fixed at a pivot 1320. In some embodiments, the pivot 1320 and biasing assembly 1330 can be disposed at opposing ends of the top plate 320. The biasing assembly 1330 can comprise an elongated housing 1335 that extends between a top and bottom side of a bottom plate 310, with a bellows 100 disposed on the top side of the bottom plate 310 within the housing 1335 and a compression spring 1340 disposed on the bottom side of the bottom plate 310 within the housing 1335. The biasing assembly 1330 can be pivotally coupled to the top plate 320 via an extension 1345. Inflation and/or deflation of the bellows 100 can actuate the top plate 320, with the top plate 320 being biased by the spring 1340 of the biasing assembly 1330. Further embodiments can have any suitable plurality of biasing assemblies 1330, bellows 100 and/or springs 1340.

Figure 14A:
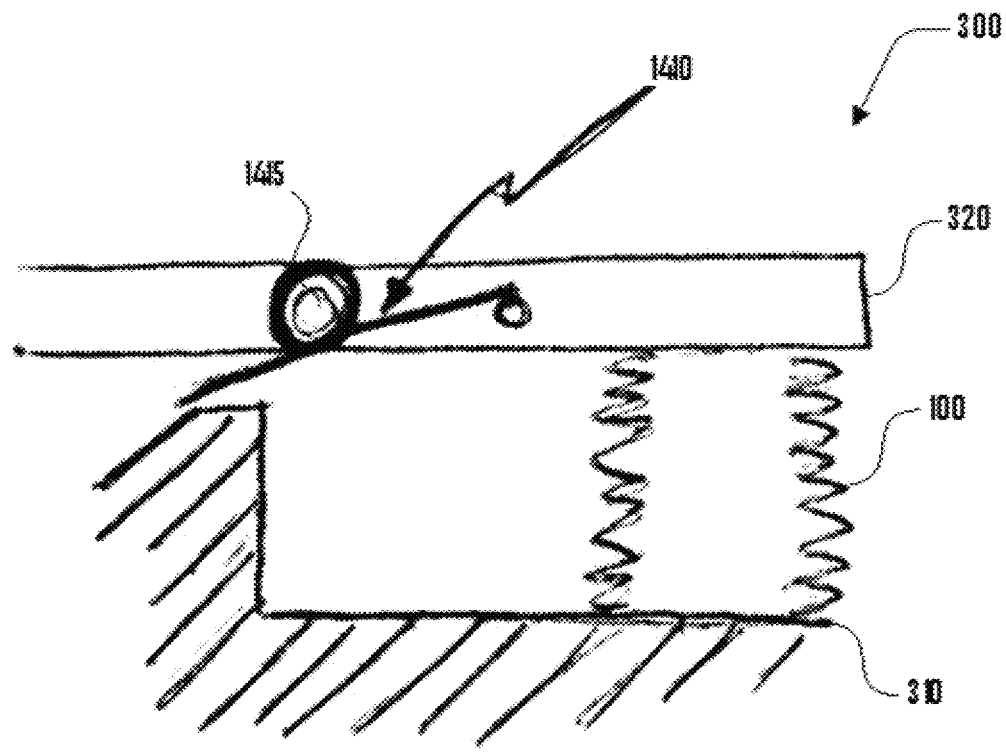
FIGS. 14a and 14b illustrate actuator assemblies in accordance with further embodiments.

In another embodiment, as illustrated in FIG. 14a, an actuator assembly 300 can comprise a bellows 100 that extends between a bottom and top plate 310, 320, with the bottom and top plate 310, 320 being rotatably biased via a torsional spring 1410 that surrounds a pivot 1415. Accordingly, inflation and/or deflation of the bellows 100 can actuate the top plate 320, with the top plate 320 being biased by the spring 1410. Further embodiments can have any suitable plurality of the bellows 100 and/or springs 1410.

Figure 14B:
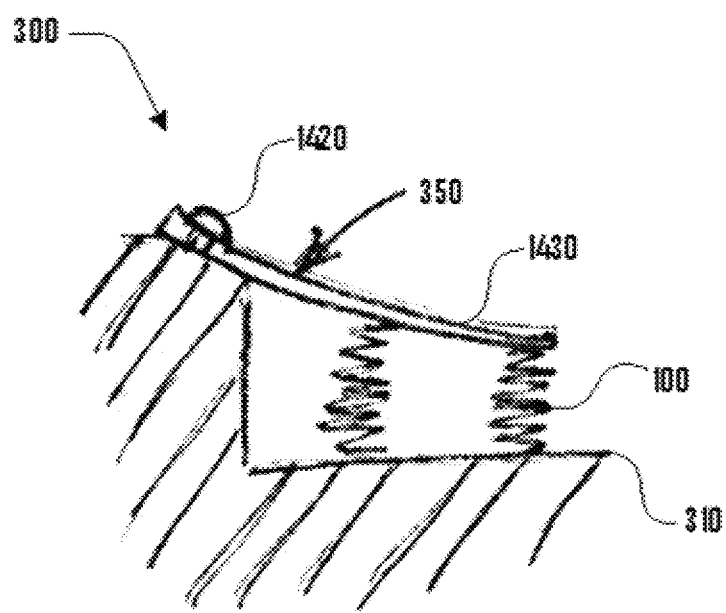

A further embodiment, as illustrated in FIG. 14b, can include a leaf spring 1430 that is coupled to a bottom plate 310 at a coupling 1420. Accordingly, inflation and/or deflation of the bellows 100 can actuate the leaf spring 1430, with the leaf spring 1430 being self-biased. Further embodiments can have any suitable plurality of the bellows 100.

As illustrated by the embodiments of FIGS. 13a-e and 14a-b, various embodiments can include one or more spring that replaces and/or biases one or more bellows 100. These embodiments are only provided as some examples of the many possible embodiments that are within the scope and spirit of the present invention. Additionally, while the embodiments of 13a-e and 14a-b can be used in single-axis actuator assemblies 300, in further embodiments, actuator assemblies 300 comprising springs can be adapted for use in actuator assemblies 300 configured to move in two or more axes.

As discussed herein, in various embodiments one or more actuator assembly 300 can be configured to actuate a solar panel 705 (see, e.g., FIGS. 6, 7a-c and 10). In further embodiments, it may be desirable to actuate a grouped plurality of solar panels 705 together substantially in unison. For example, as the sun moves through the sky during the day, it can be desirable for an array of solar panels 705 to movably track the sun so that the panels 705 are optimally positioned to collect the maximum amount of solar energy.

Although certain example embodiments of an actuator assembly 300 shown herein comprise a specific number of bellows 100 (e.g., four, two, one, zero), these examples should not be construed to be limiting on the wide variety of configurations of an actuator assembly 300 that are within the scope and spirit of the present invention. For example, various embodiments of an actuator assembly 300 can include any suitable plurality of bellows 100 (e.g., 3, 5, 6, 7, 8 or more); can include a single bellows 100; or bellows 100 can be absent. The orientation of the bellows 100 and the direction of the force they exert can also change. Rotational motion of an actuator assembly 300 can be accomplished with bellows 100 providing a force that is not parallel and in the same direction, as shown in FIGS. 3 and 4, but the bellows 100 can be oriented on the same side of the pivot point of the rotational actuation, so that the forces are parallel but in opposite directions, or the bellows 100 can be oriented so that they are offset 90 degrees from the pivot point, so that the forces are perpendicular, or in many other orientations where the moments created by each bellows 100 in an actuator assembly 300 are in different directions.

Figure 15A:
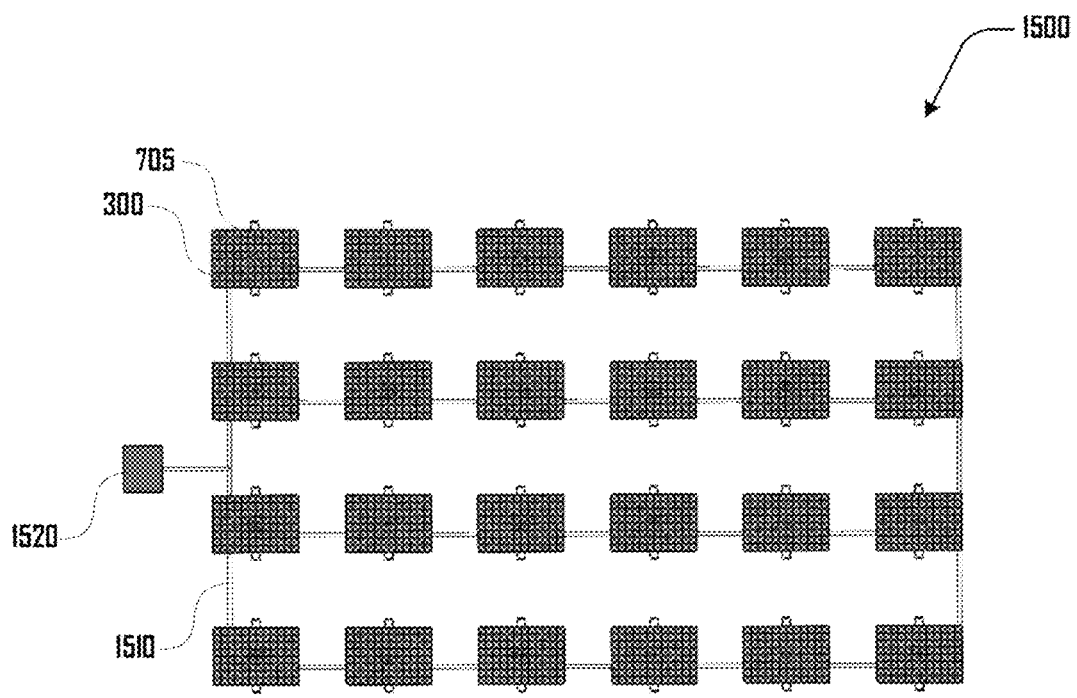
FIGS. 15a and 15b illustrate solar panel arrays in accordance with some embodiments.
Figure 15B:
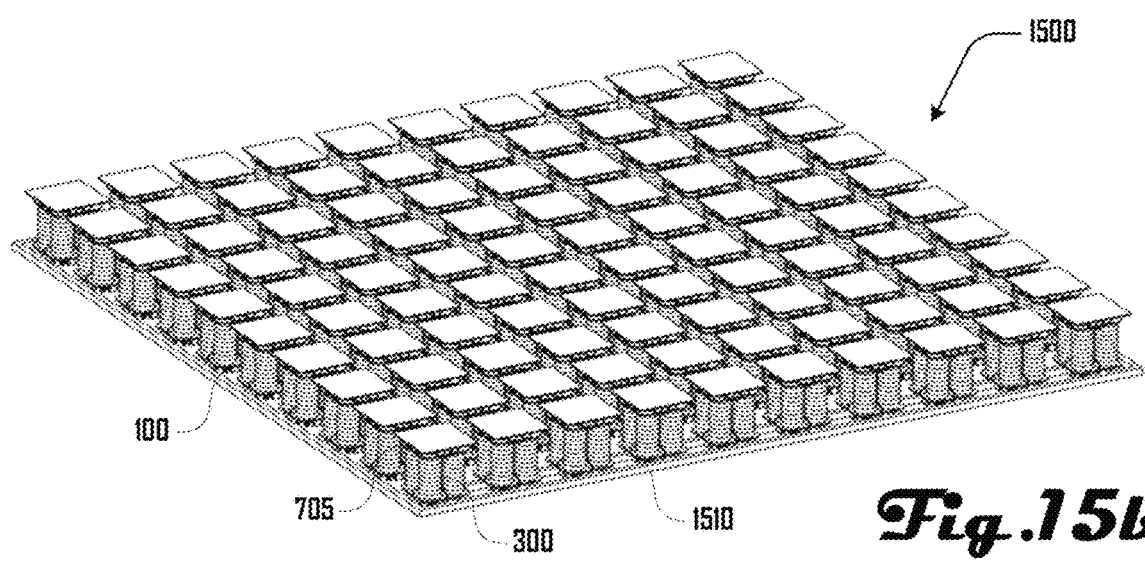

FIGS. 15a and 15b illustrate two embodiments of a panel array 1500 that each comprises a plurality of actuator assemblies 300 that each includes a solar panel 705. The actuator assemblies 300 can be interconnected via lines 1510, which are configured to provide fluid to the bellows 100 of the actuator assemblies 300. The panel array 1500 can be controlled via control module 1520 that is coupled to the network of lines 1510.

Figure 16:
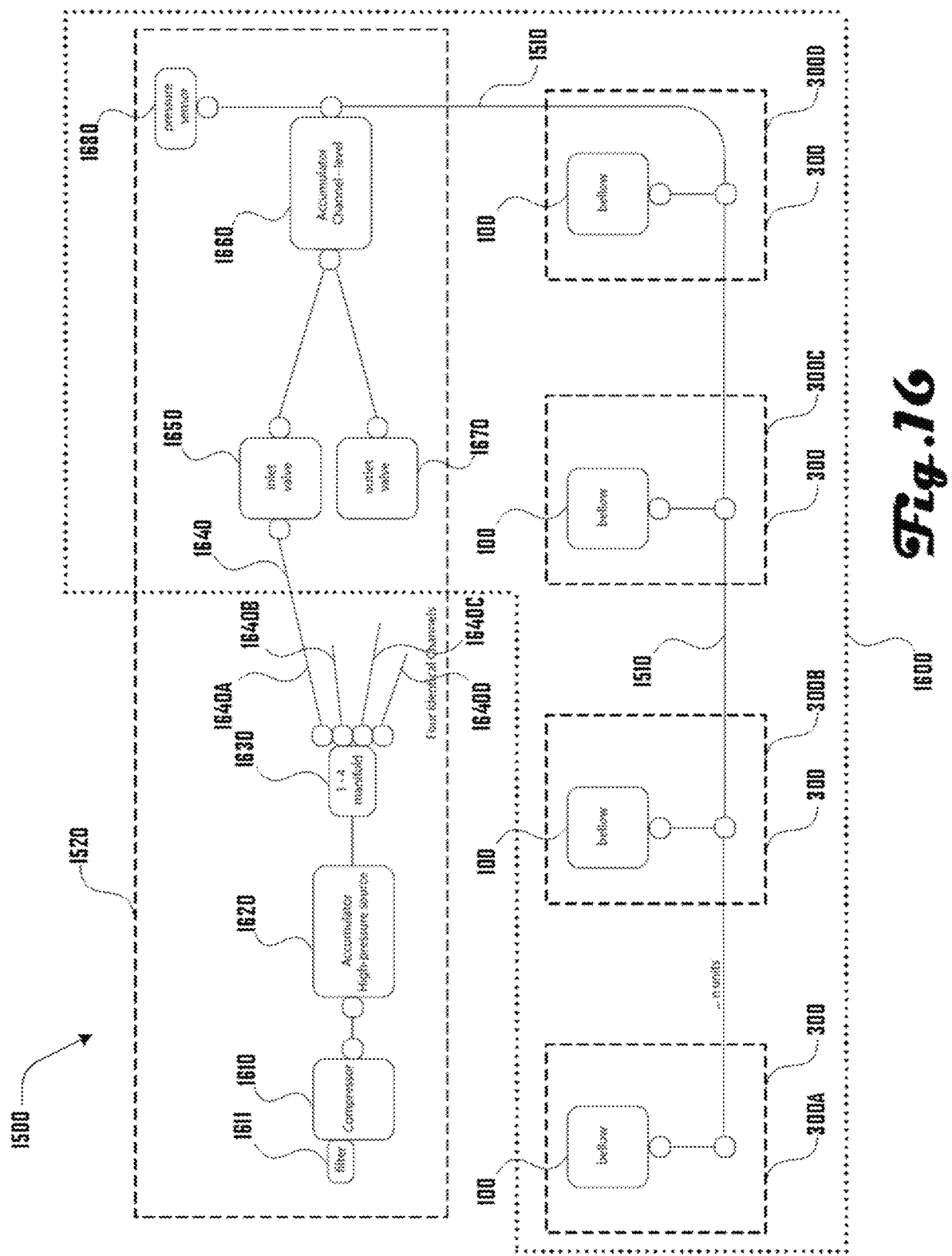
FIG. 16 is a block diagram of a portion of a solar panel array system in accordance with an embodiment.
Figure 36:
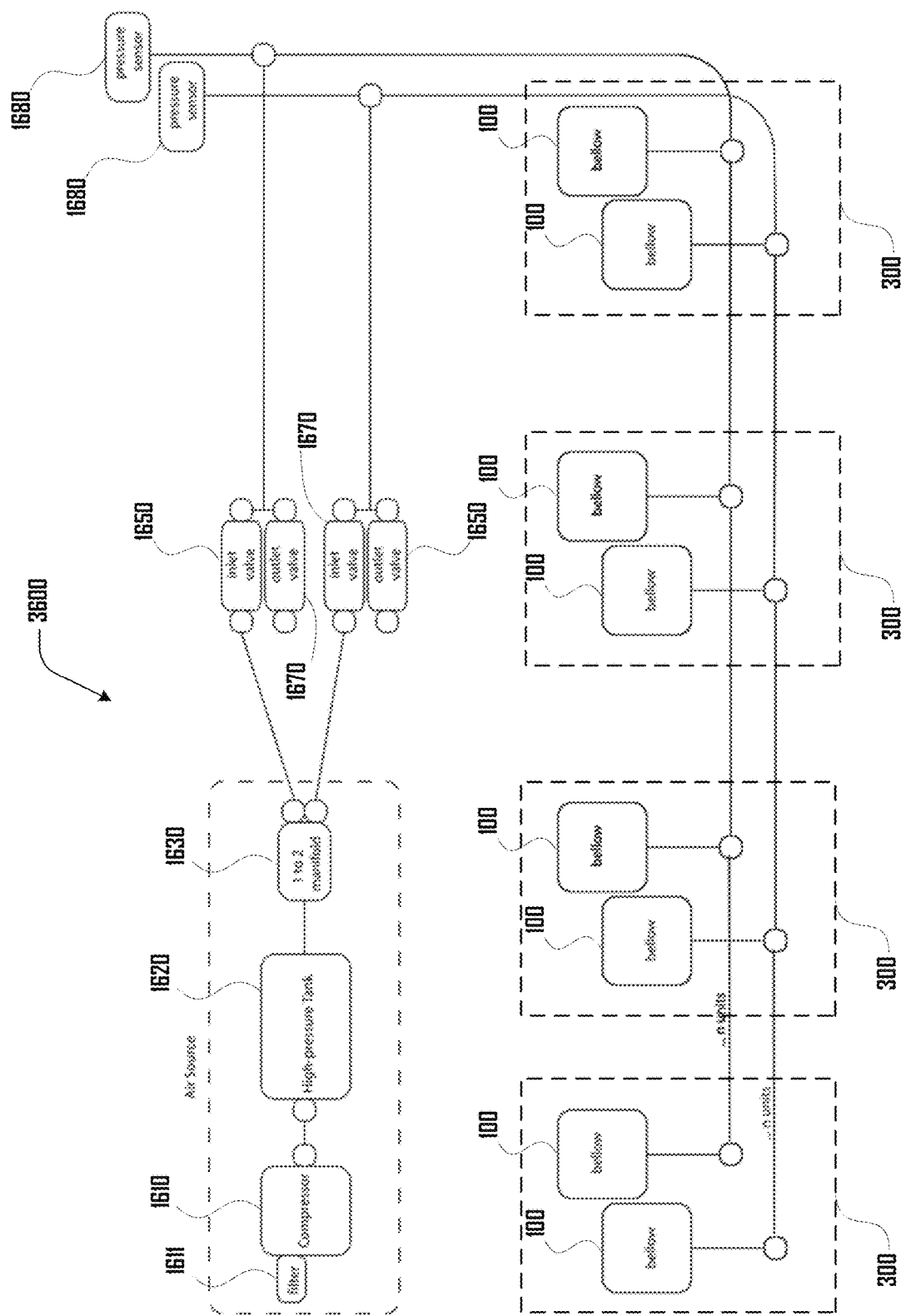
FIG. 36 is a block diagram of a portion of a solar panel array in accordance with an embodiment.

As shown in FIG. 16, the control module 1520 can comprise a compressor 1610 that includes a filter 1611 with the compressor 1610 being operably coupled to an accumulator 1620, which is operably coupled to a four-port manifold 1630. The manifold 1630 is operably connected to four output lines 1640A-D, but for purposes of clarity, only the elements 1600 (surrounded by the dotted box) connected to the first output line 1640A are shown. Accordingly, in accordance with various embodiments, the set of system elements 1600 can be provided four times in parallel. In other words, elements 1600 are shown connected to the first output line 1640A, but an identical or similar set of such elements 1600 can also be operably connected to output lines 1640B, 1640C, 1640D as described in further detail herein. Alternatively, the quantity of control channels and elements 1600 may be values other than four. For example, in embodiments where an actuator assembly 300 has two bellows 100, there can be two channels. For example, FIG. 36 illustrates an example embodiment of a system 3600 having two channels that correspond to a respective bellow 100 of a plurality of actuator assemblies 300. Additionally, further filtration and/or drying components can be present downstream from the compressor 1610 in accordance with further embodiments.

Accordingly, each of the manifold output lines 1640 can be operably connected to an inlet valve 1650, which is operably connected to a channel-level accumulator 1660. The channel-level accumulator 1660 is operably connected to an outlet valve 1670, a pressure sensor 1680 and a plurality of bellows 100 that are respectively associated with a different actuator assembly 300. The elements 1600 that are operably coupled with the manifold output line 1640A can be configured to maintain substantially the same pressure and/or deflation/inflation state for each of the bellows 100 attached thereto. In various embodiments, this can alternatively be achieved with a bidirectional valve in lieu of an inlet and outlet valve.

Figure 37:
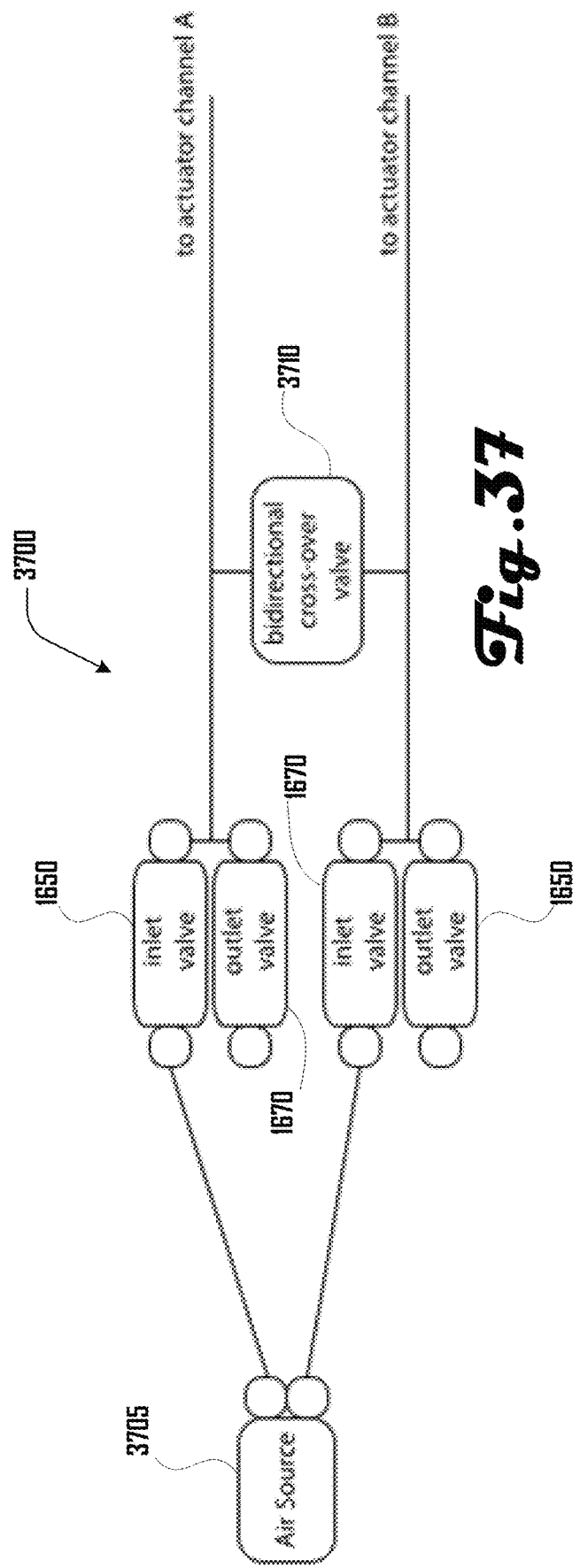
FIG. 37 is a block diagram of a portion of a solar panel array in accordance with another embodiment.

In various embodiments of a two channel system, an additional cross-over valve may be desirable. Such a valve can permit flow between the two channels when activated. This can allow the system to move towards a flat position without requiring air from the compressor. This would allow half of all motions to occur without the use of the compressor and without the associated power consumption. For example, FIG. 37 illustrates a system 3700 that comprises a bidirectional cross-over valve 3710 that operably connects two channels downstream of inlet and outlet valves 1650, 1670 and an air source 3705.

In accordance with various embodiments, the bellows 100 connected to a given manifold output line 1640 are each in the same relative position within an actuator assembly 300. For example, as shown in FIGS. 15a and 15b, in various embodiments, the actuator assemblies 300 of a panel array 1500 each have four bellows 100 that are arranged in lines and columns in a common orientation (e.g., square to one another). Accordingly, presume that each actuator assembly 300 can be said to have a bellows 100 in a front-right, front-left, rear-right, and rear-left position.

Referring to FIG. 16, in various embodiments, each of the bellows 100 associated with the first manifold output line 1640A can be in the same position in a respective actuator assembly 300. For example, all of the bellows 100 shown in FIG. 16 can be in the front-right position of actuator assemblies 300A-D. Similarly, the other output lines 1640B-D can be respectively associated with bellows 100 in the other positions (not shown in FIG. 16).

For example, presume that that the first manifold output line 1640A is associated with the front-right bellows 100 of each actuator assembly 300A-D; second manifold output line 1640B is associated with the front-left bellows 100 of each actuator assembly 300A-D; third manifold output line 1640C is associated with the rear-right bellows 100 of each actuator assembly 300A-D; and fourth manifold output line 1640D is associated with the rear-left bellows 100 of each actuator assembly 300A-D. In such an embodiment, therefore, the actuator assemblies 300 of a panel array 1500 can be simultaneously actuated while also maintaining essentially the same orientation. In other words, by selectively varying the pressure applied by the manifold lines 1640A-D, the panel array 1500 can be configured to collectively track the sun, or otherwise move in unison for other purposes.

Additionally, the panel array 1500 of FIG. 16 can also be adapted to embodiments of a panel array 1500 that includes actuator assemblies 300 having one or more bellows 100 or other pneumatic actuated elements. For example, in an embodiment having two bellows 100, the manifold 1630 can be associated with two output lines 1640 coupled with two respective sets of elements 1600. Accordingly, further embodiments can include a manifold 1630 having any suitable number of output lines 1640 (e.g., 1, 2, 3, 4, 5, 6, or the like).

As discussed herein, the relative relationship between pressures of bellows 100 in an actuator assembly 300 can be used to position a solar panel 705 coupled to the top plate 320 of the actuator assembly 300. Higher or lower overall pressures can be used with similar relative pressure differences between the bellows 100 being used to make the actuator assembly 300 assume various suitable configurations. Higher overall pressures can result in greater stiffness of the bellows 100, which can be desirable for dynamic loading conditions or the like. Lower overall pressures can result in reduced stiffness of the bellows 100 and can be beneficial to reduce strain on the panel array 1500 components. In some embodiments, overall pressure can be dynamically changed for various reasons, including eliminating dangerous resonance modes, adapting environmental conditions such as rain, snow or wind, or to reduce the power consumption of the panel array 1500 by lowering the overall operating pressure. Varying pressure in the bellows 100 may also serve to actuate a stow or other mechanism. For example, in one embodiment, high bellows pressures may compress a spring that is in line with the flexure, or integrated into the retaining plates. This action may activate a lockout feature for use in situations where high stiffness is desirable. Additionally, the spring may extend in when the bellows 100 are under-pressurized, also locking out the actuator assembly 300 for maintenance or fail safe modes. Stow mechanisms may be actively or passively actuated. Stow mechanisms may also be actuated from a separate control source (dedicated electrical signal) or from a pressure signal or combination of pressure signals already being used to control angle and stiffness of the actuator.

In various embodiments (e.g., as shown in FIG. 15a) a single control unit 1520 can control a plurality of actuator assemblies 300 in a panel array 1500. In such embodiments, one or more sensor can collectively control the plurality of actuator assemblies 300 in the panel array 1500. For example, in some embodiments, there can be one or more pressure sensor, flow sensor, temperature sensor, inclinometer, or the like, that are operable to amortize control over the plurality of actuator assemblies 300.

In some embodiments, one or more accumulators can be located in various suitable locations in the panel array 1500, including co-location with sensors, which can be beneficial for ensuring that control sensing is substantially unaffected by pressure inconsistencies, pressure normalization delays, or pressure drops or spikes due to a valve or other causes. Accordingly, control sensing can be insulated from dynamic events that are downstream from such accumulators. For example, if wind were to move actuator assemblies 300 in the panel array 1500 such that pressures in the panel array 1500 fluctuate, such pressure changes can be insulated from control sensors by the accumulators.

In further embodiments, scout-sensors can be used for control of actuator assemblies 300 in the panel array 1500. For example, in some embodiments, sensors such as a sun sensor, inclinometer, and/or the like can be positioned on one or more actuator assemblies 300 to monitor the position and configuration of the one or more actuator assemblies 300. In such embodiments, each actuator assembly 300 may not need to have sensors associated with it, and instead only a small subset of the actuator assemblies 300 need to be associated with sensors. In some embodiments, a control system can use feedback from inverter data or other energy production data to adjust the position of actuator assemblies 300.

Scout sensors can be desirable in various embodiments because such sampled sensing can adapt to changes in a panel array 1500 over time, including addition or removal of actuator assemblies 300 from the panel array 1500; settling or other movement of actuator assemblies 300 in the panel array 1500; deformation or other changes to materials in the panel array 1500, or the like.

Additionally, such scout sensing can be beneficial because it can sense dynamic loading conditions so that the system can adjust pressure and/or stiffness of the system. For example, if wind were to move actuator assemblies 300 in the panel array 1500 such that pressures in the panel array 1500 fluctuate, such scout sensors could detect the change and stiffen the panel array 1500 by increasing overall pressure to resist the environmental conditions causing the pressure fluctuations.

In various embodiments, the panel array 1500 can comprise a powered air compressor that is operable to introduce pressurized fluid into panel array 1500, which can be used to selectively actuate and/or inflate bellows 100. Such a compressor and other components of the panel array 1500 can be powered by a hardwired electrical connection, via battery, via solar power, or the like. In some embodiments, to accommodate instances where such power sources are lost or expended, or if the compressor fails, the panel array 1500 can comprise a backup of pressurized fluid that can be used in the panel array 1500. For instance, compressed air can be stored in a tank, accumulator or reservoir. Storage of compressed air can also allow the compressor-tank system to supply air at a rate greater than the compressor's capacity.

Figure 17A:
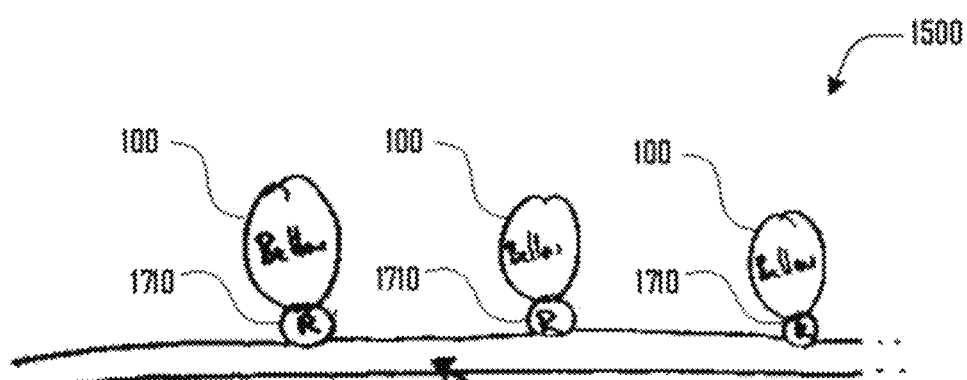
FIGS. 17a, 17b and 17c illustrate example embodiments of how bellows can be interconnected via lines in a solar panel array.
Figure 17B:
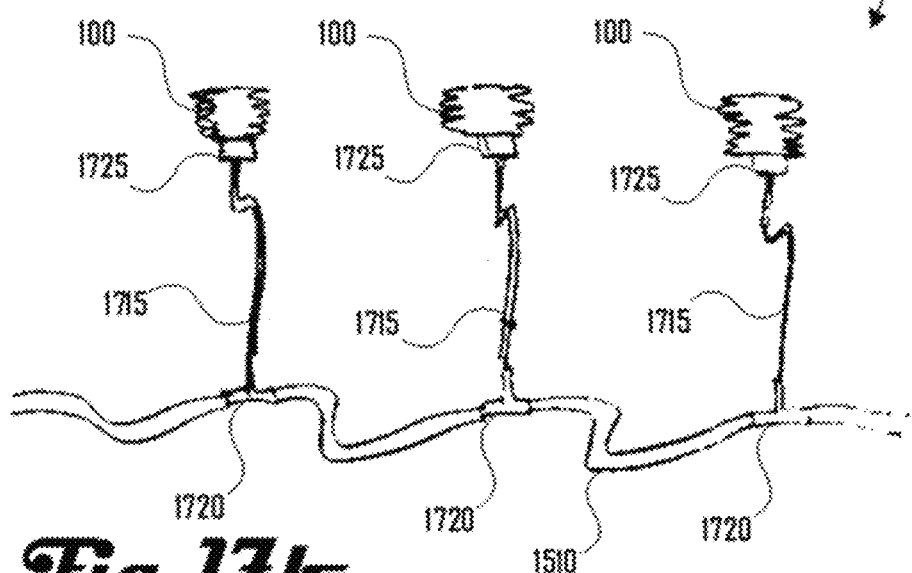
Figure 17C:
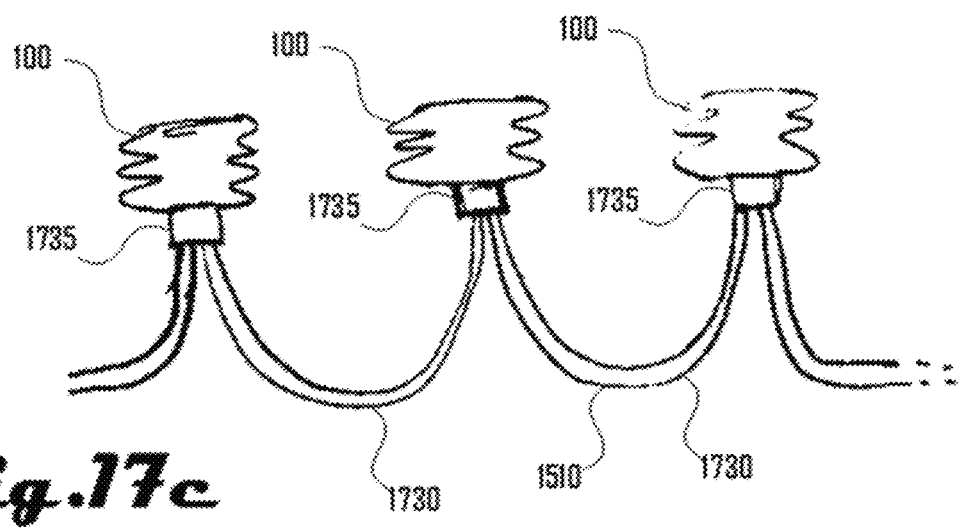

Although FIG. 16 illustrates one embodiment of how the bellows 100 are interconnected and associated with a given manifold output line 1640, the bellows 100 can be interconnected in any other suitable way. For example, referring to FIG. 17a, bellows 100 in one embodiment can be coupled along a line 1510 via respective restrictors 1710. In another embodiment, as illustrated in FIG. 17b, a plurality of bellows 100 can be connected along a length of a line 1510 via respective T-couplings 1720 and line extensions 1715 that couple with caps 1725 on respective bellows 100. In a further embodiment, as illustrated in FIG. 17c, bellows 100 can be coupled by respective loops 1730 of line 1510 that respectively enter/exit caps 1735 that are coupled with each bellows 100, or in lieu of caps 1725, a restrictor 1710 can be integrated into the bellows 100 themselves. In further embodiments, any suitable plurality of loops 1730, or the like, can enter/exit caps 1735.

Additionally, in various embodiments, bellows 100 can be inter-coupled in any suitable way, including more than one or a combination of the coupling examples shown and described herein. For example, some embodiments of a panel array 1500 can include a trunk-and-branch configuration, wherein primary lines 1510 have a larger diameter and secondary lines 1510 (e.g. extensions 1715 of FIG. 17b) that are closer to bellows 100 are of a smaller diameter. In such an embodiment, trunk lines 1510 can provide for less restricted flow, whereas the branch lines 1510 can provide for more flow restriction.

Lines 1510 can comprise any suitable material for containing a desired fluid. For example, in various embodiments, lines can be polyurethane, polyvinylchloride (PVC), high-density polyethylene (HDPE), cross-linked polyethylene (PEX), polyamide, steel, galvanized steel, iron, copper, aluminum, or the like. Lines 1510 can be flexible and/or rigid in some embodiments. In some embodiments, lines 1510 can be configured to serve as compliance in joints with deformable seals; the lines 1510 can provide sealing compliance and/or compliance can be external.

In various embodiments, a panel array 1500 can include one or more type of suitable line 1510 and joint material, and in some embodiments, a given portion of a line 1510 or joint can comprise a plurality of materials. For example, a metal core can be covered in a polymer to provide buckling support during flexing or for environmental protection. In further embodiments, lines 1510 can be fiber or braid reinforced. A polymeric tube may have a metal foil layer for creep resistance. A line may be covered with a secondary shroud to avoid excessive weather-related degradation, such as that from ultraviolet radiation. Selective use of such a shroud permits the use of a continuous line of non-weather-resistant material to be economically used through areas of intermittent protection, such as is the case bridging between co-linear solar arrays with gaps between arrays or between adjacent solar arrays.

Lines 1510 of the panel array 1500 can be coupled in various suitable ways. For example, connectors can interface with the inside and/or outside of respective lines 1510 or other components. In various embodiments, compressive connections, bonded connection, welded connections, adhesive connections, or the like can be used.

In various embodiments, it can be beneficial to use a flow-restriction device or structure at various positions in a panel array 1500. For example, as shown in FIG. 17a, a restrictor 1710 can be positioned between the bellows 100 and a line 1510. In other embodiments, a flow-restriction device or structure can also be present in a cap 1725, 1735, a T-coupling 1720 or at various positions in a line 1510.

Use of flow-restriction devices or structures can limit the rate of flow into/out of the bellows 100 to inhibit undesirable pressure drops and/or pressure surges in the bellows 100, which can be beneficial for maintaining smooth actuation of the actuator assemblies 300 and making the panel array 1500 more tolerant of fluid leaks and/or ruptures in the panel array 1500.

For example, the system of interconnected bellows 100 of a panel array 1500 can maintain operation even when a failure occurs at a bellows 100, cap 1725, 1735, or the like, where a leak or rupture occurs downstream of a flow-restriction device.

Additionally, in some examples of a single axis configuration, where the tops of multiple actuators 300 are mechanically fixed to one another (e.g., as illustrated in FIGS. 10 and 35) restrictions at a bellow level can cause a large pressure difference between respective bellows 100 in actuators 300 that are mechanically linked in the case of a severe leak in a single bellow 100. This can be undesirable as it can cause potentially damaging mechanical stresses in mechanical members linking actuators.

Alternatively, in further examples of a single axis configuration of an actuator 300 having two bellows 100, it can be advantageous to permit flow between mechanically linked actuators via the use of relatively large internal diameter lines. Restrictions can be used where the pneumatic connection for a group of mechanically linked actuators attaches to a pneumatic line supplying multiple actuator groups. Doing so can isolate the impact of leak failures to the single mechanically linked group, permitting the continued operation of other groups on the same line while avoiding significant stresses in, and potential damage to, mechanical structures.

Figure 38:
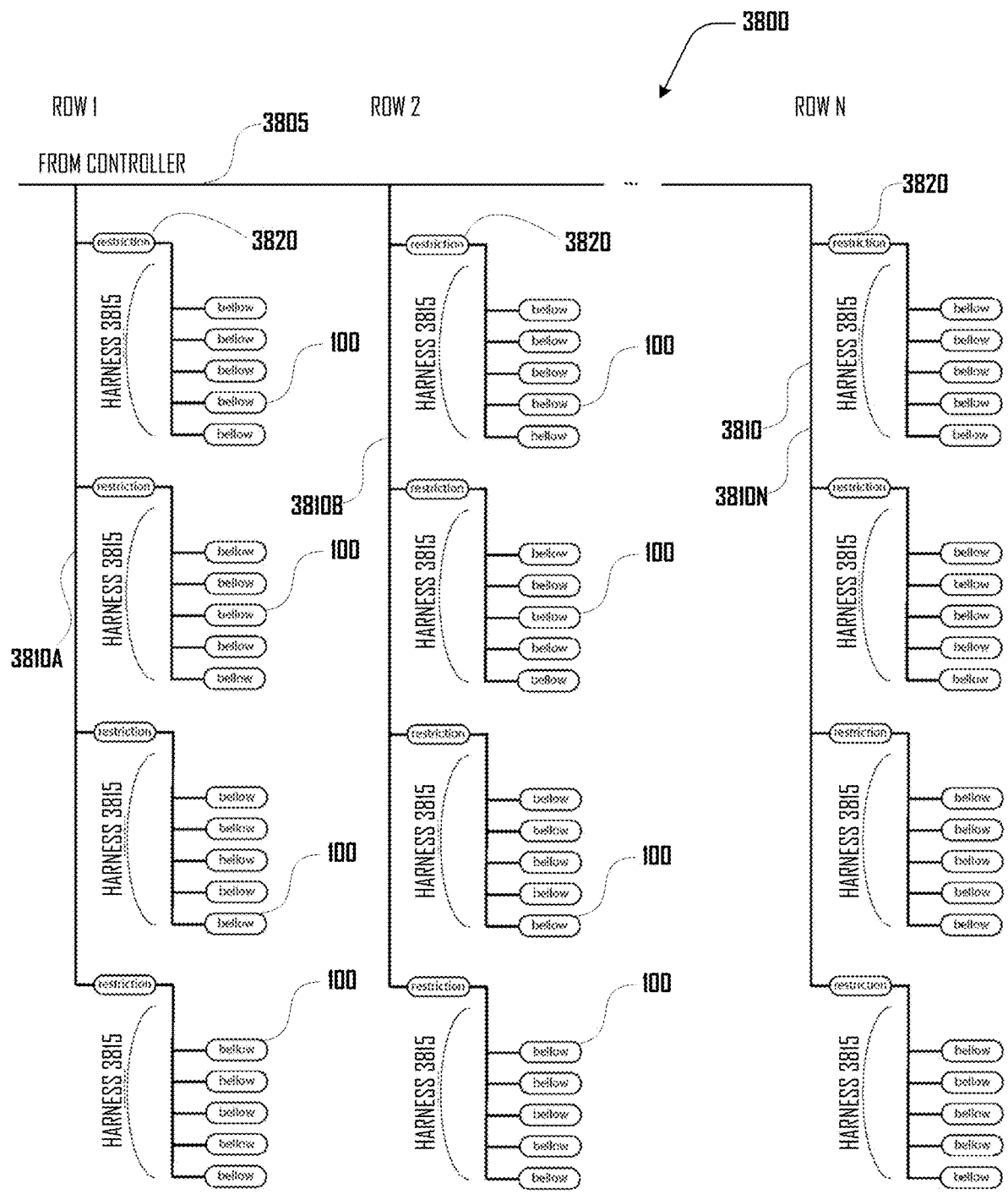
FIG. 38 is a block diagram of a portion of a solar panel array in accordance with a further embodiment.

For example, FIG. 38 illustrates a system 3800 that comprises a supply line 3805 that originates from a controller, to which a plurality of rows lines 3810 are connected to the supply line 3805, including lines 3810A, 3810B and 3810N. A plurality of harnesses 3815 are connected to each row line 3810, with each harness 3815 comprising a plurality of bellows 100. A restriction 3820 is positioned between the bellows 100 of each harness 3815 and the respective row line 3815.

Figure 39:
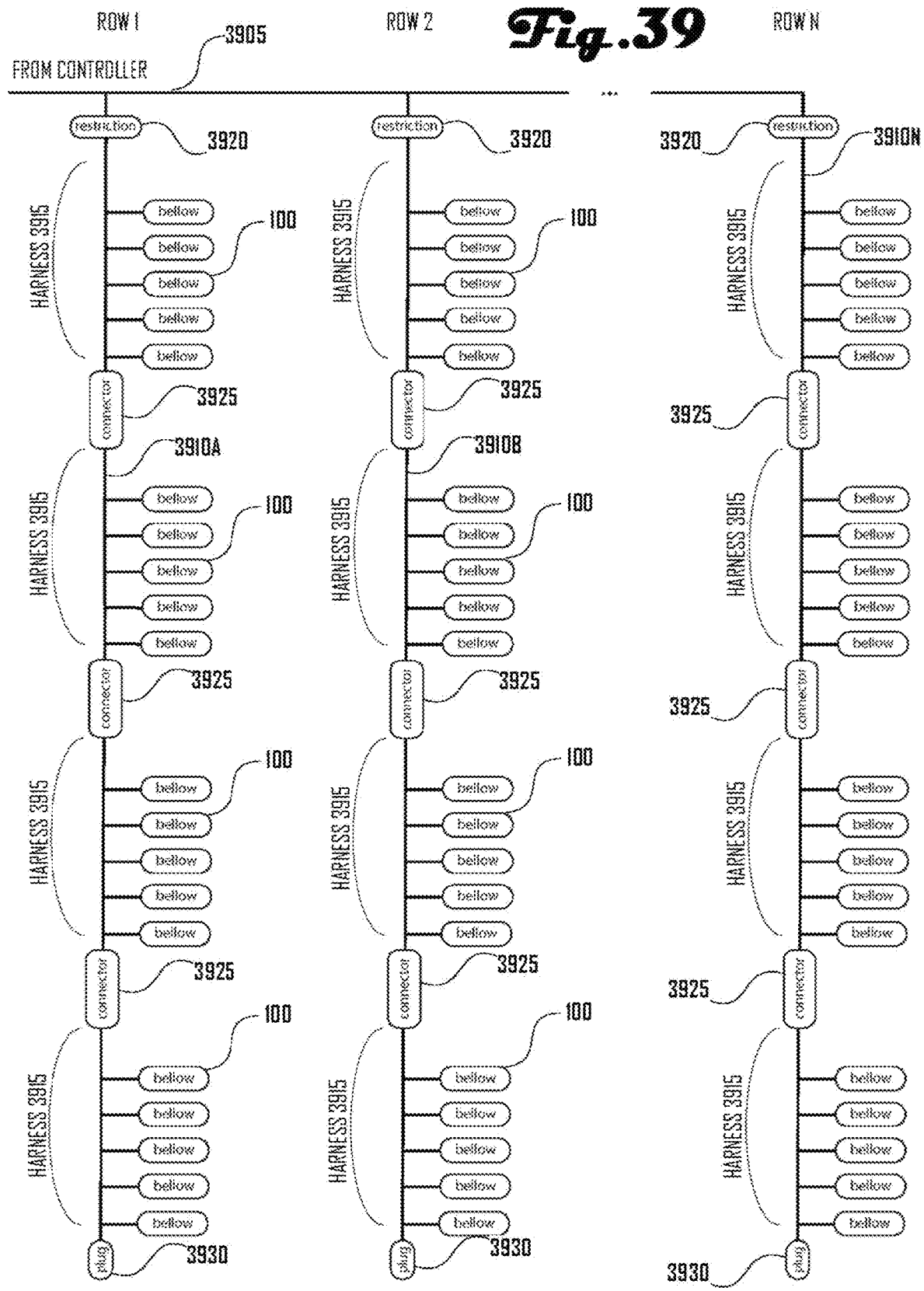
FIG. 39 is a block diagram of a portion of a solar panel array in accordance with yet another embodiment.

In another example, FIG. 39 illustrates a system 3900 that comprises a supply line 3905 that originates from a controller, to which a plurality of rows lines 3910 are connected to the supply line 3905, including lines 3910A, 3910B and 3910N. Each supply line comprises a series of harnesses 3915 that are separated by a connector 3925. A restriction 3920 is disposed between the series of harnesses 3915 and the supply line 3905. Each row line 2910 terminates at a plug 3930.

Restriction sizing can be selected based on maximizing the degree of restriction while maintaining sufficient flow capacity to move the actuator at the desired maximum speed during normal operation (e.g., leak-free and/or low leak rate). A greater degree of restriction can have the benefit of limiting the volumetric flow rate even in a severe leak case, permitting the compressor to compensate for leaked air and allowing the rest of the system to continue to operate.

Figure 18A:
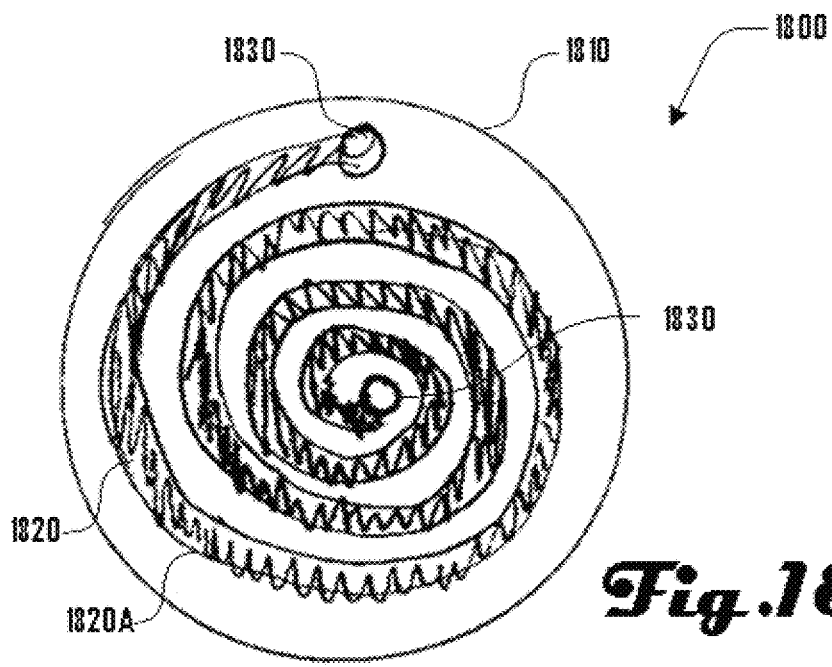
FIGS. 18a and 18b illustrate example embodiments of a restrictor that comprises a body that defines a fluid passage having a pair of ports.
Figure 18B:
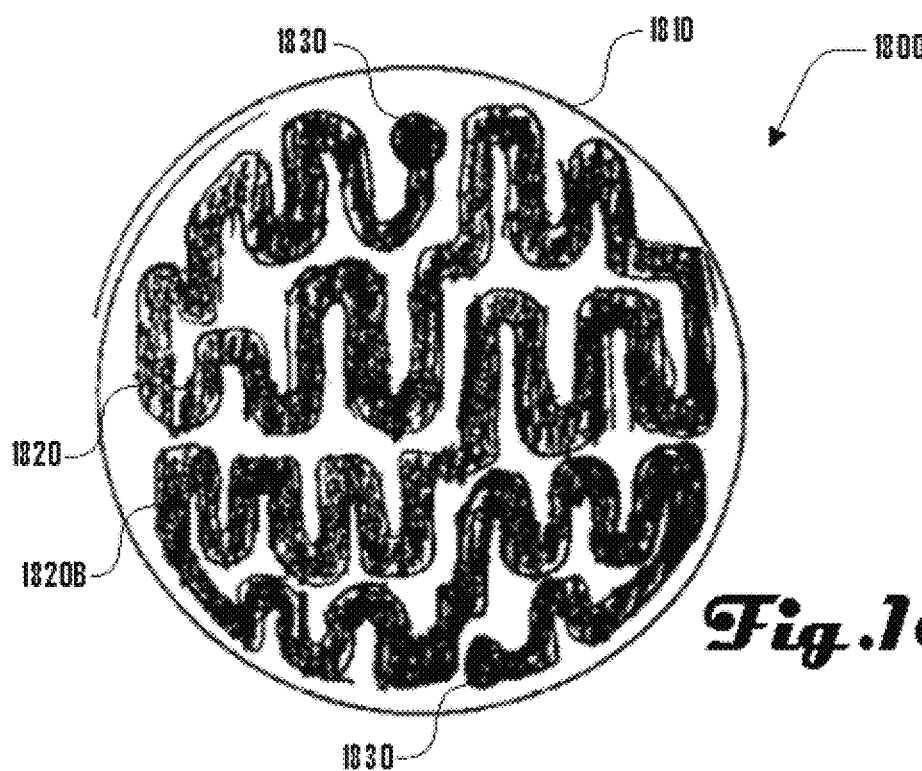

Flow restriction devices can include any suitable device or structure. For example, FIGS. 18a and 18b illustrate two embodiments of a restrictor 1800 that comprises a body 1810 that defines a fluid passage 1820 having a pair of ports 1830 that provide for entry and/or exit of fluid into the fluid passage 1820. FIG. 18a illustrates an example of a coiled fluid passage 1820A and FIG. 18b illustrates an example of a serpentine fluid passage 1820B. In various embodiments, such a restrictor 1800 can be a portion of a bellows 100, cap 1725, 1735, or the like. In other embodiments, a restrictor 1800 can comprise a multi-layer fluid passage 1820, or the like.

In further embodiments, a flow-restriction device or structure can comprise a metering orifice, which can include a small hole (e.g. 0.004-0.050" in diameter) or other sized hole that is of smaller diameter that surrounding lines 1510, or the like. In further embodiments, lines 1510 can be configured to provide flow-restriction by sizing an inner diameter of the tubing over a length such that desired flow-resistance is achieved. In other words, lines 1510 can act as an extended, large-diameter, metering orifice.

In some embodiments, V-plate bulbous actuators can be antagonistically positioned in a V-configuration with a flexure or pivot at the turning point. Compliant cylinders can be inflated antagonistically so as to affect a strong pressure to position ratio. The cylinders can be constructed in multiple ways including blow molding, rotomolding, fabric tube with sealed ends, a sewn fabric envelope with separate impermeable bladder, and the like. Multiple bulbous actuators can be stacked for greater range of motion.

For example, FIGS. 40a and 40b illustrate an example embodiment of an actuator assembly that comprises a first and second actuator 4005A, 4005B, which are respectively disposed in chambers 4011A, 4011B of a cavity defined by a sector body 4015 and a spine 4025 that is rotatably coupled to the sector body 4015 at an axle 4030. The sector body 4015 is defined by a pair of radial arms 4016 and an arc rim 4017. The radial arms 4016 extend from the axel 4030 with the arc rim 4017 extending between the opposite ends of the radial arms 4016.

The spine 4025 is coupled to a portion of a plate 4020, which in this example is coupled at an approximately 90 degree angle from a face of the plate 4020 substantially at the center of the plate 4020. The sector body 4015 can maintain a fixed position relative to the ground (e.g., via a post or the like) and the plate 4020 can be rotated by selective inflation and/or deflation of one or both of the actuators 4005.

In the example configuration shown in FIG. 40a, the plate 4020 is shown in a flat configuration where a top face of the plate 4020 is generally parallel with the ground or perpendicular to gravity. In such a configuration, the first and second actuator 4005A, 4005B can be inflated substantially the same amount, which makes them of equal width within the respective chambers 4011A, 4011B. In contrast, FIG. 40b illustrates a tilted configuration where the first actuator 4005A is less inflated than the second actuator 4005B, which can cause the volume of the first chamber 4011A to decrease and the volume of the second chamber 4012 to increase. Accordingly, the spine 4025 is rotated within the cavity 4010, which in turn causes the plate 4020 to tilt.

In a further embodiment, V-plate ball actuators can be antagonistically positioned in a V-configuration with a flexure or pivot at the turning point. Compliant balls can be inflated antagonistically and in one configuration cupped by hemispherical end plates, one of which can be concave, the other of which can be convex. Multiple ball actuators can be stacked for greater range of motion.

In yet another embodiment, V-plate bellows actuators can be antagonistically positioned in a V-configuration with a flexure or pivot at the turning point. Compliant bellows can be arranged in an arc around the approximate center of a pivot or flexure. Ribs can be used, like spokes on a wheel to constrain the motion of the bellows. Angled rib assemblies may couple corresponding bellows convolutions and actuator flexure or pivot.

Additionally, although various example pneumatic architectures have been illustrated in accordance with some example embodiments (e.g., FIGS. 16, 17a-c, 38 and 39) any suitable pneumatic architectures can be used in accordance with further embodiments. For example, one embodiment can be without the use of a central compressor and instead, the use of smaller compressors at the row controller level. In some embodiments, such a configuration can save the expense and complexity of a source-air distribution system.

FIGS. 41a-e illustrate further example embodiments of pneumatic architectures. For example, in the system 4100A of FIG. 41a, one compressor 1611 can be associated with an east bellows 100E on a tracker 300, and one compressor 1611 can be associated with a west bellows 100W. Respective exhaust valves 1670 can be provided for each set of bellows 100. Motion of the tracker 300 can be achieved by direct pressurization of the bellow 100 to the appropriate pressure by turning the appropriate compressor 1611 on or off, or by reducing the pressure using the exhaust valve 1670.

Figure 41A:
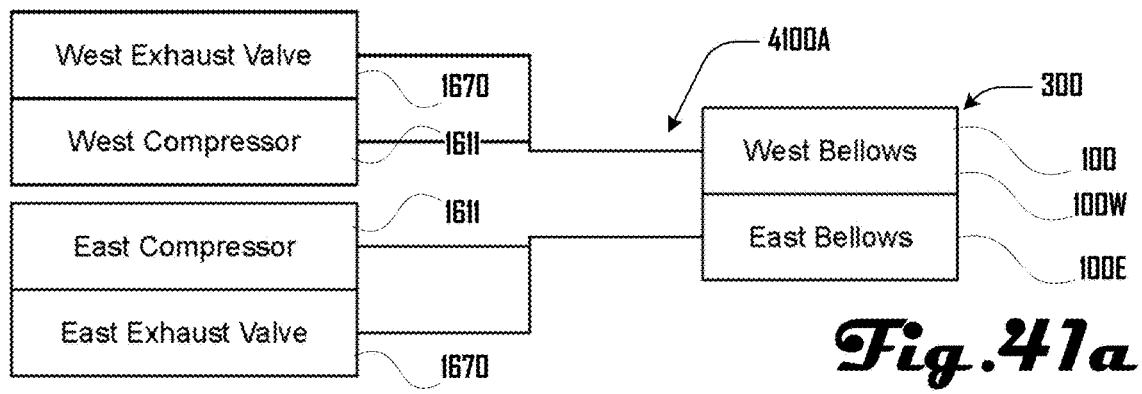
FIGS. 41a, 41b, 41c, 41d and 41e are block diagrams of a portion of a solar panel array in accordance with five example embodiments.
Figure 41B:
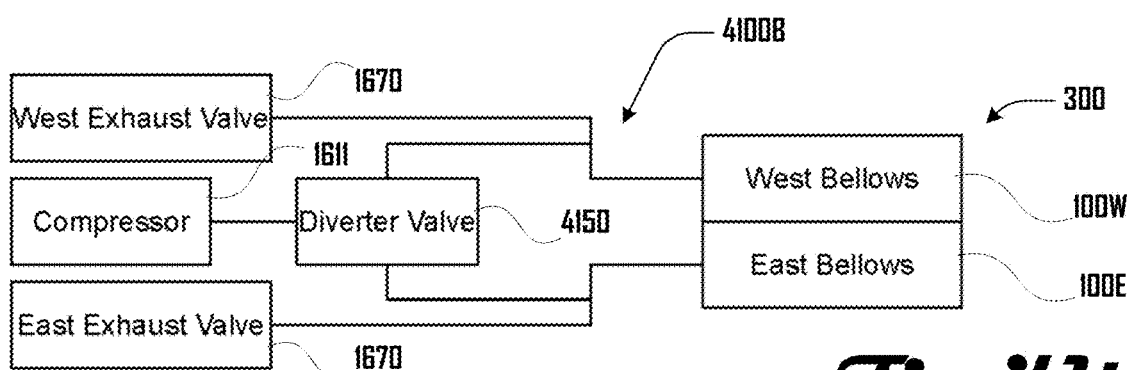
Figure 41C:
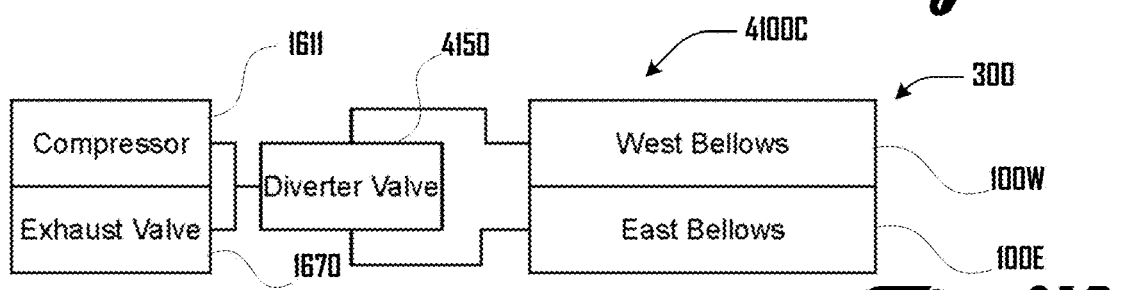

Similarly, FIG. 41b illustrates and example system 4100B, wherein, a compressor 1611 is used to directly pressurize the bellows 100 for moving a tracker 300 and a diverter valve 4150 is used to allow a single compressor 1611 to operate both sets of bellows 100. The exhaust valves 1670 can operate as described above in relation to FIG. 41a. In this example 4100B, the compressor 1611 can feed the diverter valve 4150 which pushes air to either east or west bellows channel to actuate the bellows 100. Similarly, FIG. 41c illustrates a further example embodiment 4100C, wherein a single compressor 1611 and exhaust valve 1670 are coupled to a diverted valve 4150, which can be used to actuate bellows 100.

Figure 41D:
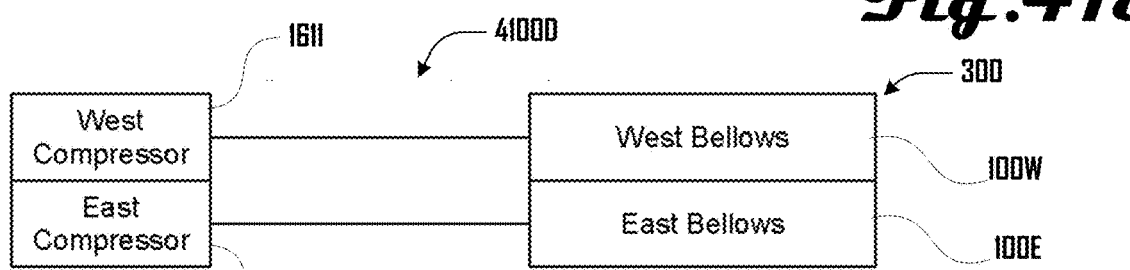

FIG. 41d illustrates a further example embodiment 4100D wherein a pair of respective compressors 1611 can also serve an exhaust valve function and thereby replace exhaust valves 1670. For example, changing the rotation direction of each compressor 1611 can either inject or remove air from the bellows 100 thus changing the pressure and orientation of the tracker 300. This embodiment can be implemented without valves. Alternatively, a bidirectional compressor can replace the east and west compressors 1611 of FIG. 41d and be operably connected to both the east and west bellows 100W, 100E. In yet another embodiment, a bidirectional compressor can replace the east and west compressors 1611 of FIG. 41d and be operably connected to both the east and west bellows 100W, 100E with a conventional compressor connected to the bidirectional compressor and the west bellow 100W or east bellow 100E.

Figure 41E:
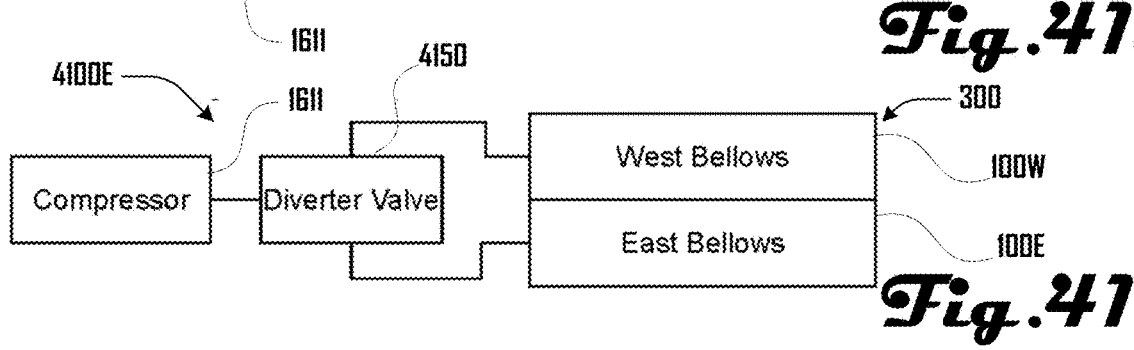

FIG. 41e illustrates a still further example embodiment 4100E, which can comprise a single compressor 1611 and diverter valve 4150. For example, by changing the direction of compressor operation and the state of the diverter valve 4150, air can be either injected into or removed from either set of bellows 100 thus controlling the pressure ratio and orientation of the tracker 300. Changing the rotation direction of compressor 1611 can be operable to exhaust air from the bellows 100 and the diverter valve 4150 switches between the two bellows channels.

In various embodiments storage of compressed air can be configured to prevent or reduce parasitic energy loss. For example, in some embodiments, a control system can communicate with air generation system to only run the compressor 1611 when there is DC over-generation (within certain limits). When the inverters are clipping, energy is being lost (not exported to the grid) so the energy used for compression is "free." In such embodiments, it can be desirable to have large air storage capacity. Such embodiments can allow a tracker system to improve the overall energy yield of a solar array by only generating compressed air when there is excess power available from the solar array.

In a conventional solar implementation there can be a greater portion of DC power available compared to AC power. In this state, the excess DC generation is dissipated as heat. By operating the compressor only during these times, the cost of energy for the compressor 1611 is effectively negative because the energy consumed has no value (it cannot be exported) and consuming that energy will reduce the temperature of the solar modules thus reducing their degradation rate and extending their lifetime.

Additionally, in further embodiments, a system can comprise a plurality of compressors 1611 configured for air storage at different pressures. For example, in one embodiment, a system can comprise a high pressure compressor 1611 and a low pressure compressor 1611. The high pressure compressor 1611 can be configured for maximizing storage capacity for a given volume and the second low pressure compressor 1611 can be configured to increase system efficiency during normal low-demand tracking operation. Such embodiments can reduce the total energy used by the tracking system thus increasing effective solar yield.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A pneumatically actuated solar panel array system comprising:
   a plurality of separate actuator assemblies that each include:
      a planar top plate having a first and second side portion with a central portion between the first and second side portions,
      an angled bottom plate disposed below the planar top plate and rotatably coupled to the planar top plate at the central portion between the first and second side portions via a rotatably coupling joint disposed at an apex of the angled bottom plate, the angled bottom plate having an opposing first side face and second side face,
      a first cavity defined by the first side portion of the planar top plate and the first side face of the angled bottom plate,
      a second cavity defined by the second side portion of the planar top plate and the second side face of the angled bottom plate,
      a first set of one or more inflatable actuators disposed within the first cavity, the first set of one or more inflatable actuators extending between and engaging the first side portion of the planar top plate and the first side face of the angled bottom plate,
      a second set of one or more inflatable actuators disposed within the second cavity, the second set of one or more inflatable actuators extending between and engaging the second side portion of the planar top plate and the second side face of the angled bottom plate, and
      the first and second sets of inflatable actuators being configured to be separately pneumatically inflated, where the pneumatic inflation expands the inflatable actuators to control the pressure ratio between the first and second sets of inflatable actuators and to rotate the top plate relative to the bottom plate; and
   a plurality of solar panels coupled to the top plates of the actuator assemblies, the solar panels configured to be actuated based on inflation of the one or more inflatable actuators associated with the plurality of actuator assembles.

2. The pneumatically actuated solar panel array system of claim 1, further comprising:

a first pneumatic channel operably coupled to each of the inflatable actuators of the first sets of inflatable actuators of the plurality of actuator assemblies and configured to inflate each of the inflatable actuators of the first sets of inflatable actuators simultaneously; and a second pneumatic channel operably coupled to each of the inflatable actuators of the second sets of inflatable actuators of the plurality of actuator assemblies and configured to inflate each of the inflatable actuators of the second sets of inflatable actuators simultaneously.

3. The pneumatically actuated solar panel array system of claim 1, wherein each of the first and second sets of inflatable actuators comprises no more than two inflatable actuators.

4. The pneumatically actuated solar panel array system of claim 1, wherein the bottom plates of the actuator assemblies are V-shaped.

5. The pneumatically actuated solar panel array system of claim 1, wherein the planar top plate extends laterally along a top plate axis, wherein the bottom plate has an axis of symmetry, and wherein the top plate axis is perpendicular to the axis of symmetry of the bottom plate in at least one actuation configuration of the top and bottom plates.

6. The pneumatically actuated solar panel array system of claim 1, wherein each of the inflatable actuators comprises a rigid constraint disposed about a peripheral edge of the inflatable actuators.

7. An actuator assembly that comprises:
a planar top plate having a first and second side portion with a central portion between the first and second side portions;
an angled bottom plate disposed below the planar top plate and rotatably coupled to the planar top plate at the central portion between the first and second side portions via a rotatably coupling joint disposed at an apex of the angled bottom plate, the angled bottom plate having an opposing first side face and second side face;
a first cavity defined by the first side portion of the planar top plate and the first side face of the angled bottom plate;
a second cavity defined by the second side portion of the planar top plate and the second side face of the angled bottom plate;
a first set of one or more inflatable actuators disposed within the first cavity, the first set of one or more inflatable actuators extending between and engaging the first side portion of the planar top plate and the first side face of the angled bottom plate;
a second set of one or more inflatable actuators disposed within the second cavity, the second set of one or more inflatable actuators extending between and engaging the second side portion of the planar top plate and the second side face of the angled bottom plate;
the first and second sets of inflatable actuators being configured to be separately fluidically inflated, where the fluidic inflation expands the inflatable actuators and rotates the top plate relative to the bottom plate; and
one or more solar panels coupled to the top plate of the actuator assembly, the one or more solar panels configured to be actuated based on inflation of the one or more inflatable actuators associated with the actuator assembly.

8. The actuator assembly of claim 7, further comprising:
a first fluidic channel operably coupled to each of the inflatable actuators of the first set of inflatable actuators of the actuator assembly and configured to inflate each of the inflatable actuators of the first set of inflatable actuators simultaneously; and
a second fluidic channel operably coupled to each of the inflatable actuators of the second set of inflatable actuators of the actuator assembly and configured to inflate each of the inflatable actuators of the second set of inflatable actuators simultaneously.

9. The actuator assembly of claim 7, wherein the planar top plate extends laterally along a top plate axis, wherein the bottom plate has an axis of symmetry; and wherein the top plate axis is perpendicular to the axis of symmetry of the bottom plate in at least one actuation configuration of the top and bottom plates.

10. An actuator assembly that comprises:
a planar top plate;
an angled bottom plate rotatably coupled to the planar top plate via a rotatably coupling joint, the angled bottom plate having an opposing first side face and second side face;
a first cavity defined by the top plate and the first side face of the angled bottom plate;
a second cavity defined by the top plate and the second side face of the angled bottom plate;
a first set of one or more inflatable actuators disposed within the first cavity, the first set of one or more inflatable actuators extending between and engaging the first side portion of the planar top plate and the first side face of the angled bottom plate;
a second set of one or more inflatable actuators disposed within the second cavity, the second set of one or more inflatable actuators extending between and engaging the second side portion of the planar top plate and the second side face of the angled bottom plate; and
the first and second sets of inflatable actuators being configured to be separately fluidically inflated, where the fluidic inflation expands the inflatable actuators and rotates the top plate relative to the bottom plate.

11. The actuator assembly of claim 10, further comprising one or more solar panels coupled to the top plate of the actuator assembly, the one or more solar panels configured to be actuated based on inflation of the one or more inflatable actuators associated the actuator assembly.

12. The actuator assembly of claim 10, wherein the top plate comprises a first and second side portion with a central portion between the first and second side portions, and
wherein the angled bottom plate is rotatably coupled to the planar top plate at the central portion between the first and second side portions via the joint, the joint being disposed at an apex of the angled bottom plate.

13. The actuator assembly of claim 10, wherein the angled bottom plate is disposed below the planar top plate.

14. The actuator assembly of claim 10, further comprising:
a first fluid channel operably coupled to each of the inflatable actuators of the first set of inflatable actuators of the actuator assembly and configured to inflate each of the inflatable actuators of the first set of inflatable actuators simultaneously; and
a second fluid channel operably coupled to each of the inflatable actuators of the second set of inflatable actuators of the actuator assembly and configured to inflate each of the inflatable actuators of the second set of inflatable actuators simultaneously.

15. The actuator assembly of claim 10, wherein the planar top plate extends laterally along a top plate axis, wherein the bottom plate has an axis of symmetry; and wherein the top plate axis is perpendicular to the axis of symmetry of the bottom plate in at least one actuation configuration of the top and bottom plates.

16. The actuator assembly of claim 10, wherein each of the first and second sets of inflatable actuators comprises no more than two inflatable actuators.

17. The actuator assembly of claim 10, wherein the bottom plate of the actuator assembly is V-shaped.

18. The actuator assembly of claim 10, wherein the planar top plate extends laterally along a top plate axis, wherein the bottom plate has an axis of symmetry, and wherein the top plate axis is perpendicular to the axis of symmetry of the bottom plate in at least one configuration of the top and bottom plates.

19. The actuator assembly of claim 10, wherein each of the inflatable actuators comprises a rigid constraint disposed about a peripheral edge of the inflatable actuators.

* * * * *